(12) United States Patent
Maeda et al.

(10) Patent No.: US 8,664,289 B2
(45) Date of Patent: Mar. 4, 2014

(54) DYE AND COLORING PHOTOSENSITIVE COMPOSITION

(75) Inventors: Yosuke Maeda, Tokyo (JP); Masaaki Shimizu, Tokyo (JP); Keisuke Matsuhira, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/642,983

(22) PCT Filed: Sep. 8, 2011

(86) PCT No.: PCT/JP2011/070456
§ 371 (c)(1),
(2), (4) Date: Oct. 23, 2012

(87) PCT Pub. No.: WO2012/039286
PCT Pub. Date: Mar. 29, 2012

(65) Prior Publication Data
US 2013/0041062 A1     Feb. 14, 2013

(30) Foreign Application Priority Data
Sep. 22, 2010   (JP) ................. 2010-212335

(51) Int. Cl.
| | |
|---|---|
| *C08F 2/50* | (2006.01) |
| *C08F 2/46* | (2006.01) |
| *B29C 71/04* | (2006.01) |
| *A61L 24/00* | (2006.01) |
| *A61L 2/08* | (2006.01) |
| *C08G 61/04* | (2006.01) |

(52) U.S. Cl.
USPC .......... 522/39; 522/33; 522/6; 522/1; 522/71; 522/189; 522/184; 520/1

(58) Field of Classification Search
USPC ............ 522/39, 33, 6, 1, 71, 189, 184; 520/1
See application file for complete search history.

(56) References Cited

U.S. PATENT DOCUMENTS

| | | | |
|---|---|---|---|
| 3,257,394 A | 6/1966 | Cohen | |
| 4,280,964 A * | 7/1981 | Grychtol | ....... 558/393 |
| 4,422,969 A | 12/1983 | Beecken | |
| 4,578,344 A | 3/1986 | Griffing et al. | |
| 4,597,912 A | 7/1986 | Eisert et al. | |
| 5,223,476 A * | 6/1993 | Kanto et al. | ........ 503/227 |
| 5,688,987 A | 11/1997 | Meador et al. | |
| 8,268,809 B2 | 9/2012 | Kalman et al. | |
| 2010/0249122 A1 | 9/2010 | Kalman | |
| 2011/0123929 A1 * | 5/2011 | Fujita et al. | ....... 430/281.1 |

FOREIGN PATENT DOCUMENTS

| | | | |
|---|---|---|---|
| CN | 1418914 | | 5/2003 |
| JP | 55-003483 | | 1/1980 |
| JP | 56-065048 | | 6/1981 |
| JP | 57-100159 | | 6/1982 |
| JP | 61-013245 | | 1/1986 |
| JP | 61-180242 | | 8/1986 |
| JP | 3-053987 | | 3/1991 |
| JP | 6-157936 | | 6/1994 |
| JP | 8-081635 | | 3/1996 |
| JP | 08-081635 | * | 3/1996 |
| JP | 8-109335 | | 4/1996 |
| JP | 8-109336 | | 4/1996 |
| JP | 2007-286189 | | 11/2007 |
| JP | 2010-502726 | | 1/2010 |
| WO | WO86/04694 | | 8/1986 |
| WO | WO 2008/090640 | * | 7/2008 |

OTHER PUBLICATIONS

International Search Report, PCT/JP2011/070456, Oct. 25, 2011.
Henry, R.A. et al., NMR investigation of high-temperature non-linear optical polymers, Magnetic Resonance in Chemistry, 1996, vol. 34, No. 4, p. 293-300.

* cited by examiner

*Primary Examiner* — Ling Choi
*Assistant Examiner* — Jessica E Whitteley
(74) *Attorney, Agent, or Firm* — Young & Thompson

(57) ABSTRACT

The present invention provides a dye that is excellent in solubility and excellent in heat resistance and a novel compound that is preferable for the dye, and specifically provides a yellow dye having a wavelength of maximum absorption in the region of 400 to 450 nm, and also provides a coloring (alkali-developable) photosensitive composition using the above-mentioned dye, and an optical filter using the above-mentioned coloring (alkali-developable) photosensitive composition, specifically a color filter that does not decrease luminance and thus is preferable for image display devices such as liquid crystal display panels. Specifically, a compound represented by the following general formula (1) is used as the dye. The content of the above-mentioned general formula (1) is as described in the description.

11 Claims, No Drawings

DYE AND COLORING PHOTOSENSITIVE COMPOSITION

TECHNICAL FIELD

The present invention relates to a dye that is designed to have a desired hue and has improved heat resistance, and to a novel compound that is preferable for the dye. Furthermore, the present invention relates to a coloring photosensitive composition using the dye which can be polymerized by energy ray, and to a color filter using the coloring photosensitive composition.

BACKGROUND ART

Compounds having absorption with a high intensity against specific light are used as optical elements in recording layers of optical recording media such as CD-Rs, DVD-Rs, DVD+Rs and BD-Rs, and in image display devices such as liquid crystal display devices (LCDs), plasma display panels (PDPs), electroluminescence displays (ELDs), cathode ray tube display devices (CRTs), fluorescent display tubes and field emission-type displays.

In optical filters for image display devices such as liquid crystal display devices (LCDs), plasma display panels (PDPs), electroluminescence displays (ELDs), cathode ray tube display devices (CRTs), fluorescent display tubes and field emission-type displays, various compounds that absorb light at a wavelength of 300 to 1,100 nm are used as light absorbing materials.

Furthermore, in recent years, light absorbers that selectively absorb a wavelength at specifically 380 to 500 nm are required so as to impart sufficient color purity and color separation to display devices and to improve image quality of images. For these light absorbers, specially precipitous light absorption, i.e., a small half width of λmax, and avoidance of loss of functions due to light, heat and the like are required.

Optical filters that are mainly used in liquid crystal display devices (LCDs) include color filters. Although three primary colors of RGB have been generally used in color filters, it is difficult to impart hues of pure RGB by a single color material, and efforts to obtain hues that are close to those of pure RGB have been made by using plural color materials. Therefore, color materials of yellow, orange, purple and the like are also required besides RGB.

As light absorbers used in color filters, organic and/or inorganic pigments have been used due to their high heat resistance; however, they have a problem that they decrease the luminance of display devices since they are pigments, and this problem has been solved by increasing the luminance of a light source. However, in accordance with the trend of reduction of power consumption, dyes having excellent solubility in solvents and resin compositions and having high heat resistance, and color filters using the dyes have been developed actively. Patent Literatures 1 to 3 disclose dyes each using a compound having a specific structure. Patent Literature 4 discloses an optical filter using a compound having a specific structure.

However, the dyes (compounds) described in these literatures were not satisfiable from the viewpoints of solubility and heat resistance.

CITATION LIST

Patent Literatures

Patent Literature 1: International Patent Application Publication No. WO1986/04694
Patent Literature 2: Japanese Patent Application Laid-Open No. 03-053987
Patent Literature 3: Japanese Patent Application Laid-Open No. 08-109335
Patent Literature 4: Japanese Patent Application Laid-Open No. 2007-286189

SUMMARY OF INVENTION

Technical Problem

Therefore, the aim of the present invention is to provide a dye that is excellent in solubility and excellent in heat resistance and a novel compound that is preferable for the dye, specifically to provide a yellow dye having a wavelength of maximum absorption in the region of 400 to 450 nm. Furthermore, another aim of the present invention is to provide a coloring (alkali-developable) photosensitive composition using the above-mentioned dye. In addition, another aim of the present invention is to provide an optical filter using the above-mentioned coloring (alkali-developable) photosensitive composition, specifically a color filter that does not decrease luminance and thus is preferable for image display devices such as liquid crystal display panels.

Solution to Problem

The present inventors have done intensive studies, and consequently found that a compound having a specific structure has a wavelength of maximum absorption in the region of 400 to 450 nm and a dye using this compound is excellent in solubility and heat resistance, and also found that a coloring (alkali-developable) photosensitive composition using the above-mentioned dye does not decrease the luminance of optical filters (specifically color filters) and thus is preferable for color filters for image display devices such as liquid crystal display panels, and attained the present invention.

The present invention has been made based on the above-mentioned findings, and provides a dye (hereinafter also referred to as dye (A)) containing at least one kind of compound represented by the following general formula (1):

[Chemical Formula 1]

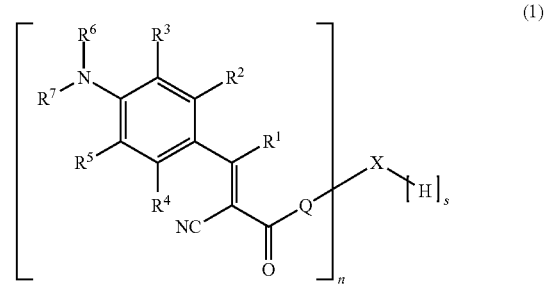

wherein $R^1$ represents a hydrogen atom, a methyl group, a halogen atom, a phenyl group or a cyano group, $R^2$ to $R^5$ each independently represent a hydrogen atom, a halogen atom, a cyano group, a hydroxyl group, a nitro group, an unsubstituted or halogenated alkyl group having 1 to 8 carbon atoms or an unsubstituted or halogenated alkoxy group having 1 to 8 carbon atoms, wherein $R^2$ and $R^3$, and $R^4$ and $R^5$ each may connect to form a ring structure, $R^6$ and $R^7$ each independently represent a hydrogen atom, an aliphatic hydrocarbon group having 1 to 35 carbon atoms, an aromatic hydrocarbon group having 6 to 35 carbon atoms or a heterocyclic group having 2 to 35 carbon atoms, wherein $R^3$ and $R^6$ and/or $R^5$ and $R^7$ and/or $R^6$ and $R^7$ may connect to form a ring structure, Q represents —O—, —$NR^{12}$— or —S—, $R^{12}$ represents a hydrogen atom, a phenyl group or an alkyl group having 1 to 8 carbon atoms, n represents an integer of 2 to 6, s represents an integer of 0 to 4, and X represents an organic group having 1 to 35 carbon atoms having a valence equal to n+s.

Furthermore, the present invention provides a coloring photosensitive composition containing the above-mentioned dye (A), (B) a polymerizable compound having an ethylenically unsaturated bond and (C) a photopolymerization initiator, and further containing (D) an inorganic pigment and/or an organic pigment as necessary.

Furthermore, the present invention provides a coloring alkali-developable photosensitive composition containing the above-mentioned dye (A), (B') an alkali-developable polymerizable compound having an ethylenically unsaturated bond and (C) a photopolymerization initiator.

Furthermore, the present invention provides a cured product of the above-mentioned coloring photosensitive composition or coloring alkali-developable photosensitive composition, a color filter for display devices using the cured product, and a liquid crystal display panel using the color filter for display devices.

Furthermore, the present invention provides a novel compound represented by the following general formula (1'):

[Chemical Formula 2]

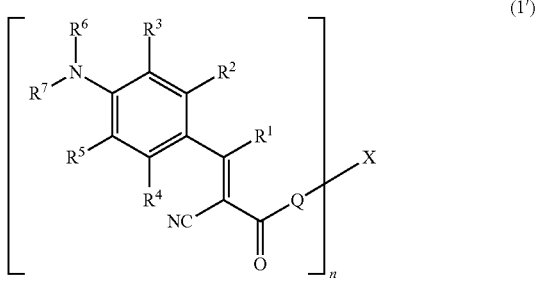

wherein $R^1$ represents a hydrogen atom, a methyl group, a halogen atom, a phenyl group or a cyano group, $R^2$ to $R^5$ each independently represent a hydrogen atom, a halogen atom, a cyano group, a hydroxyl group, a nitro group, an unsubstituted or halogenated alkyl group having 1 to 8 carbon atoms or an unsubstituted or halogenated alkoxy group having 1 to 8 carbon atoms, wherein $R^2$ and $R^3$, and $R^4$ and $R^5$ each may connect to form a ring structure, $R^6$ and $R^7$ each independently represent a hydrogen atom, an aliphatic hydrocarbon group having 1 to 35 carbon atoms, an aromatic hydrocarbon group having 6 to 35 carbon atoms or a heterocyclic group having 2 to 35 carbon atoms, wherein $R^3$ and $R^6$ and/or $R^5$ and $R^7$ and/or $R^6$ and $R^7$ may connect to form a ring structure, Q represents —O—, —$NR^{12}$— or —S—, $R^{12}$ represents a hydrogen atom, a phenyl group or an alkyl group having 1 to 8 carbon atoms, n represents an integer of 2 to 6, s represents an integer of 0 to 4, and X represents an organic group having 1 to 35 carbon atoms having a valence equal to n+s, and any of the following conditions (i) to (v) is further satisfied, provided that when n is 2 to 6, $R^1$s to $R^7$s and Qs each may be the same or different:

(i) n is 2, and X represents an alkylene group having 3 to 35 carbon atoms having side chains, wherein the alkylene group is not further substituted nor interrupted, (ii) n is 2, X is a straight chain alkylene group having 4 to 6 carbon atoms, and $R^2$ to $R^5$ are hydrogen atoms, (iii) n is 2, and X is a straight chain alkylene group having 7 to 10 carbon atoms, (iv) n is 2, and X is a bivalent group having a ring structure having 4 to 35 carbon atoms, and (v) n is 3 to 6.

Advantageous Effects of Invention

According to the present invention, a dye that is excellent in solubility and heat resistance, and a novel compound that is preferable for the dye can be provided. Furthermore, a coloring photosensitive composition (coloring alkali-developable photosensitive composition) using the dye and a cured product thereof are preferable for color filters for display devices and liquid crystal display panels.

DESCRIPTION OF EMBODIMENTS

Hereinafter the present invention will be explained in detail based on preferable exemplary embodiments.

First, the dye (A) of the present invention will be explained. The compound used in the dye (A) of the present invention is represented by the above-mentioned general formula (1).

Examples of the halogen atom represented by $R^1$ to $R^5$ in the above-mentioned general formula (1) may include fluorine, chlorine, bromine and iodine. Examples of the unsubstituted alkyl group having 1 to 8 carbon atoms represented by $R^2$ to $R^5$ in the above-mentioned general formula (1) may include methyl, ethyl, propyl, iso-propyl, butyl, sec-butyl, tert-butyl, iso-butyl, amyl, iso-amyl, tert-amyl, hexyl, 2-hexyl, 3-hexyl, cyclohexyl, 4-methylcyclohexyl, heptyl, 2-heptyl, 3-heptyl, iso-heptyl, tert-heptyl, 1-octyl, iso-octyl, tert-octyl and the like; examples of the halogenated alkyl group having 1 to 8 carbon atoms may include groups obtained by halogenating the groups exemplified as the above-mentioned unsubstituted alkyl groups having 1 to 8 carbon atoms with the above-mentioned halogen atoms;

examples of the unsubstituted alkoxy groups having 1 to 8 carbon atoms may include methyloxy, ethyloxy, iso-propyloxy, butyloxy, sec-butyloxy, tert-butyloxy, iso-butyloxy, amyloxy, iso-amyloxy, tert-amyloxy, hexyloxy, 2-hexyloxy, 3-hexyloxy, cyclohexyloxy, 4-methylcyclohexyloxy, heptyloxy, 2-heptyloxy, 3-heptyloxy, iso-heptyloxy, tert-heptyloxy, 1-octyloxy, iso-octyloxy, tert-octyloxy and the like; and examples of the halogenated alkoxy groups having 1 to 8 carbon atoms may include groups obtained by halogenating the groups exemplified as the above-mentioned unsubstituted alkoxy groups having 1 to 8 carbon atoms with the above-mentioned halogen atoms.

Examples of the ring structure that is formed by connecting $R^2$ and $R^3$, or $R^4$ and $R^5$ in the above-mentioned general formula (1) may include a cyclopentene ring, a cyclohexene ring, a dihydrofuran ring, a dihydropyran ring and the like.

Examples of the aliphatic hydrocarbon group having 1 to 35 carbon atoms represented by $R^6$ and $R^7$ in the above-mentioned general formula (1) may include alkyl groups such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl and decyl; alkenyl groups such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl and tricosenyl; and the like, and the methylene groups in the alkyl groups and alkenyl groups may be interrupted with —O—, —S—, —SO$_2$—, —NHCO—, —NH—, —CONH—, —CO—, —OCO— or —COO—.

Examples of the aromatic hydrocarbon group having 6 to 35 carbon atoms represented by $R^6$ and $R^7$ may include arylalkyl groups such as benzyl, phenethyl, diphenylmethyl, triphenylmethyl, styryl and cinnamyl; aryl groups such as phenyl and naphthyl; and the like, and the methylene groups in the arylalkyl groups may be interrupted with —O—, —S—, —SO$_2$—, —CO—, —OCO— or —COO—.

Examples of the heterocyclic group having 2 to 35 carbon atoms represented by $R^6$ and $R^7$ may include pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, 2,4-dioxyoxazolidin-3-yl and the like.

Examples of the ring structure formed by connecting $R^3$ and $R^6$ and/or $R^5$ and $R^7$ and/or $R^6$ and $R^7$ may include 5 to 7-membered rings such as a cyclopentane ring, a cyclohexane ring, a cyclopentene ring, a benzene ring, a pyrrolidine ring, a pyrrole ring, a piperazine ring, a piperidine ring, a morpholine ring, a thiomorpholine ring, a tetrahydropyridine ring, a lactone ring and a lactam ring, and condensed rings such as a naphthalene ring and an anthracene ring.

Examples of the alkyl group having 1 to 8 carbon atoms represented by $R^{12}$ in the above-mentioned general formula (1) may include the groups exemplified as the above-mentioned unsubstituted alkyl group having 1 to 8 carbon atoms, and the like.

The aliphatic hydrocarbon group having 1 to 35 carbon atoms represented by $R^6$ and $R^7$, the aromatic hydrocarbon group having 6 to 35 carbon atoms represented by $R^6$ and $R^7$ and the heterocyclic group having 2 to 35 carbon atoms represented by $R^6$ and $R^7$ in the above-mentioned general formula (1) may have substituents, and examples of such substituents may include the following ones. In the cases when $R^6$ and $R^7$ are groups containing carbon atoms such as the above-mentioned aliphatic hydrocarbon groups having 1 to 35 carbon atoms and those groups have substituents containing carbon atoms among the following substituents, the number of the carbon atoms of the entirety including the substituents shall satisfy the defined range.

Examples of the above-mentioned substituents may include alkyl groups such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl and decyl; alkoxy groups such as methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy and decyloxy; alkylthio groups such as methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio and 2-ethylhexylthio; alkenyl groups such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl and tricosenyl; arylalkyl groups such as benzyl, phenethyl, diphenylmethyl, triphenylmethyl, styryl and cinnamyl; aryl groups such as phenyl and naphthyl; aryloxy groups such as phenoxy and naphthyloxy; arylthio groups such as phenylthio and naphthylthio; heterocyclic groups such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl and 2,4-dioxyoxazolidin-3-yl; halogen atoms such as fluorine, chlorine, bromine and iodine; acyl groups such as acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl and carbamoyl; acyloxy groups such as acetyloxy and benzoyloxy; substituted amino groups such as amino, ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino and phenylsulfonylamino; a sulfonamide group, a sulfonyl group, a carboxyl group, a cyano group, a sulfo group, a hydroxyl group, a nitro group, a mercapto group, an imide group, a carbamoyl group, a sulfonamide group, and the like, and these groups may further be substituted. Furthermore, the carboxyl group and sulfo group each may form a salt.

Examples of the organic group having 1 to 35 carbon atoms having a valence of n+s represented by X in the above-mentioned general formula (1) may include a group represented by the following general formula (2) or (3) as a bivalent group (when n is 2), a group represented by the following general formula (4) as a trivalent group (when n is 2 or 3), a group represented by the following general formula (5) as a tetravalent group (when n is 2 to 4), a group represented by the following general formula (6) as a pentavalent group (when n is 2 to 5), and a group represented by the following general formula (7) as a hexavalent group (when n is 2 to 6), provided that the formula of X–n=s shall hold.

[Chemical Formula 3]

$$—Z^1—X^1—Z^2—\qquad(2)$$

(3)

wherein in the above-mentioned general formula (2) or (3), $X^1$ represents a direct bond, a methylene group, an alkylidene group having 1 to 4 carbon atoms, a di-substituted alicyclic hydrocarbon group having 3 to 20 carbon atoms, —O—, —S—, —SO$_2$—, —SS—, —SO—, —CO—, —COO—, —NR$^{20}$— or a substituent represented by any of the following [Chemical Formula 3A] to [Chemical Formula 3C], wherein the alkylidene group may be substituted with halogen atoms, $R^{20}$ represents a hydrogen atom, an alkyl group having 1 to 8 carbon atoms, an aryl group having 6 to 20 carbon atoms or an arylalkyl group having 7 to 20 carbon atoms, and $Z^1$ and $Z^2$ each represents any of a direct bond, an alkanediyl having 1 to 8 carbon atoms, a di-substituted aromatic hydrocarbon having 6 to 20 carbon atoms, —O— or —S—, or a group as a combination of these groups. However, the group represented by the above-mentioned general formula (2) or (3) is within the range of 1 to 25 carbon atoms. Furthermore, at least one of $X^1$, $Z^1$ and $Z^2$ is not a direct bond.

[Chemical Formula 3A]

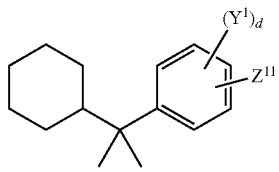

wherein $Z^{11}$ represents a hydrogen atom, a phenyl group optionally substituted by an alkyl group or alkoxy group having 1 to 10 carbon atoms or a cycloalkyl group having 3 to 10 carbon atoms, $Y^1$ represents an alkyl group having 1 to 10 carbon atoms, an alkoxy group having 1 to 10 carbon atoms, an alkenyl group having 2 to 10 carbon atoms or a halogen atom, wherein the above-mentioned alkyl group, alkoxy group and alkenyl group may be substituted with halogen atoms, and d is an integer of 0 to 5.

[Chemical Formula 3B]

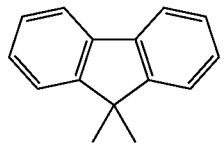

[Chemcial Formula 3C]

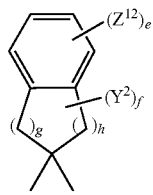

wherein $Y^2$ and $Z^{12}$ each independently represent an alkyl group having 1 to 10 carbon atoms optionally substituted with halogen atoms, an aryl group having 6 to 20 carbon atoms optionally substituted with halogen atoms, an aryloxy group having 6 to 20 carbon atoms optionally substituted with halogen atoms, an arylthio group having 6 to 20 carbon atoms optionally substituted with halogen atoms, an arylalkenyl group having 6 to 20 carbon atoms optionally substituted with halogen atoms, an arylalkyl group having 7 to 20 carbon atoms optionally substituted with halogen atoms, a heterocyclic group having 2 to 20 carbon atoms optionally substituted with halogen atoms, or a halogen atom, wherein the methylene groups in the alkyl group and arylalkyl group may be interrupted with an unsaturated bond, —O— or —S—, $Z^{12}$ may form a ring with the adjacent $Z^{12}$, e represents a number of 0 to 4, f represents a number of 0 to 8, g represents a number of 0 to 4, h represents a number of 0 to 4, and the total of the numbers g and h is 2 to 4.

[Chemical Formula 4]

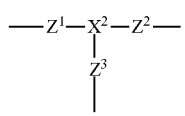

(4)

wherein in the above-mentioned general formula (4), $X^2$ is a carbon atom substituted with $R^{30}$, a nitrogen atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tri-substituted, $R^{30}$ represents a hydrogen atom, an alkyl group having 1 to 8 carbon atoms, an aryl group having 6 to 20 carbon atoms or an arylalkyl group having 7 to 20 carbon atoms, and $Z^1$ to $Z^3$ are the same as the groups represented by $Z^1$ and $Z^2$ in the above-mentioned general formula (2). However, the group represented by the above-mentioned general formula (4) is within the scope of 1 to 25 carbon atoms.

[Chemical Formula 5]

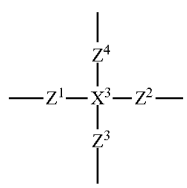

(5)

wherein in the above-mentioned general formula (5), $X^3$ is a carbon atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tetra-substituted, and $Z^1$ to $Z^4$ are the same as the groups represented by $Z^1$ and $Z^2$ in the above-mentioned general formula (2). However, the group represented by the above-mentioned general formula (5) is within the range of 1 to 25 carbon atoms.

[Chemical Formula 6]

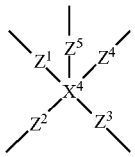

(6)

wherein in the above-mentioned general formula (6), $X^4$ is a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is penta-substituted, and $Z^1$ to $Z^5$ are the same as the groups represented by $Z^1$ and $Z^2$ in the above-mentioned general formula (2). However, the group represented by the above-mentioned general formula (6) is within the range of 1 to 35 carbon atoms.

[Chemical Formula 7]

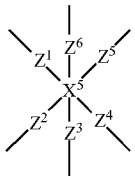

(7)

wherein in the above-mentioned general formula (7), $X^5$ is a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is hexa-substituted, and $Z^1$ to $Z^6$ are the same as the groups represented by $Z^1$ and $Z^2$ in the above-mentioned general formula (2). However, the group represented by the above-mentioned general formula (7) is within the range of 1 to 35 carbon atoms.

Examples of the alkylidene group having 1 to 4 carbon atoms represented by $X^1$ in the above-mentioned general formula (2) may include methylidene, ethylidene, propylidene, butylidene and the like, and examples of the di-substituted alicyclic hydrocarbon group having 3 to 20 carbon atoms may include (di-substituted) groups obtained by substituting groups such as cyclopropane, cyclobutane, cyclopentane, cyclohexane, cycloheptane, 2,4-dimethylcyclobutane and 4-methylcyclohexane with $Z^1$ and $Z^2$.

Examples of the alkyl group having 1 to 8 carbon atoms represented by $R^{20}$ that is the group in $X^1$ in the above-mentioned general formula (2) may include the groups exemplified in the explanation on $R^2$ to $R^5$ in the above-mentioned general formula (1), examples of the aryl group having 6 to 20 carbon atoms may include phenyl, naphthyl, 2-methylphenyl, 3-methylphenyl, 4-methylphenyl, 4-vinylphenyl, 3-iso-propylphenyl, 4-iso-propylphenyl, 4-butylphenyl, 4-iso-butylphenyl, 4-tert-butylphenyl, 4-hexylphenyl, 4-cyclohexylphenyl, 4-octylphenyl, 4-(2-ethylhexyl)phenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,4,5-trimethylphenyl and the like, and examples of the arylalkyl group having 7 to 20 carbon atoms may include benzyl, phenethyl, 2-phenylpropan-2-yl, diphenylmethyl, triphenylmethyl, styryl, cinnamyl and the like.

Examples of the alkanediyls having 1 to 8 carbon atoms represented by $Z^1$ and $Z^2$ in the above-mentioned general formula (2) or (3) may include methylene, ethylene, propylene, butylene, pentylene, hexylene, heptylene, octylene, 1-methylmethane-1,1-diyl, 1-ethylmethane-1,1-diyl, 1-propylmethane-1,1-diyl, 1-methylethane-1,2-diyl, 1-ethylethane-1,2-diyl, 1-propylethane-1,2-diyl, 1-methylpropane-1,3-diyl, 1-ethylpropane-1,3-diyl, 1-propylpropane-1,3-diyl, 2-methylpropane-1,3-diyl, 2-ethylpropane-1,3-diyl, 2-propylpropane-1,3-diyl, 1-methylbutane-1,4-diyl, 1-ethylbutane-1,4-diyl, 1-propylbutane-1,4-diyl, 2-methylbutane-1,4-diyl, 2-ethylbutane-1,4-diyl, 2-propylbutane-1,4-diyl, 1-methylpentane-1,5-diyl, 1-ethylpentane-1,5-diyl, 1-propylpentane-1,5-diyl, 2-methylpentane-1,5-diyl, 2-ethylpentane-1,5-diyl, 2-propylpentane-1,5-diyl, 3-methylpentane-1,5-diyl, 3-ethylpentane-1,5-diyl, 3-propylpentane-1,5-diyl, 1-methylhexane-1,6-diyl, 1-ethylhexane-1,6-diyl, 2-methylhexane-1,6-diyl, 2-ethylhexane-1,6-diyl, 3-methylhexane-1,6-diyl, 3-ethylhexane-1,6-diyl, 1-methylheptane-1,7-diyl, 2-methylheptane-1,7-diyl, 3-methylheptane-1,7-diyl, 4-methylheptane-1,7-diyl, 1-phenylmethane-1,1-diyl, 1-phenylethane-1,2-diyl, 1-phenylpropane-1,3-diyl and the like, wherein the above-mentioned alkanediyls may be substituted with a halogen atom, a cyano group, a nitro group or the alkoxy group having 1 to 8 carbon atoms represented by the above-mentioned $R^2$, and examples of the di-substituted aromatic hydrocarbon having 6 to 20 carbon atoms may include phenylene, naphthylene, biphenyl and the like, wherein the aromatic hydrocarbon may be substituted with a halogen atom, a cyano group, a nitro group, the alkyl group having 1 to 8 carbon atoms represented by the above-mentioned $R^2$, or the alkoxy group having 1 to 8 carbon atoms represented by the above-mentioned $R^2$.

Examples of the tri-substituted chain hydrocarbon having 1 to 20 carbon atoms represented by $X^2$ in the above-mentioned general formula (4) may include (tri-substituted) groups formed by substituting groups such as methane, ethane, propane, iso-propane, butane, sec-butane, tert-butane, iso-butane, hexane, 2-methylhexane, 3-methylhexane, heptane, 2-methylheptane, 3-methylheptane, iso-heptane, tert-heptane, 1-methyloctane, iso-octane and tert-octane with $Z^1$, $Z^2$ and $Z^3$, examples of the tri-substituted alicyclic hydrocarbon having 3 to 20 carbon atoms may include (tri-substituted) groups formed by substituting the alicyclic hydrocarbon groups exemplified in the explanation on $X^1$ in the above-mentioned general formula (2) with $Z^1$, $Z^2$ and $Z^3$, examples of the tri-substituted aromatic hydrocarbon having 6 to 20 carbon atoms may include (tri-substituted) groups formed by substituting groups such as benzene, naphthalene, anthracene, fluorene, biphenylene and terphenylene with $Z^1$, $Z^2$ and $Z^3$, and examples of the tri-substituted heterocycle having 6 to 20 carbon atoms may include (tri-substituted) groups formed by substituting groups such as pyridine, pyrazine, piperidine, piperazine, pyrimidine, pyridazine, triazine, hexahydrotriazine, furan, tetrahydrofuran, chromane, xanthene, thiophene and thiorane with $Z^1$, $Z^2$ and $Z^3$.

Examples of the alkyl group having 1 to 8 carbon atoms, aryl group having 6 to 20 carbon atoms or arylalkyl group having 7 to 20 carbon atoms represented by $R^{30}$ that is the group in $X^2$ in the above-mentioned general formula (4) may include the groups exemplified in the explanation on $R^{20}$ in the above-mentioned general formula (2).

Examples of the alkanediyl having 1 to 8 carbon atoms and di-substituted aromatic hydrocarbon having 6 to 20 carbon atoms represented by $Z^1$ to $Z^3$ in the above-mentioned general formula (4) may include the groups exemplified in the explanation on $Z^1$ and $Z^2$ in the above-mentioned general formulas (2) and (3).

Examples of the chain hydrocarbon having 1 to 20 carbon atoms, alicyclic hydrocarbon having 3 to 20 carbon atoms, aromatic hydrocarbon having 6 to 20 carbon atoms or heterocycle having 6 to 20 carbon atoms which is tetra-substituted represented by $X^3$ in the above-mentioned general formula (5) may include (tetra-substituted) groups formed by substituting the groups exemplified in the explanation on $X^2$ in the above-mentioned (4) with $Z^1$, $Z^2$, $Z^3$ and $Z^4$.

Examples of the alkanediyl having 1 to 8 carbon atoms or di-substituted aromatic hydrocarbon having 6 to 20 carbon atoms represented by $Z^1$ to $Z^4$ in the above-mentioned general formula (5) may include the groups exemplified in the explanation on $Z^1$ and $Z^2$ in the above-mentioned general formulas (2) and (3).

Examples of the chain hydrocarbon having 1 to 20 carbon atoms, alicyclic hydrocarbon having 3 to 20 carbon atoms, aromatic hydrocarbon having 6 to 20 carbon atoms or heterocycle having 6 to 20 carbon atoms which is penta-substituted represented by $X^4$ in the above-mentioned general formula (6) may include (penta-substituted) groups formed by substituting the groups exemplified in the explanation on $X^2$ in the above-mentioned (4) with $Z^1$, $Z^2$, $Z^3$, $Z^4$ and $Z^5$.

Examples of the alkanediyl having 1 to 8 carbon atoms and di-substituted aromatic hydrocarbon having 6 to 20 carbon atoms represented by $Z^1$ to $Z^5$ in the above-mentioned general formula (6) may include the groups exemplified in the explanation on $Z^1$ and $Z^2$ in the above-mentioned general formulas (2) and (3).

Examples of the penta-substituted chain hydrocarbon having 1 to 20 carbon atoms, alicyclic hydrocarbon having 3 to 20 carbon atoms, aromatic hydrocarbon having 6 to 20 carbon atoms or heterocycle having 6 to 20 carbon atoms represented by $X^5$ in the above-mentioned general formula (7) may include (hexa-substituted) groups formed by substituting the groups exemplified in the explanation on $X^2$ in the above-mentioned (4) with $Z^1$, $Z^2$, $Z^3$, $Z^4$, $Z^5$ and $Z^6$.

Examples of the alkanediyl having 1 to 8 carbon atoms and di-substituted aromatic hydrocarbon having 6 to 20 carbon atoms represented by $Z^1$ to $Z^6$ in the above-mentioned general formula (7) may include the groups exemplified in the explanation on $Z^1$ and $Z^2$ in the above-mentioned general formulas (2) and (3).

Among the compounds represented by the above-mentioned general formula (1), the compounds wherein $R^1$ is a hydrogen atom; the compounds wherein $R^2$ to $R^5$ are hydrogen atoms; the compounds wherein $R^6$ and $R^7$ are alkyl groups having 1 to 8 carbon atoms; and the compounds wherein Q is —O— or —NH— are preferable since the raw materials are readily available and readily produced.

Furthermore, among the compounds represented by the above-mentioned general formula (1), the compounds wherein the part X-Q is a group selected from Group 1 when n is 2; the compounds wherein the part X-Q is a group selected from Group 2 when n is 3; the compounds wherein the part X-Q is the group of Group 3 when n is 4; the compounds wherein the part X-Q is the group of Group 4 when n is 5; and the compounds wherein the part X-Q is the group of Group 5 when n is 6 are more preferable since the raw materials are specifically readily available.

Furthermore, the compounds wherein X in the above-mentioned general formula (1) is an asymmetric group or has 7 or more carbon atoms are specifically preferable since they are excellent in solubility.

When n is 2 to 6, $R^1$s to $R^7$s and Qs each may be the same or different.

[Chemical Formula 8]

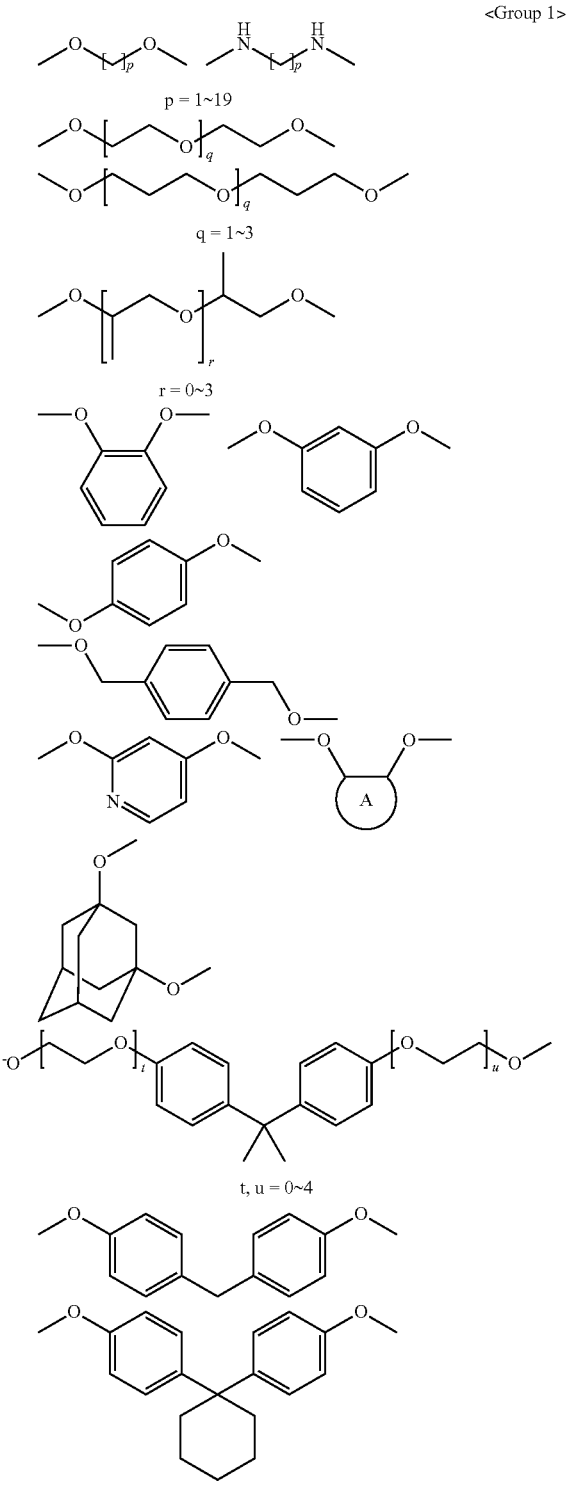

<Group 1>

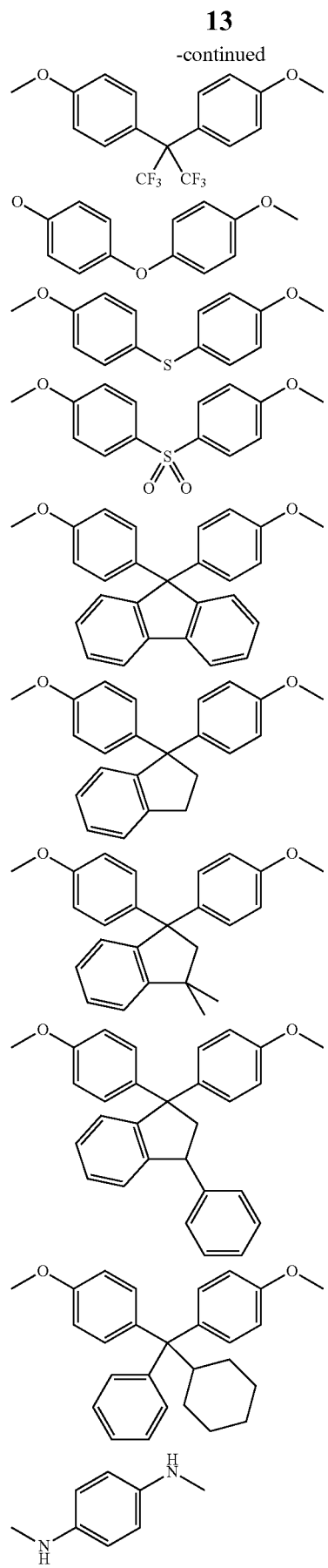
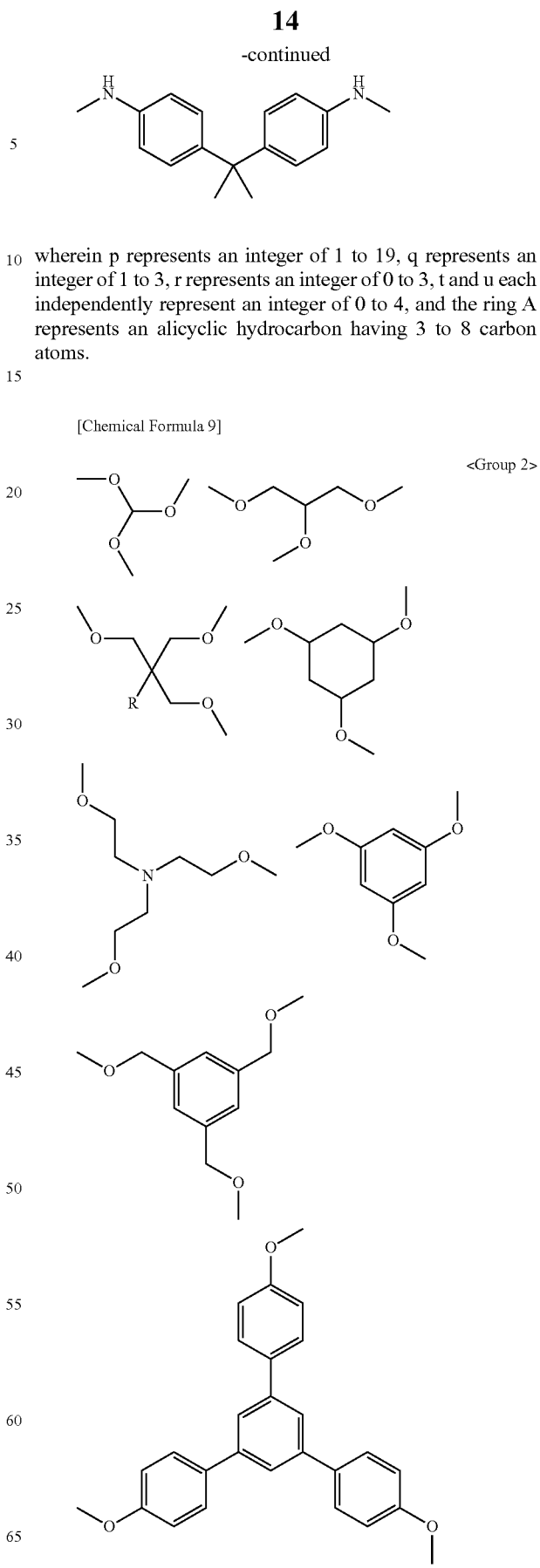
wherein p represents an integer of 1 to 19, q represents an integer of 1 to 3, r represents an integer of 0 to 3, t and u each independently represent an integer of 0 to 4, and the ring A represents an alicyclic hydrocarbon having 3 to 8 carbon atoms.
[Chemical Formula 9]

[Chemical Formula 11]

<Group 4>

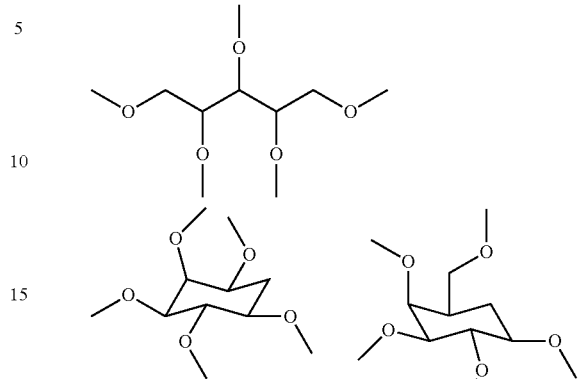

[Chemical Formula 12]

<Group 5>

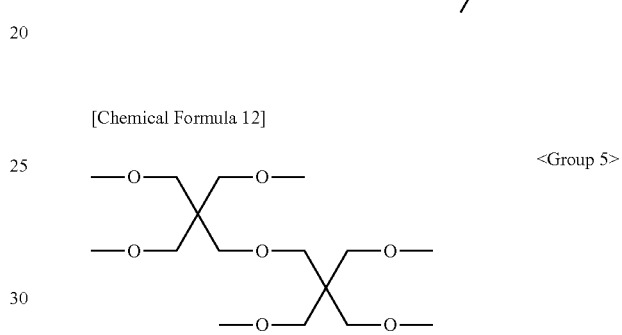

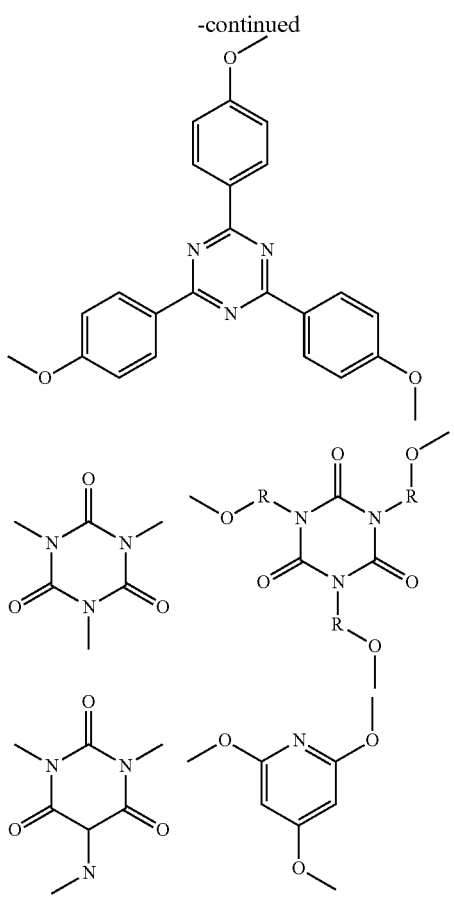

wherein R represents an alkyl group having 1 to 4 carbon atoms which is unsubstituted or substituted with hydroxyl groups, an alkylene group having 1 to 4 carbon atoms, or a hydroxyl group.

[Chemical Formula 10]

<Group 3>

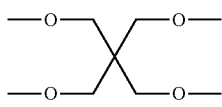

Specific examples of the compounds represented by the above-mentioned general formula (1) may include the following compounds No. 1 to No. 117, but the present invention is not limited to these compounds.

[Chemical Formula 13]

Compound No. 1

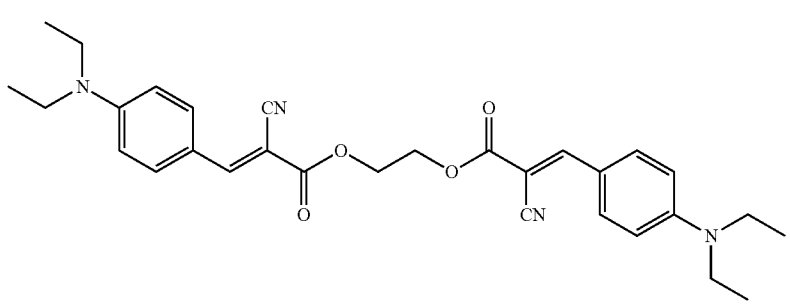

-continued
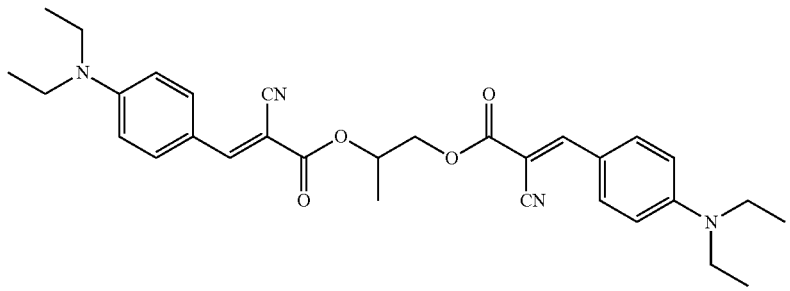
Compound No. 2
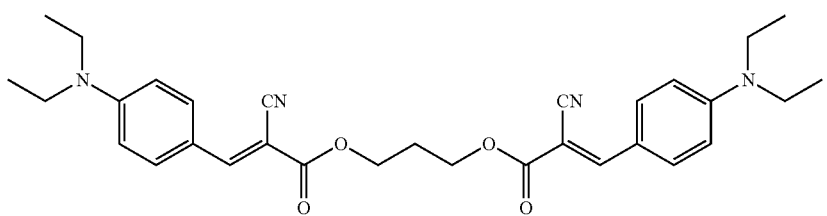
Compound No. 3
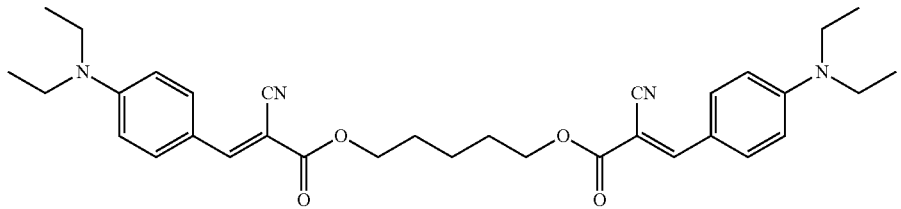
Compound No. 4
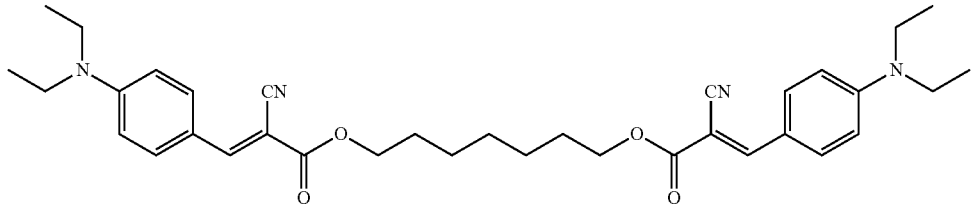
Compound No. 5
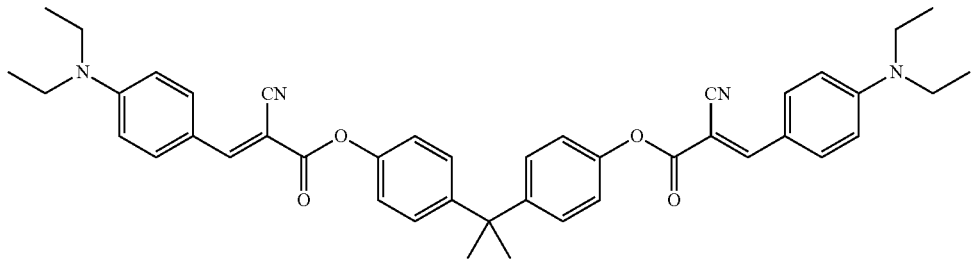
Compound No. 6
[Chemical Formula 14]
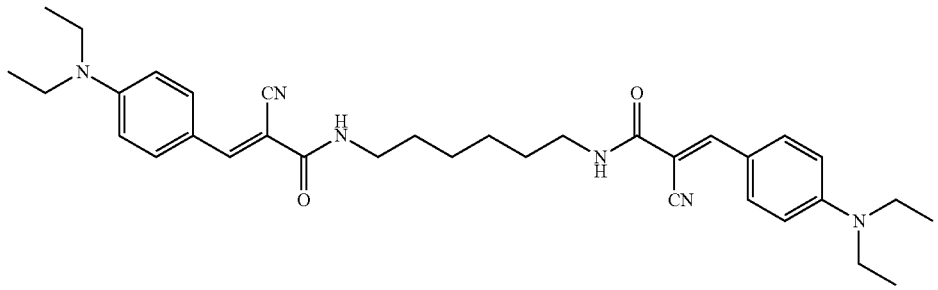
Compound No. 7

-continued
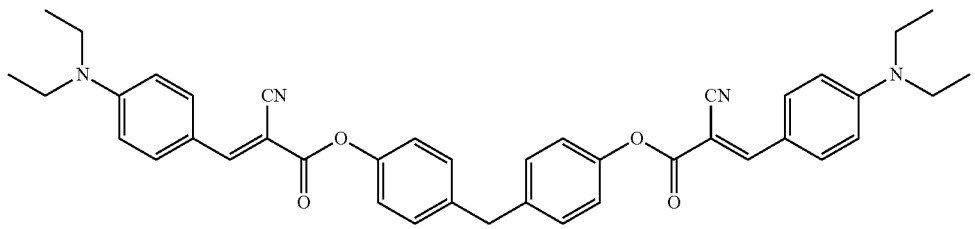
Compound No. 8
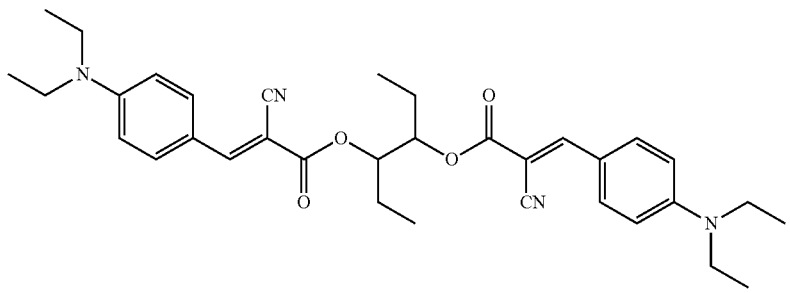
Compound No. 9
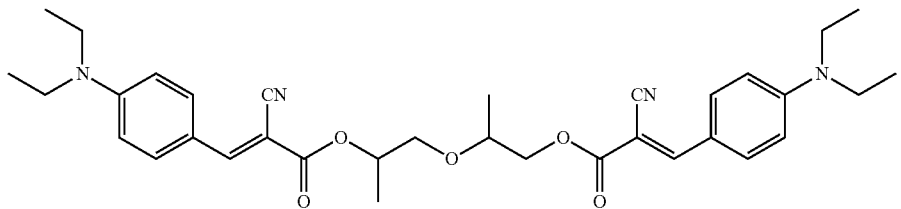
Compound No. 10
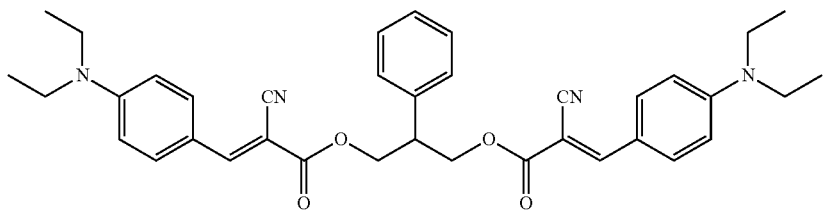
Compound No. 11
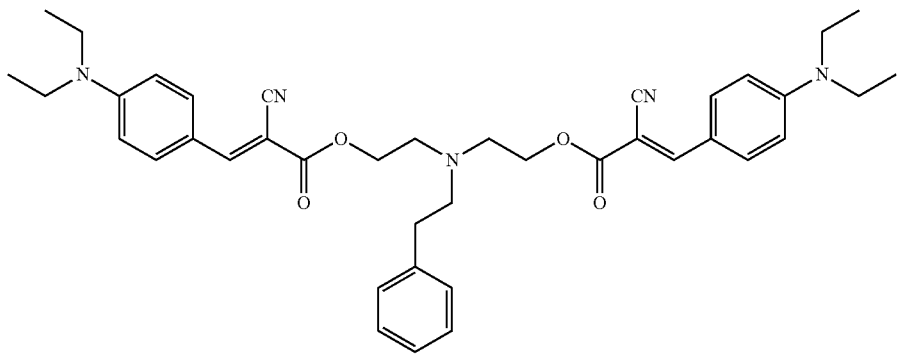
Compound No. 12

-continued
[Chemical Formula 15]
Compound No. 13
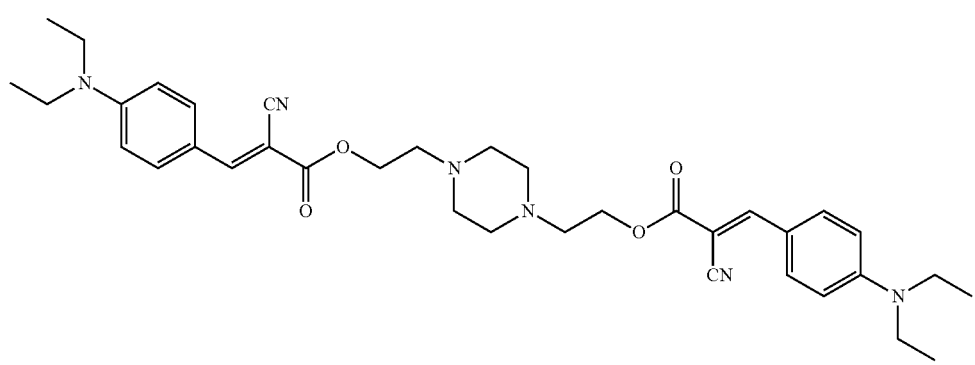
Compound No. 14
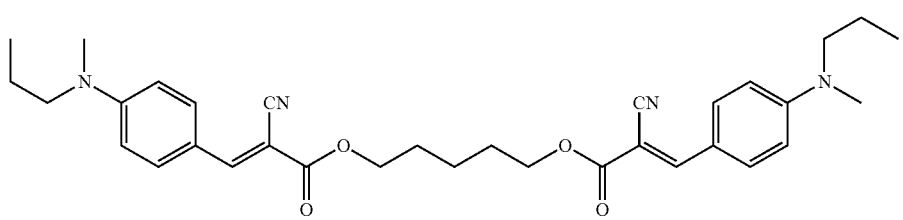
Compound No. 15
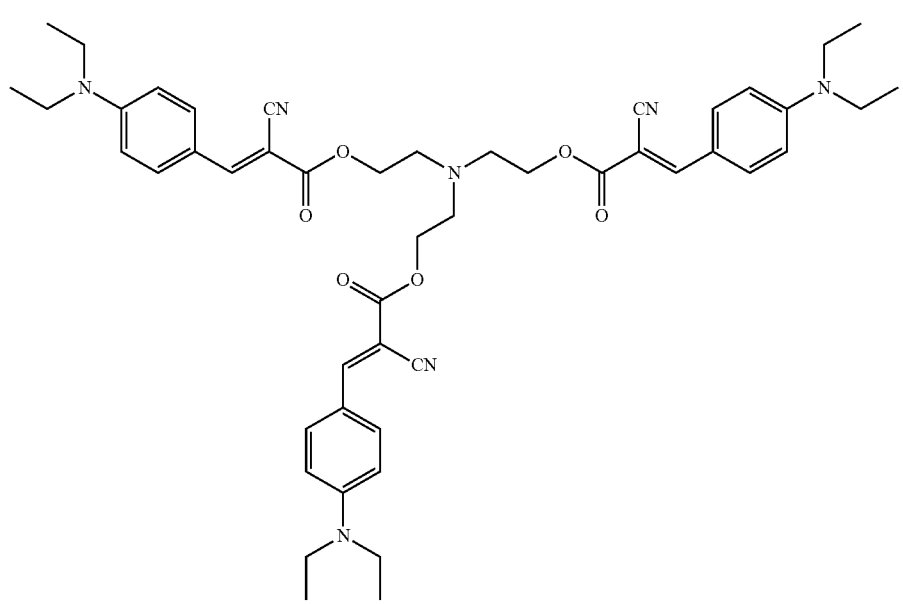
Compound No. 16
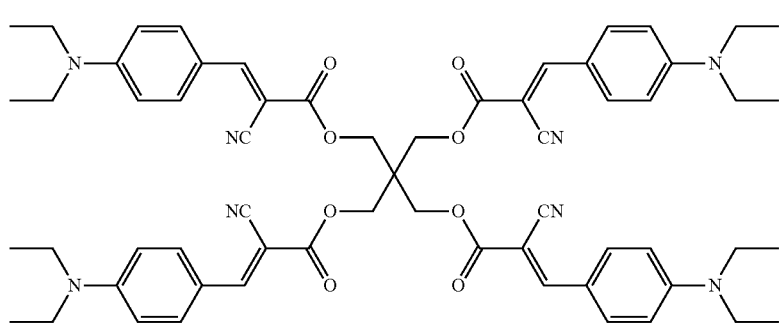

-continued
Compound No. 17
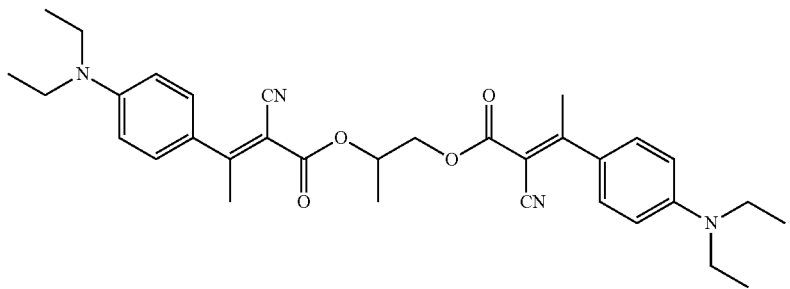
Compound No. 18
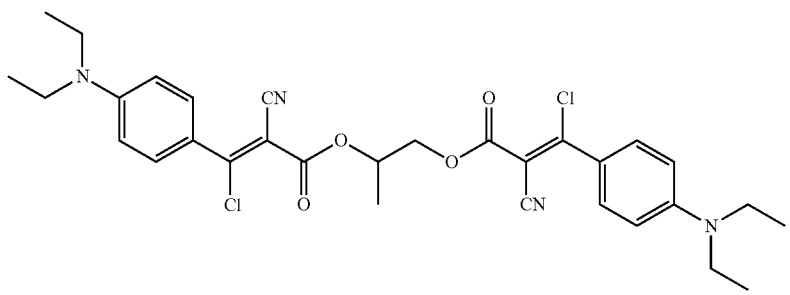
Compound No. 19
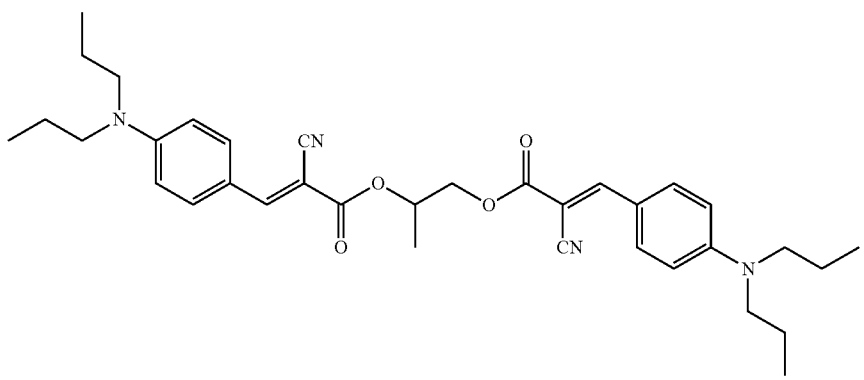
Compound No. 20
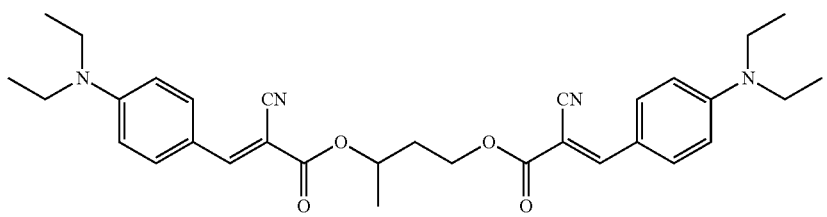
Compound No. 21
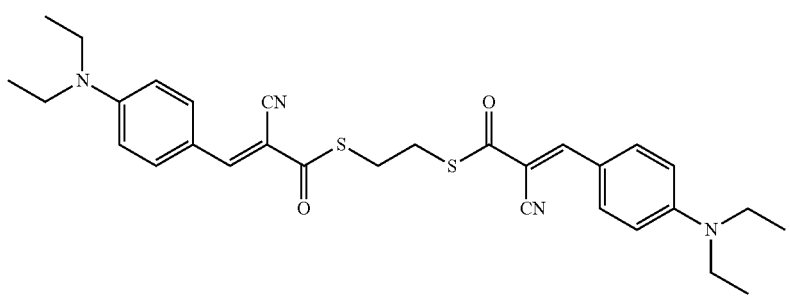

-continued
Compound No. 22
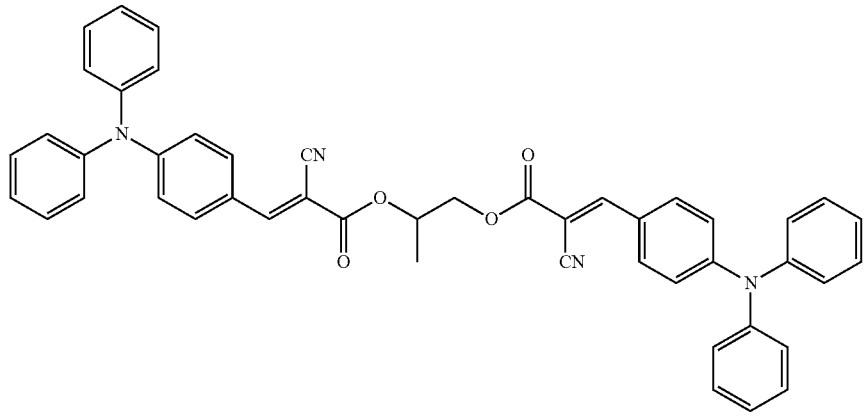
[Chemical Formula 16]
Compound No. 23
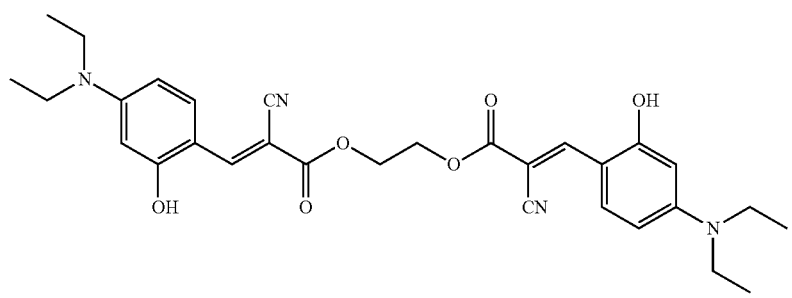
Compound No. 24
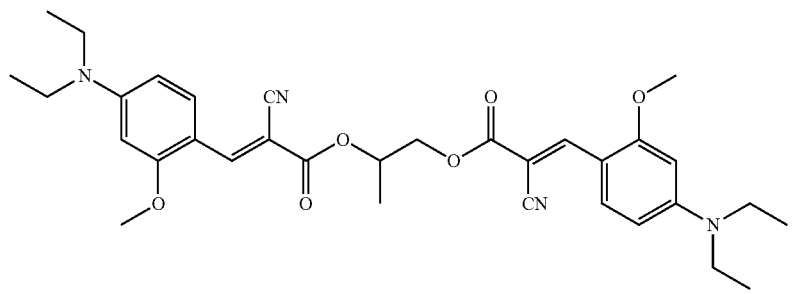
Compound No. 25
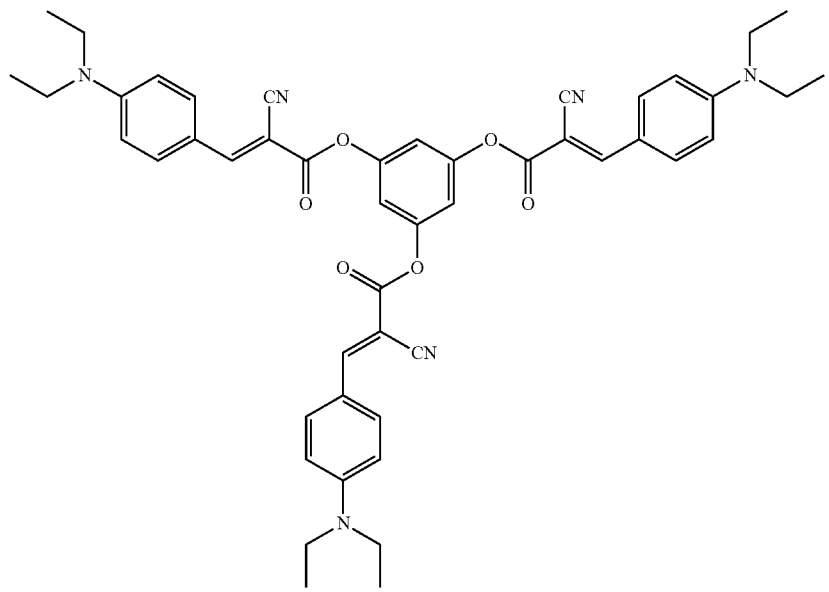

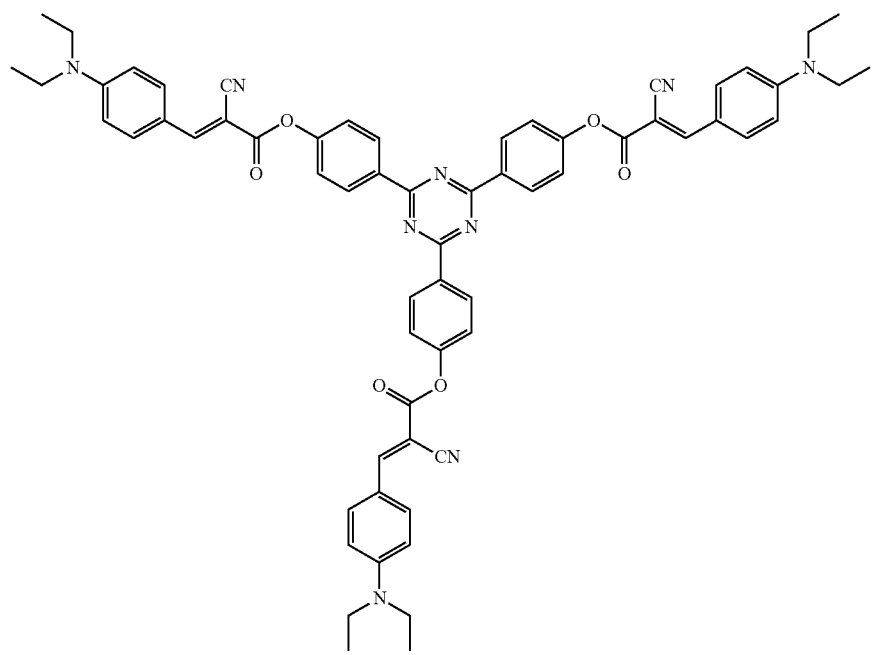
Compound No. 26
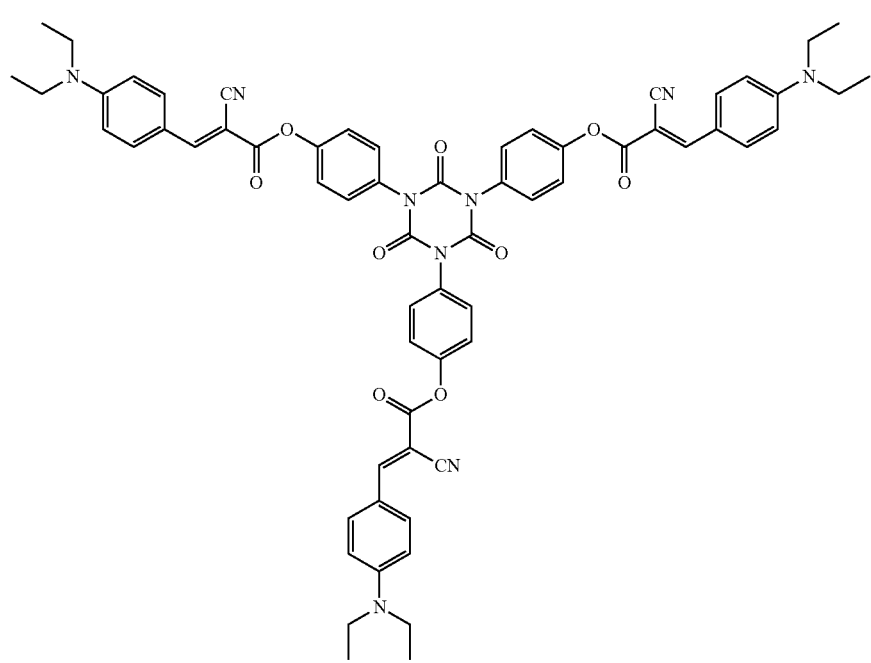
Compound No. 27

Compound No. 28
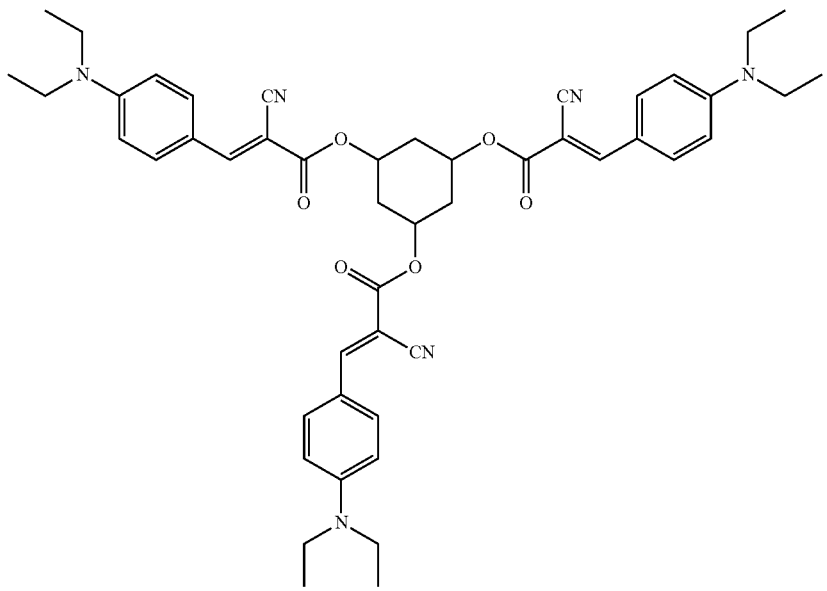
[Chemical Formula 17]
Compound No. 29
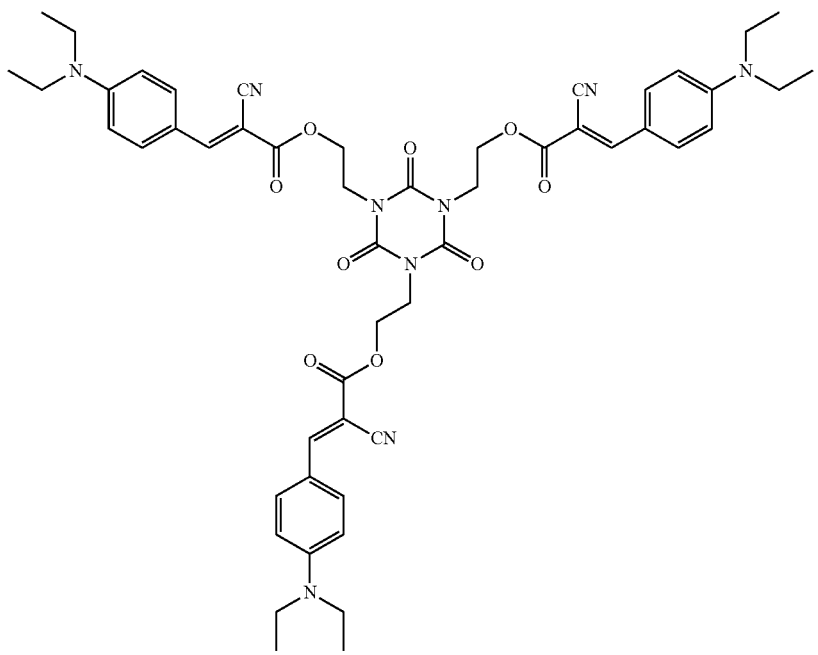

-continued
Compound No. 30
Compound No. 31
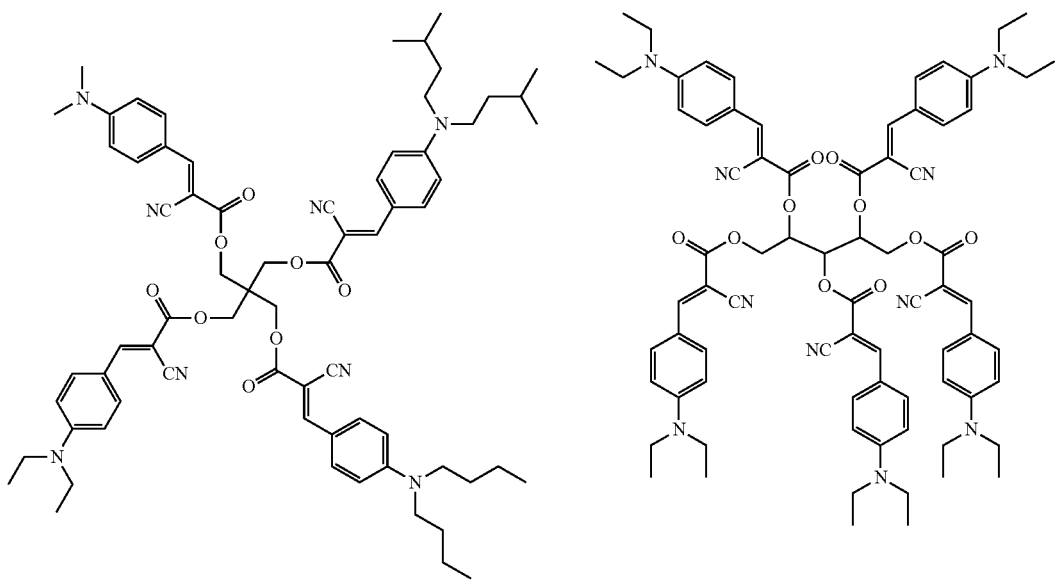
Compound No. 32
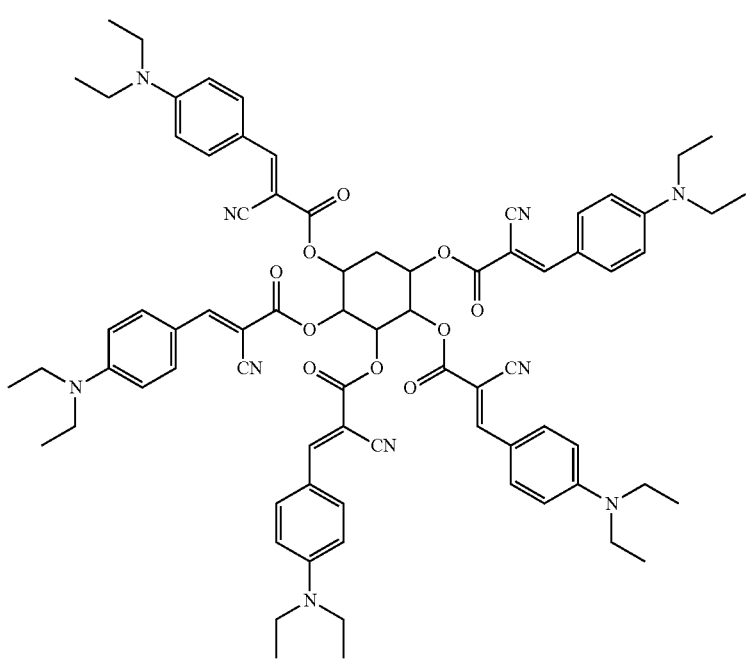

-continued
[Chemical Formula 18]
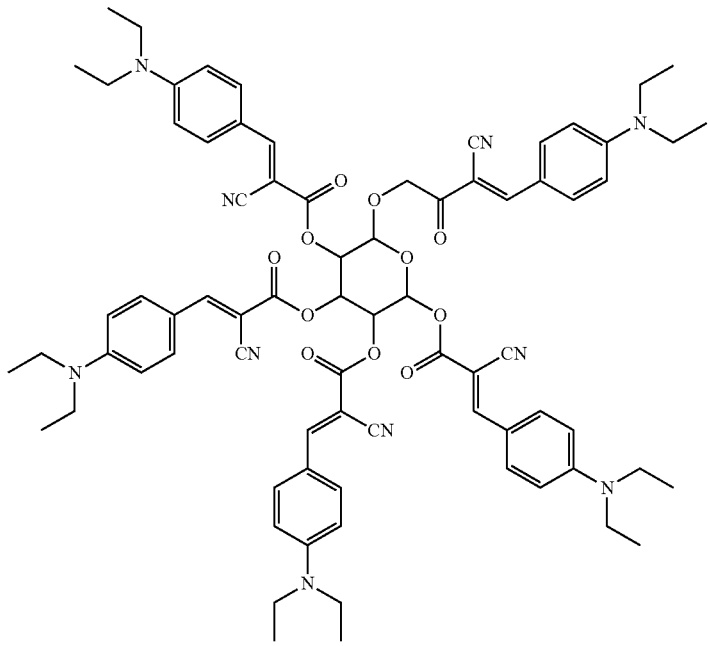
Compound No. 33
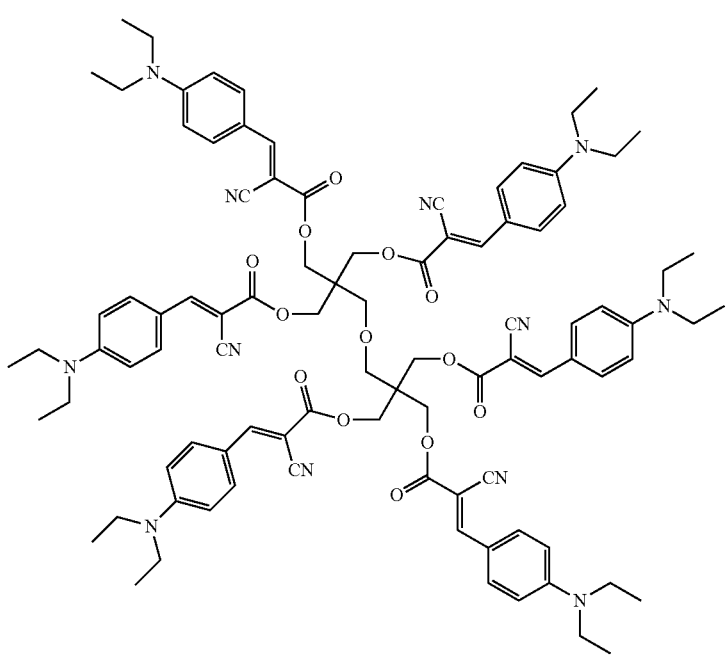
Compound No. 34

Compound No. 35
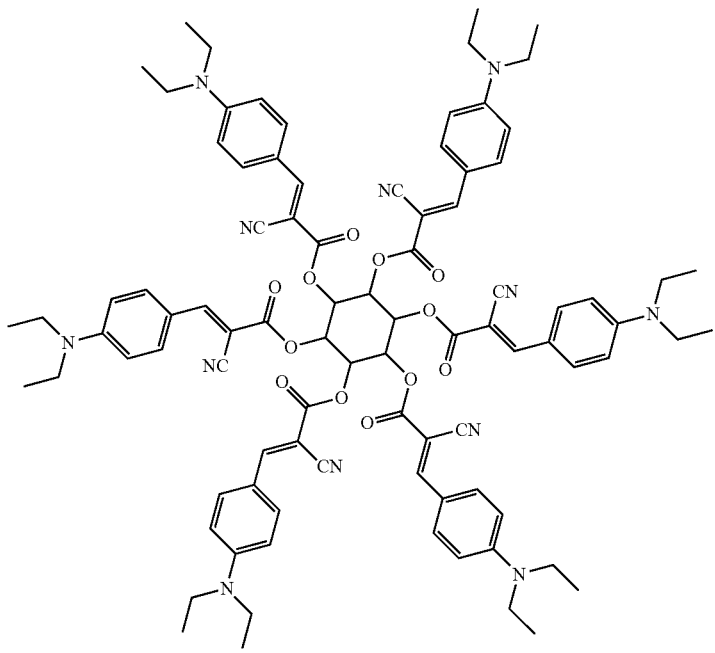
[Chemical Formula 19]
Compound No. 36
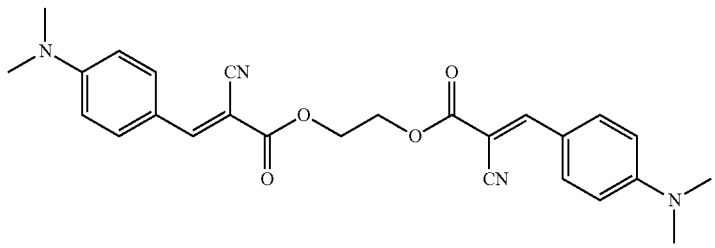
Compound No. 37
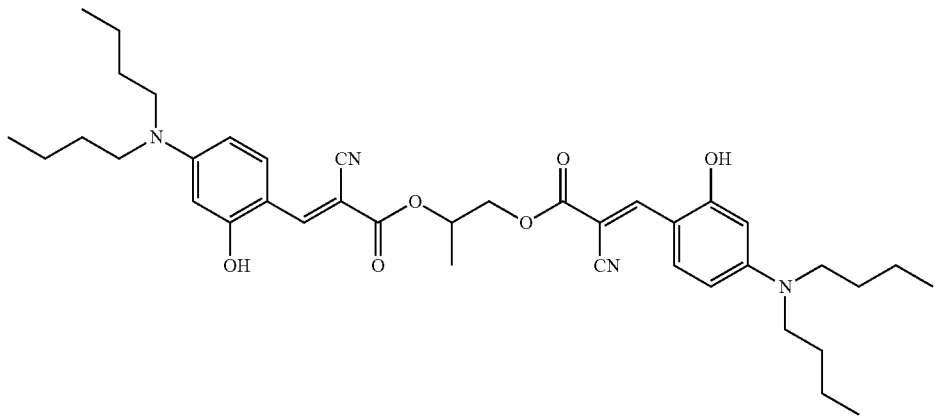
Compound No. 38
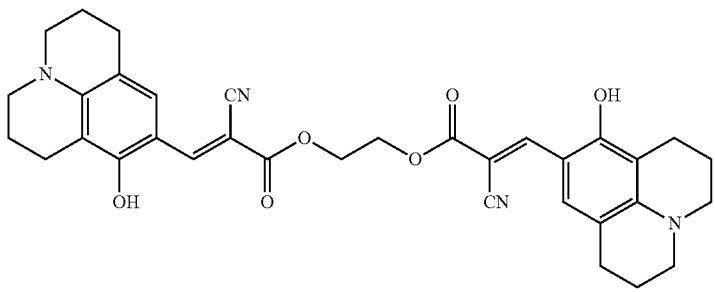

-continued
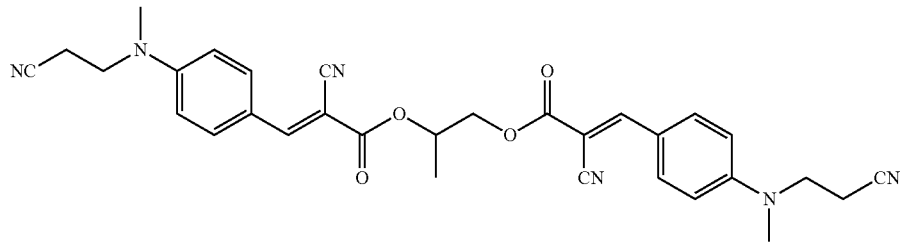
Compound No. 39
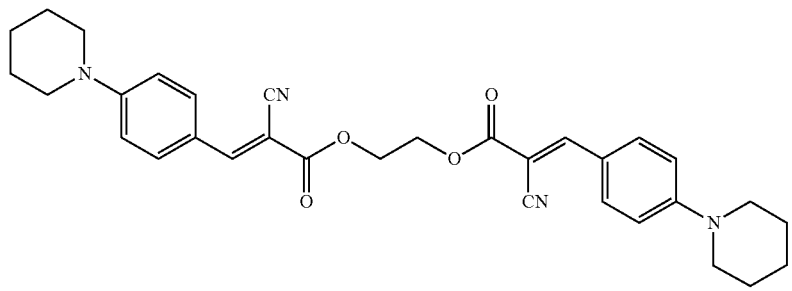
Compound No. 40
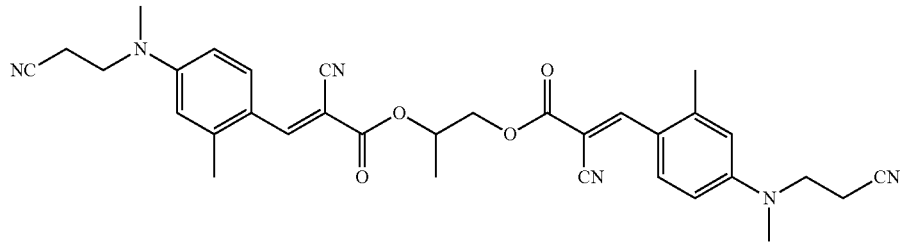
Compound No. 41
[Chemical Formula 20]
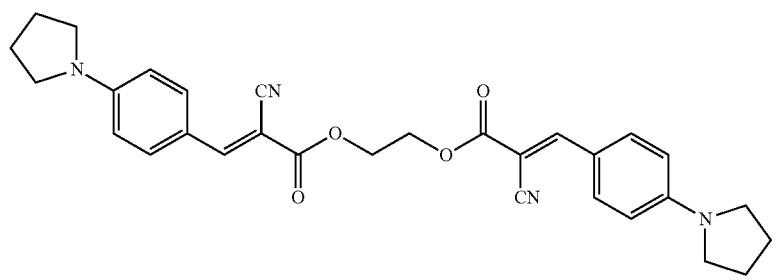
Compound No. 42
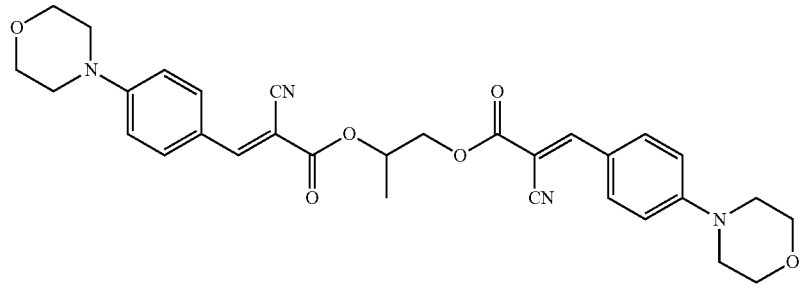
Compound No. 43

-continued
Compound No. 44
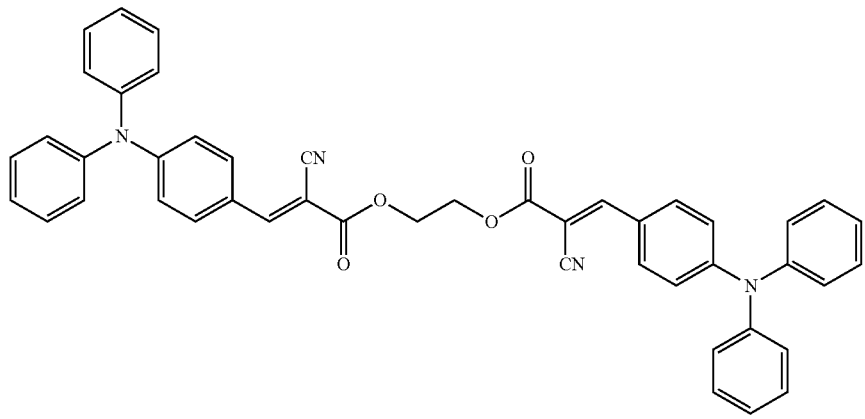
Compound No. 45
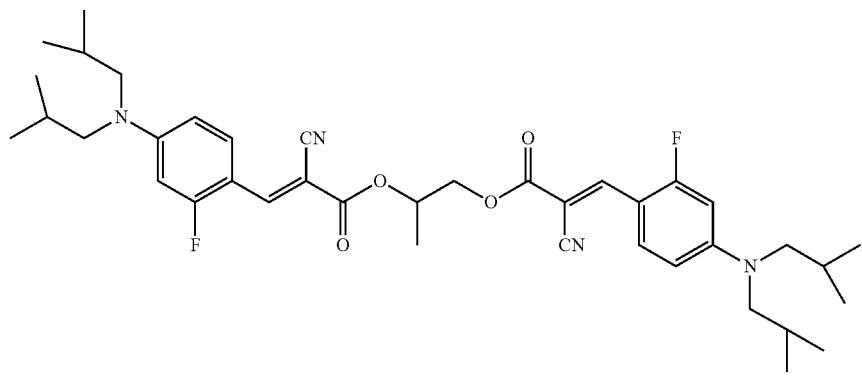
Compound No. 46
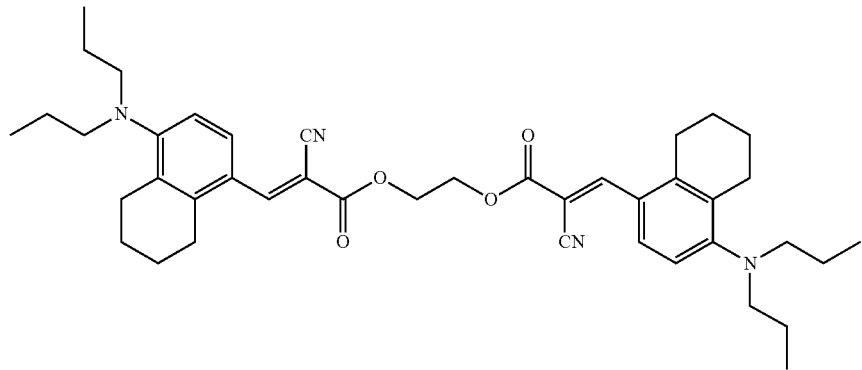
Compound No. 47
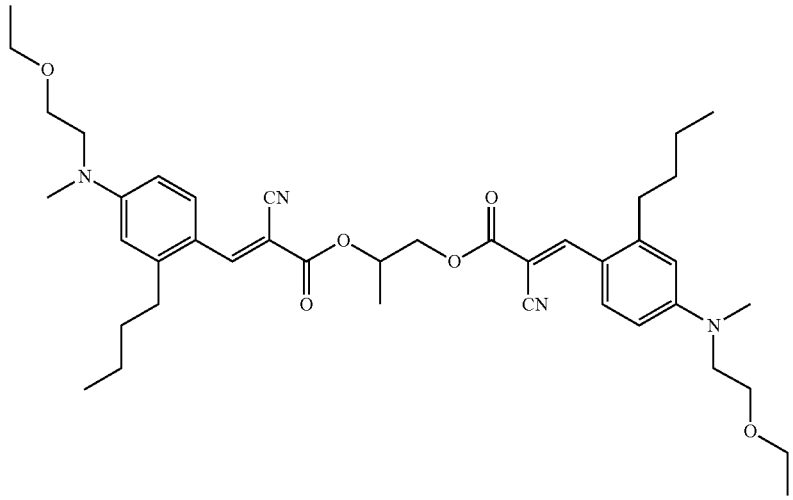

[Chemical Formula 21]
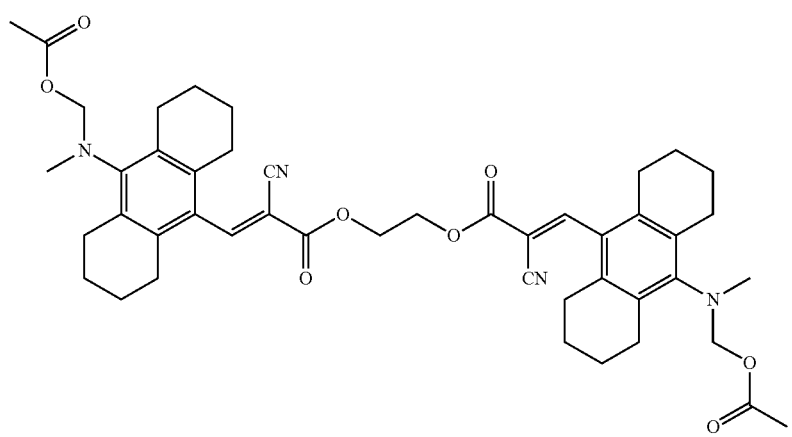
Compound No. 48
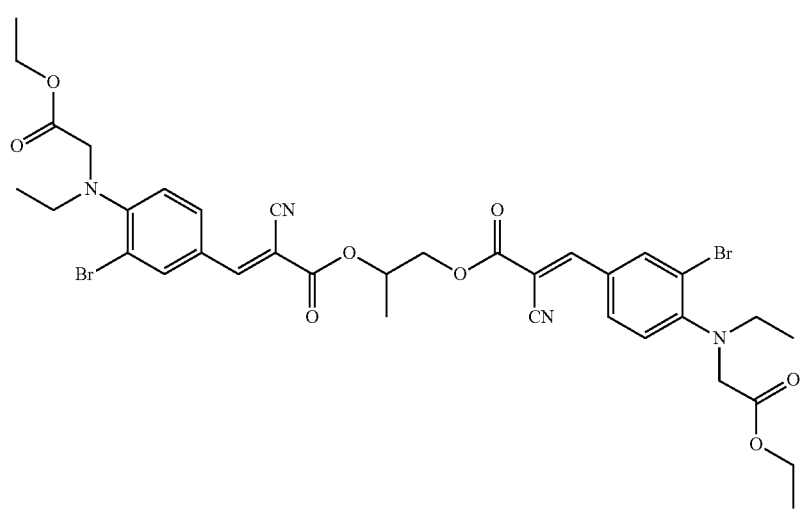
Compound No. 49
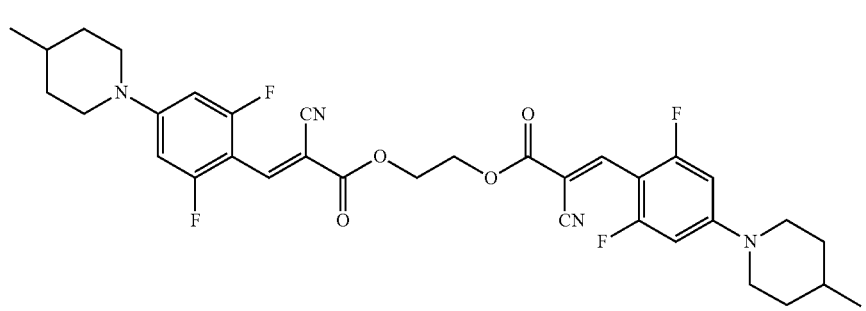
Compound No. 50
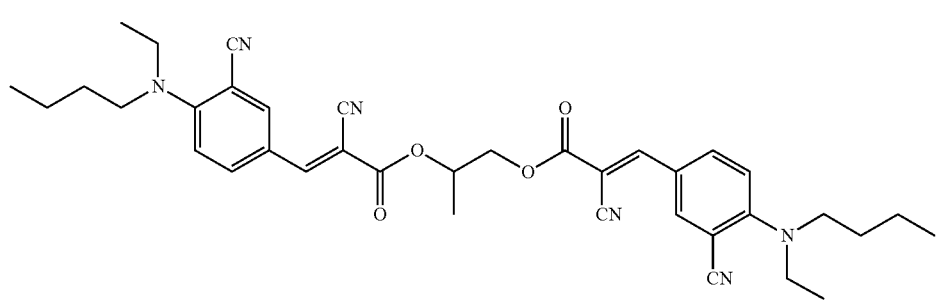
Compound No. 51

[Chemical Formula 21A]
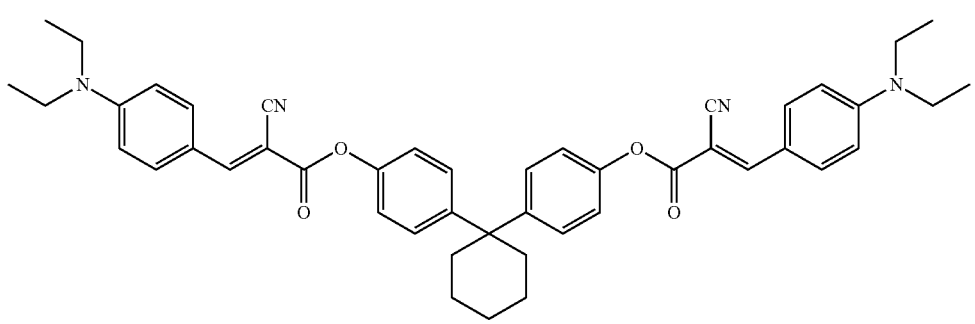
Compound No. 52
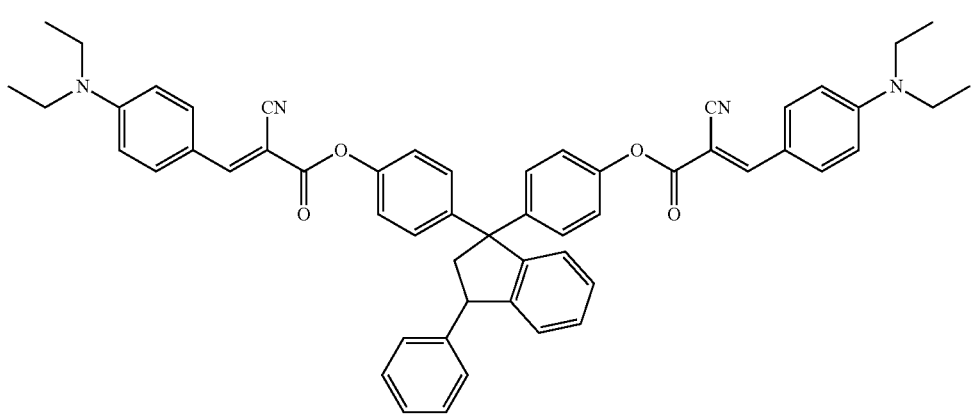
Comound No. 53
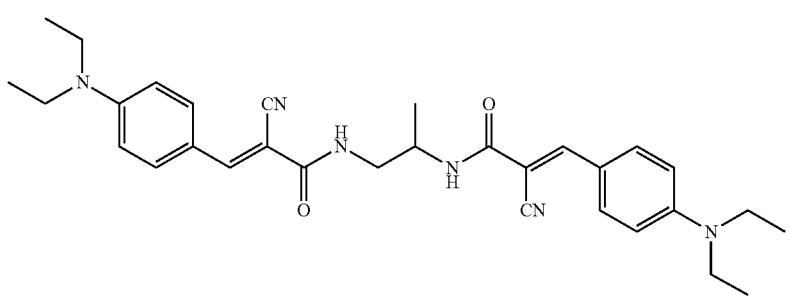
Compound No. 54
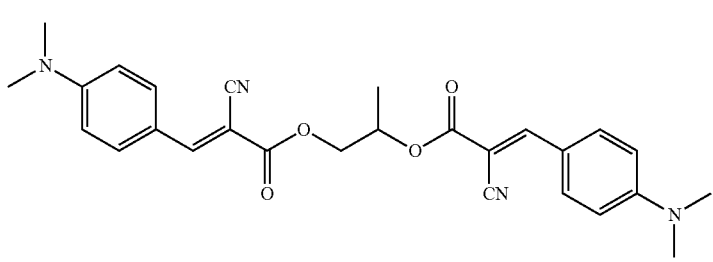
Compound No. 55
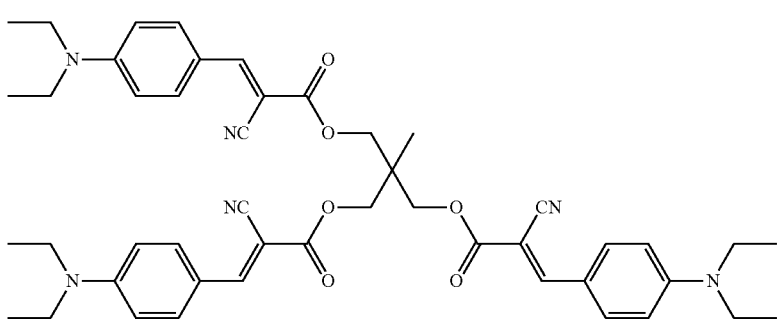
Compound No. 56

-continued
Compound No. 57
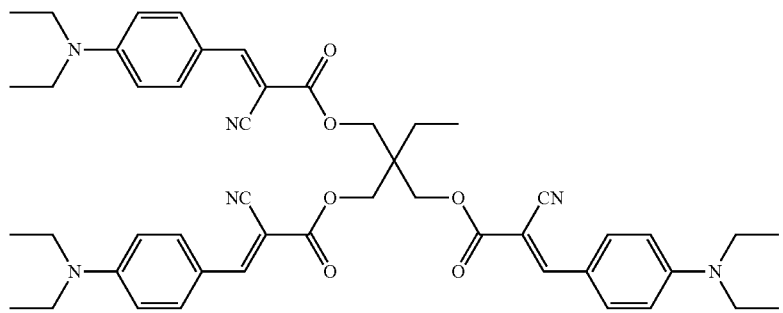
Compound No. 58
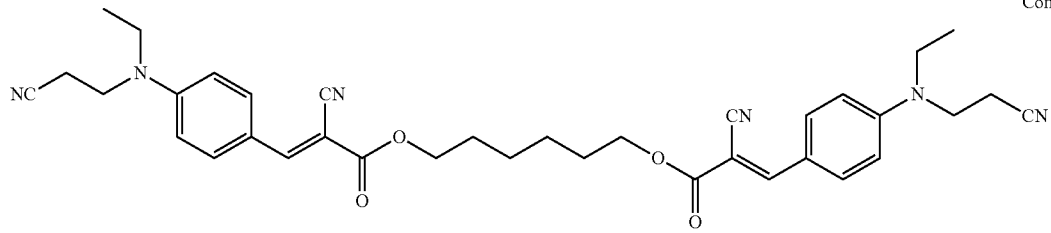
Compound No. 59
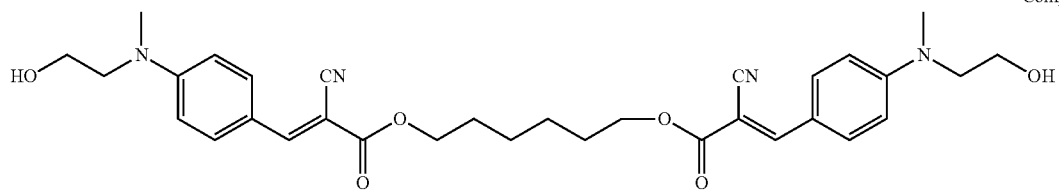
Compound No. 60
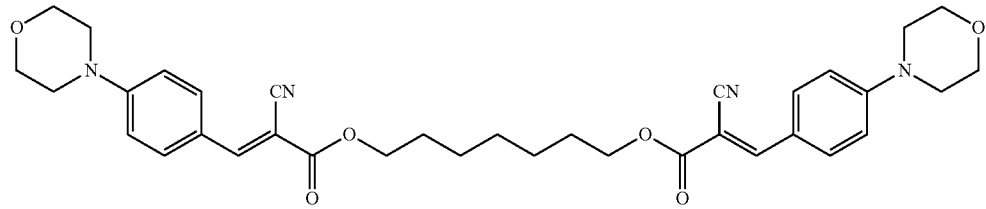
Compound No. 61
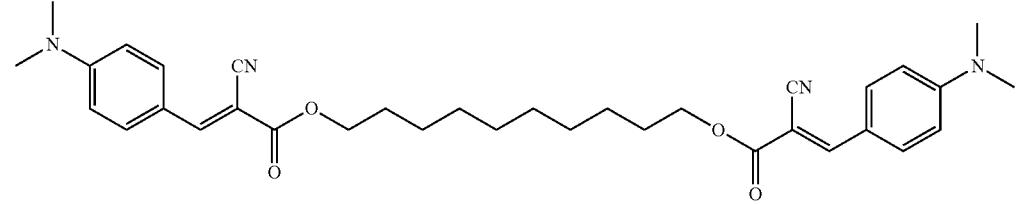
Compound No. 62
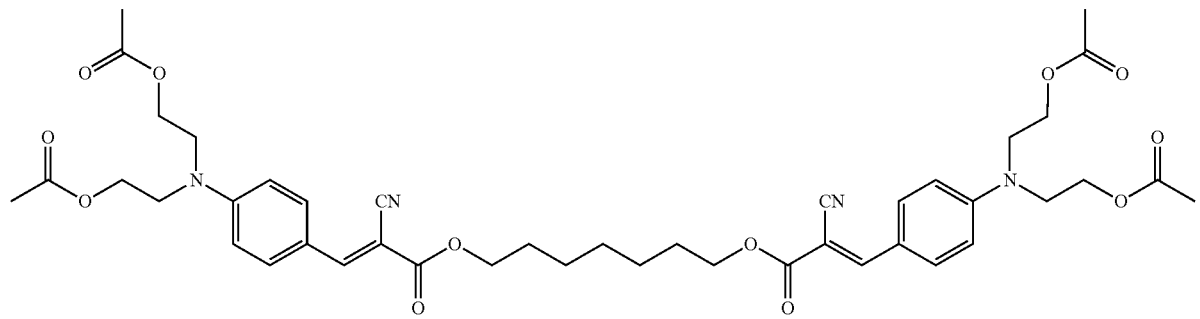

-continued
Compound No. 63
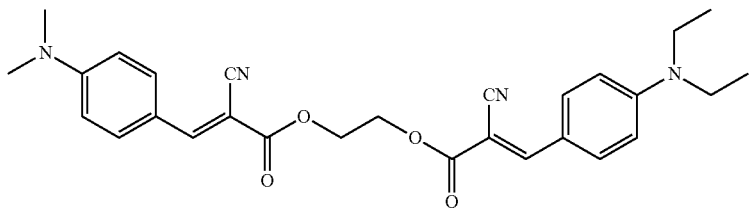
Compound No. 64
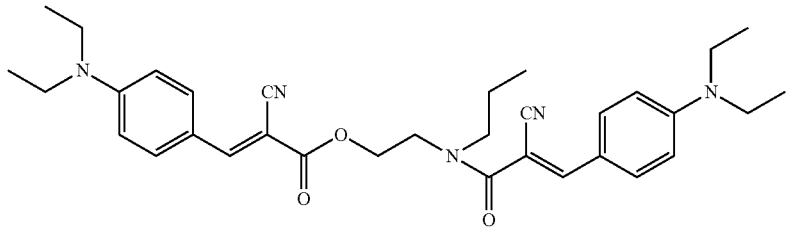
[Chemical Formula 21B]
Compound No. 65
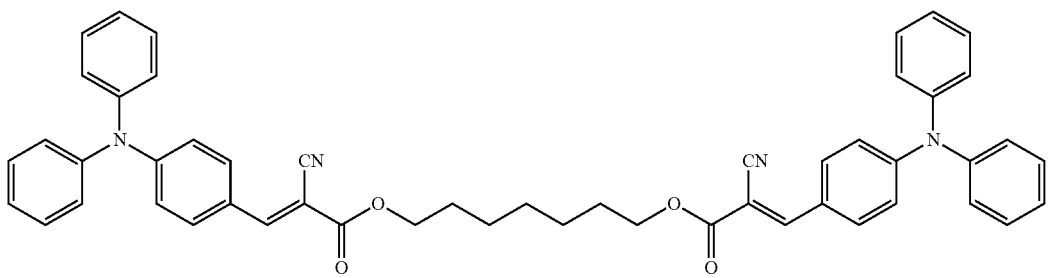
Compound No. 66
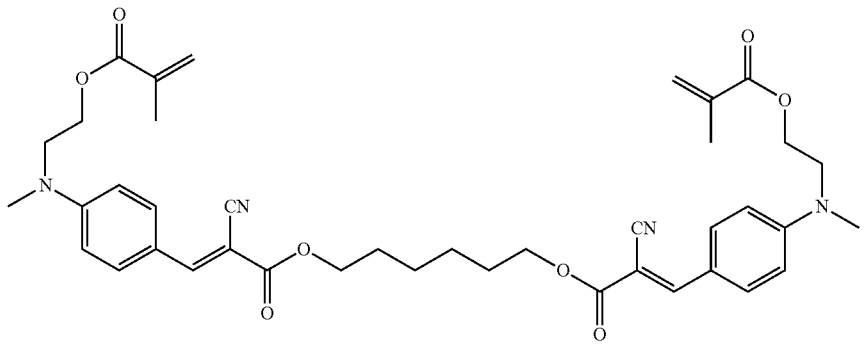
Compound No. 67
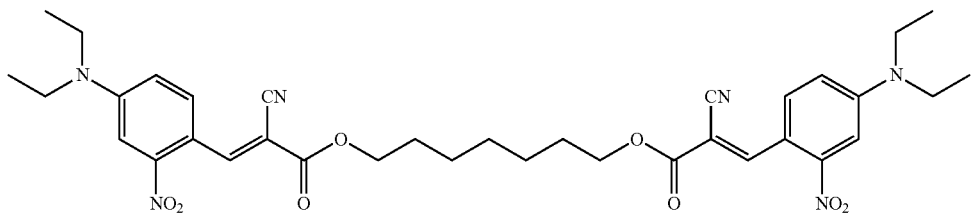
Compound No. 68
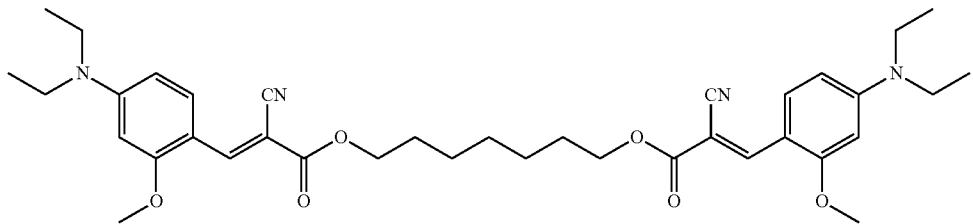

-continued
Compound No. 69
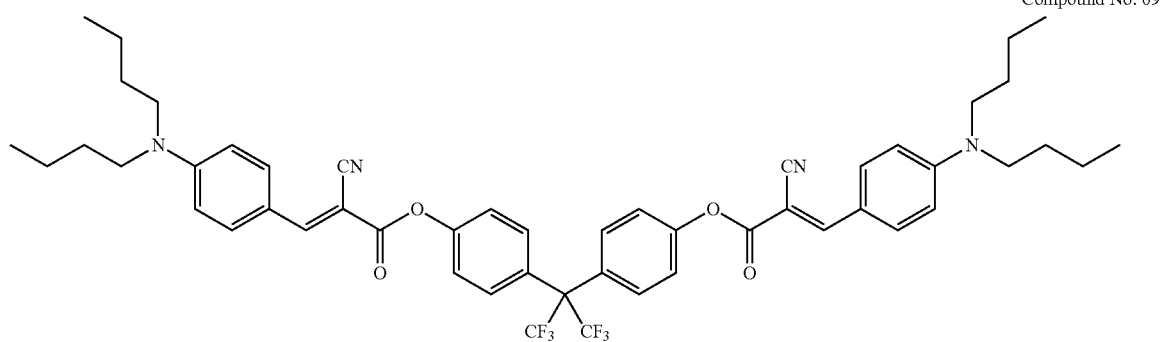
Compound No. 70
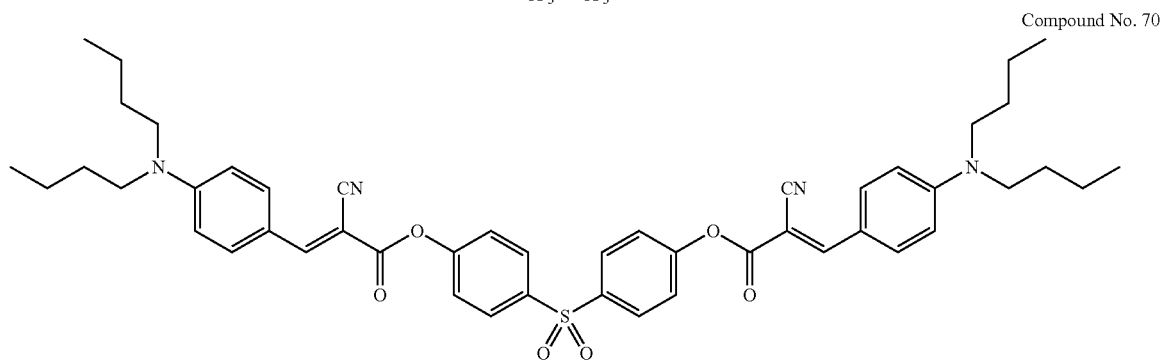
Compound No. 71
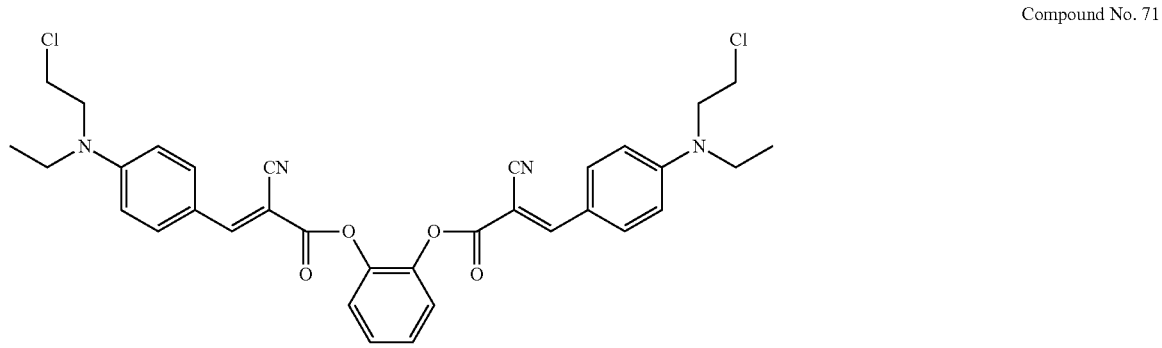
Compound No. 72
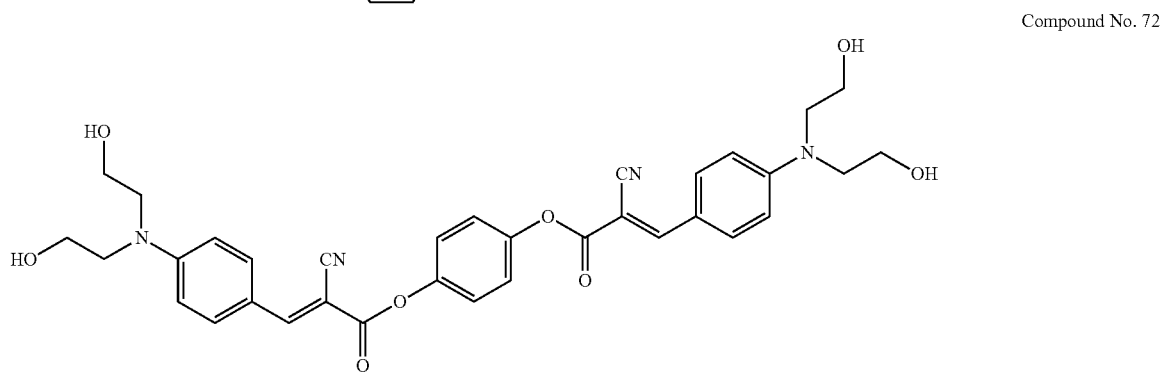
Compound No. 73
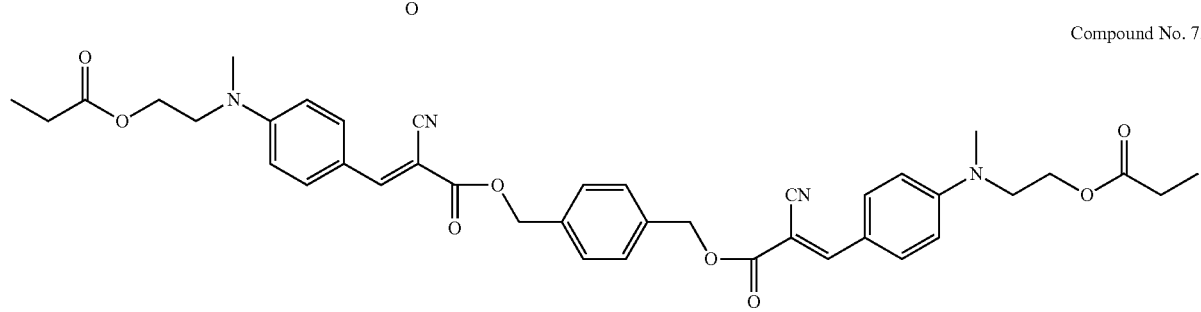

-continued
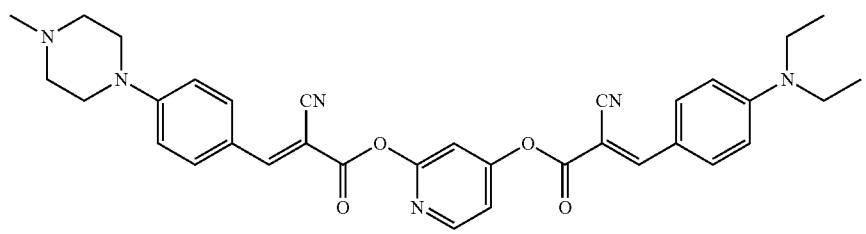
Compound No. 74
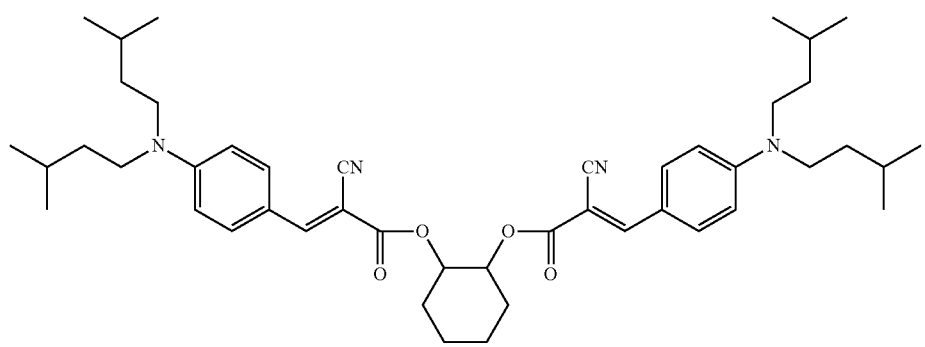
Compound No. 75
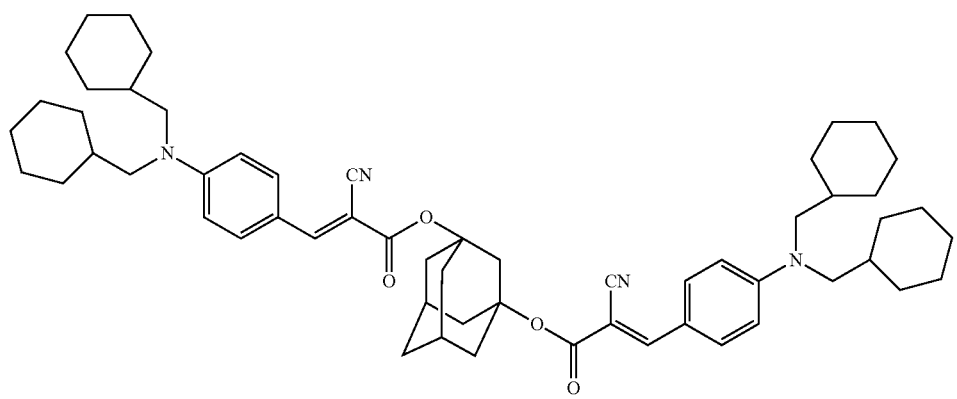
Compound No. 76
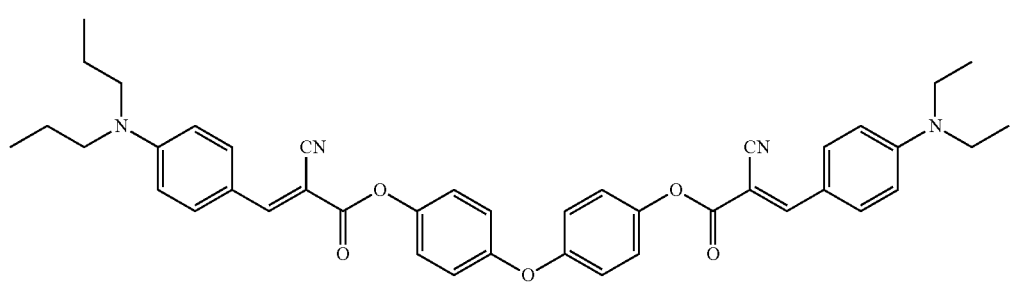
Compound No. 77
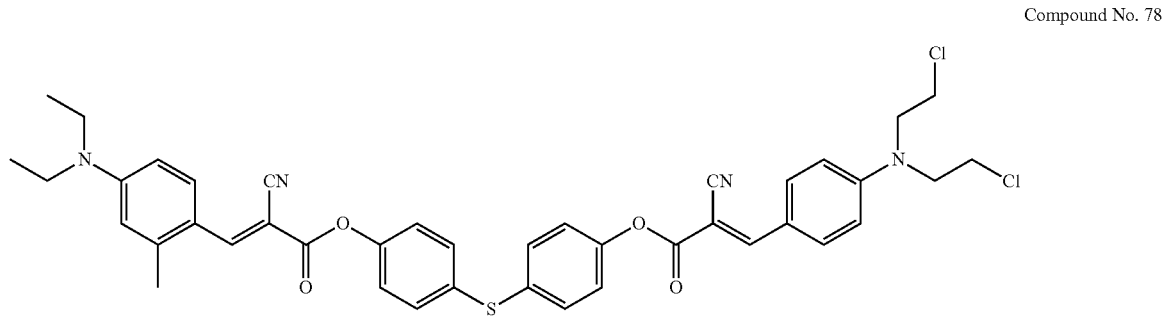
Compound No. 78

Compound No. 79
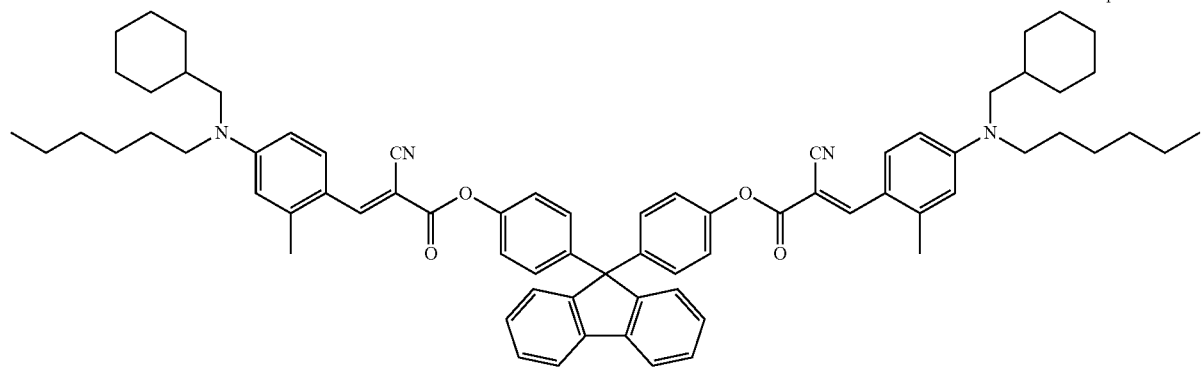
Compound No. 80
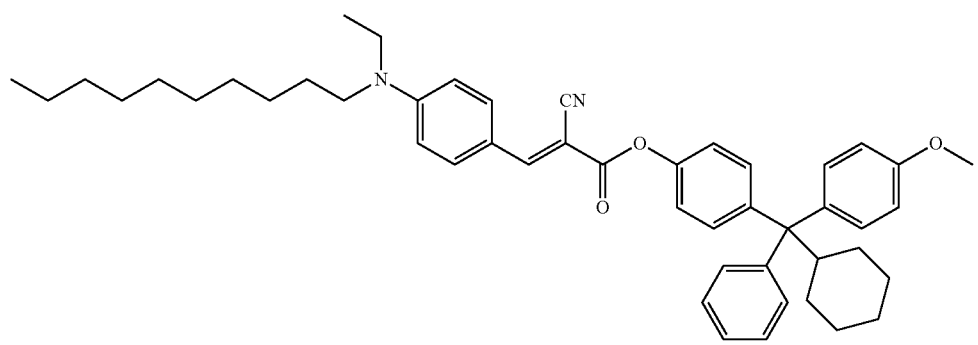
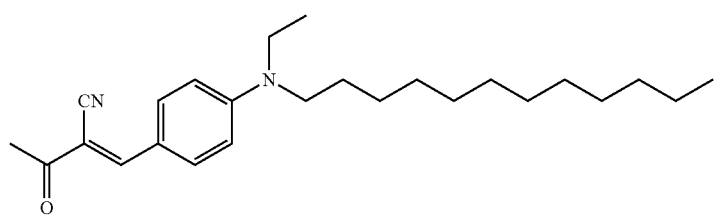
[Chemical Formula 21C]
Compound No. 81
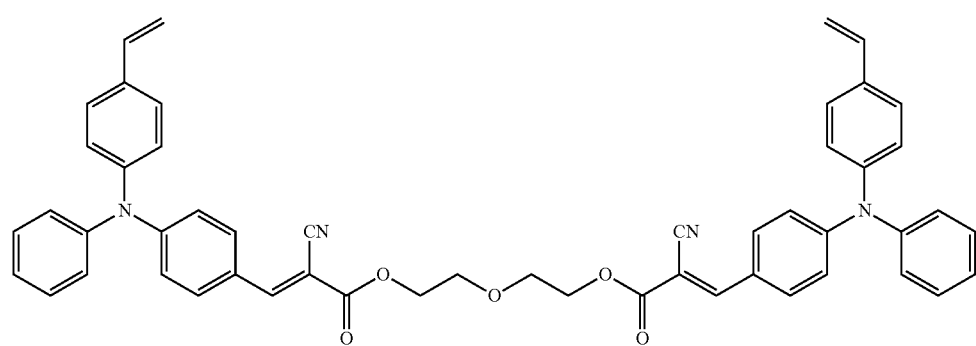

Compound No. 82
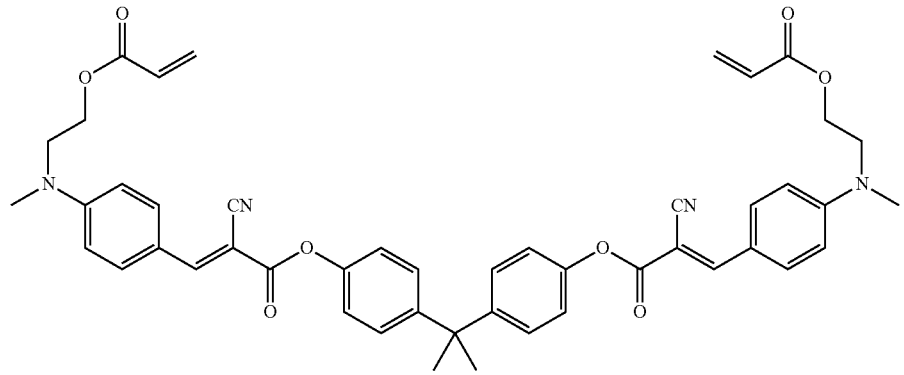
Compound No. 83
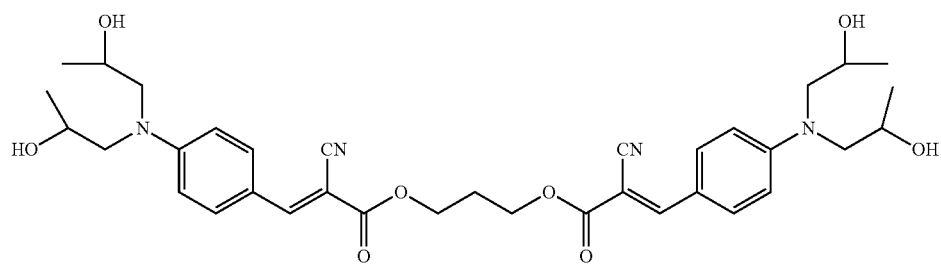
Compound No. 84
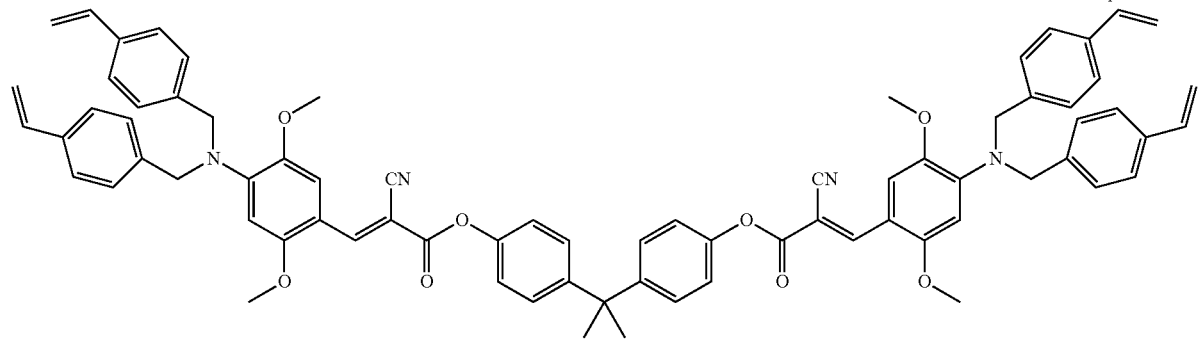
Compound No. 85
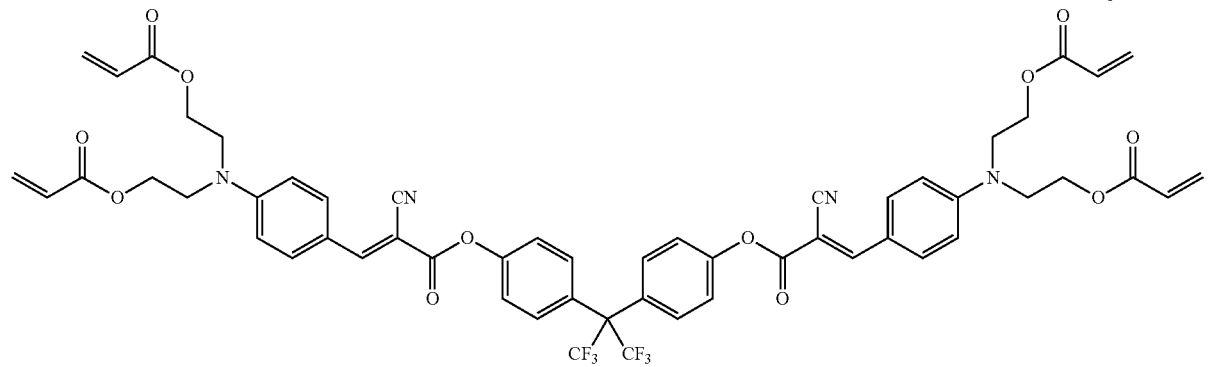

-continued
Compound No. 86
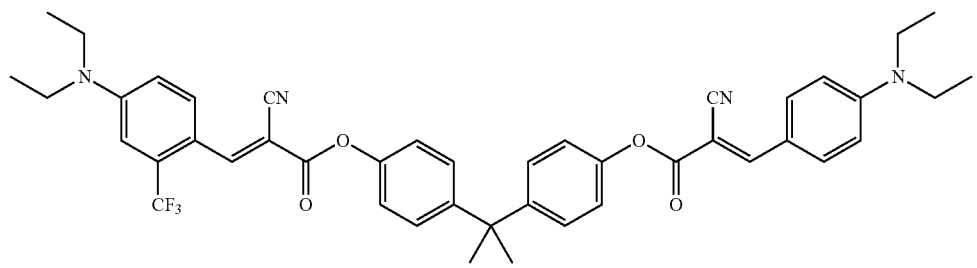
Compound No. 87
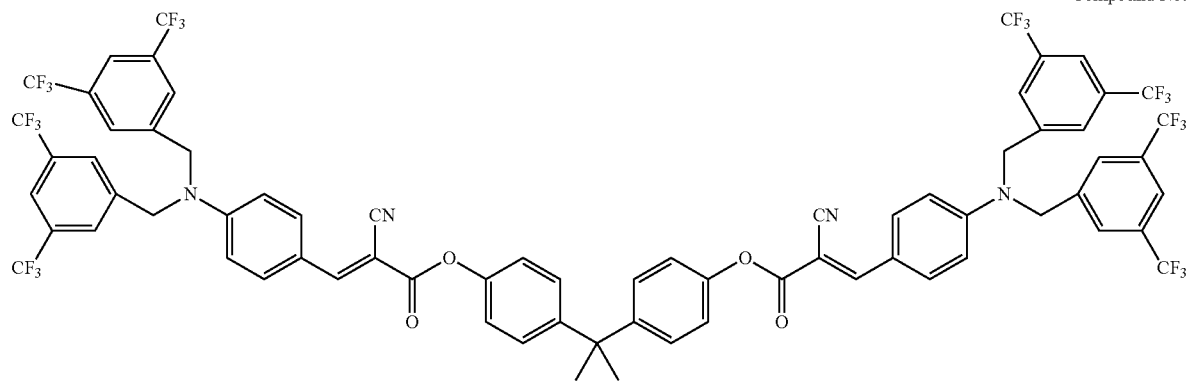
Compound No. 88
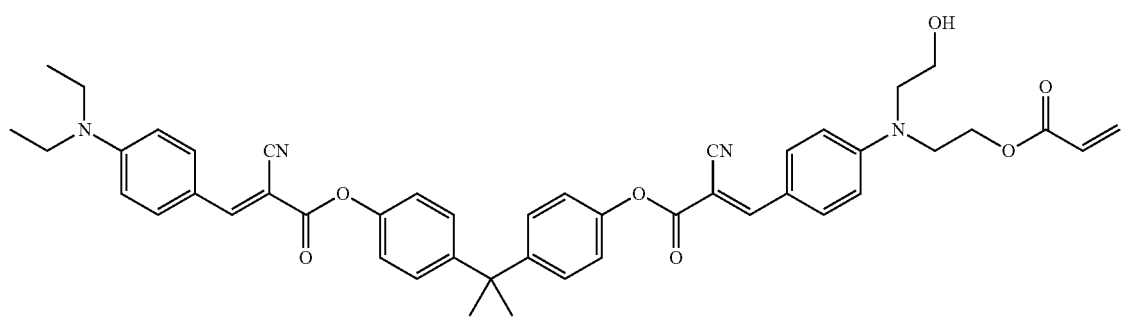
Compound No. 89
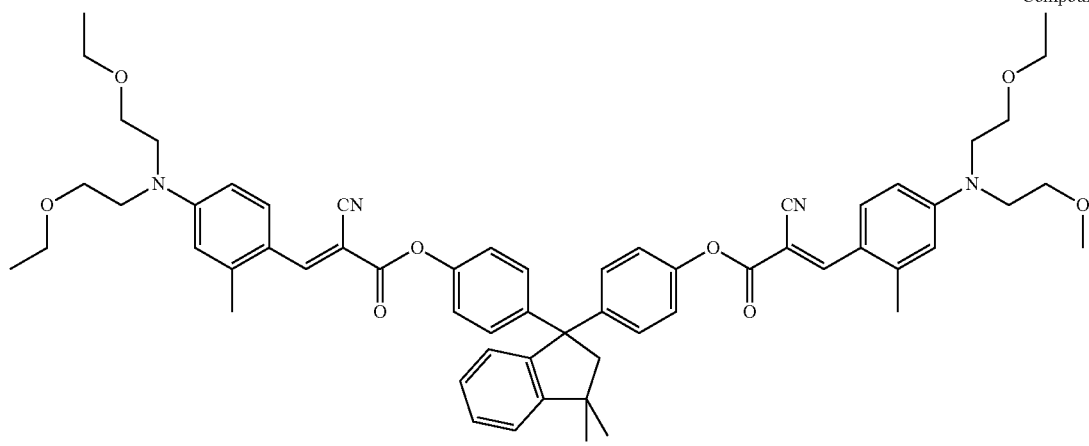

-continued
Compound No. 90
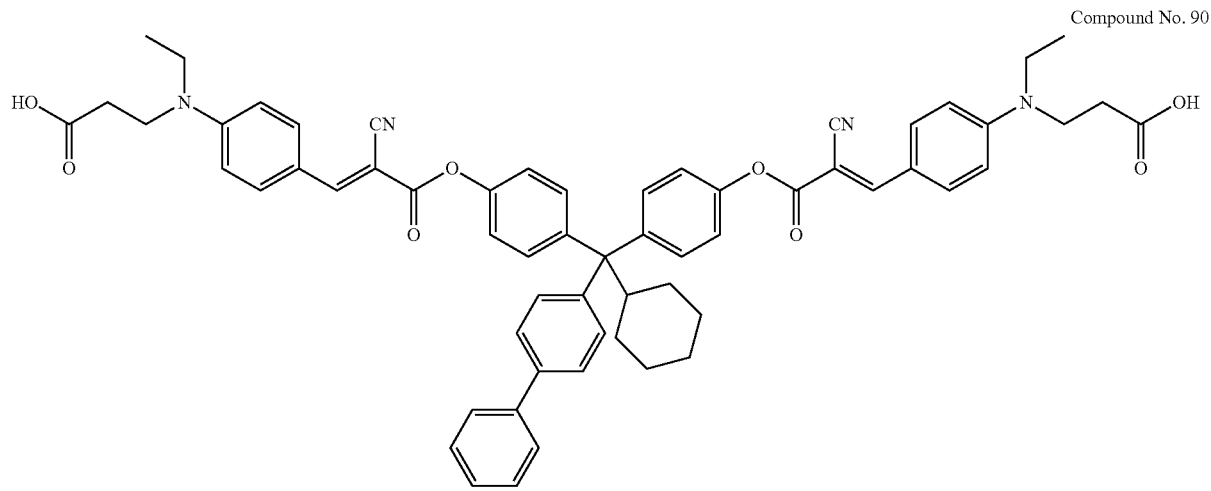
Compound No. 91
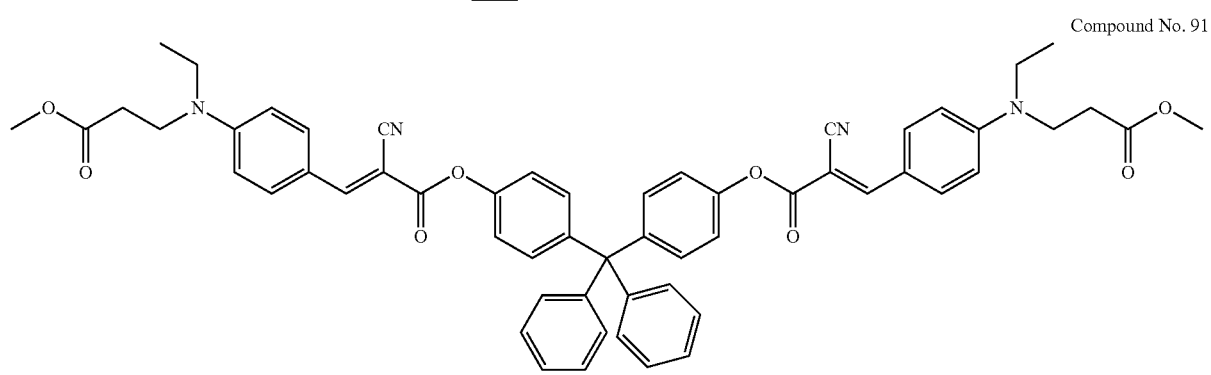
Compound No. 92
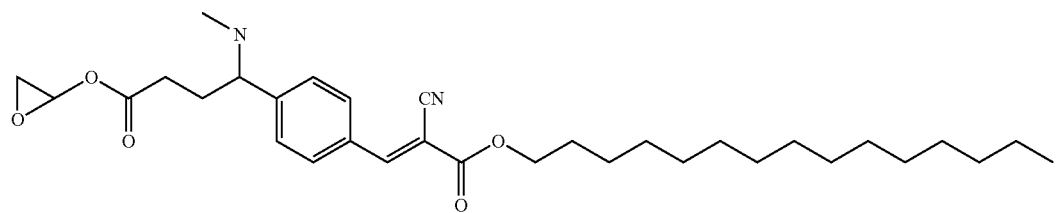
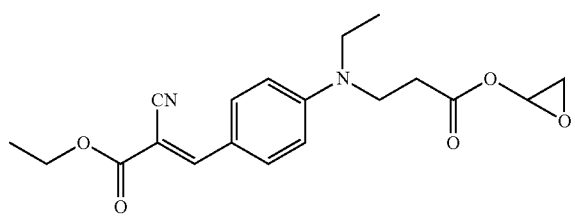
Compound No. 93
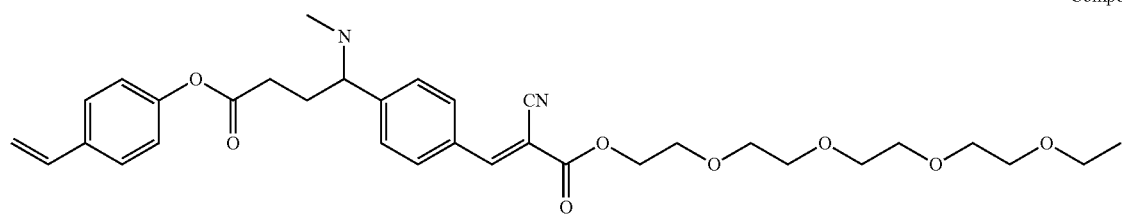

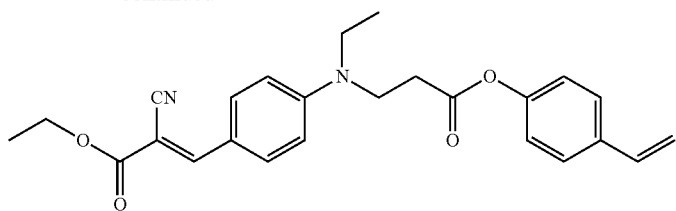
[Chemical Formula 21D]
Compound No. 94
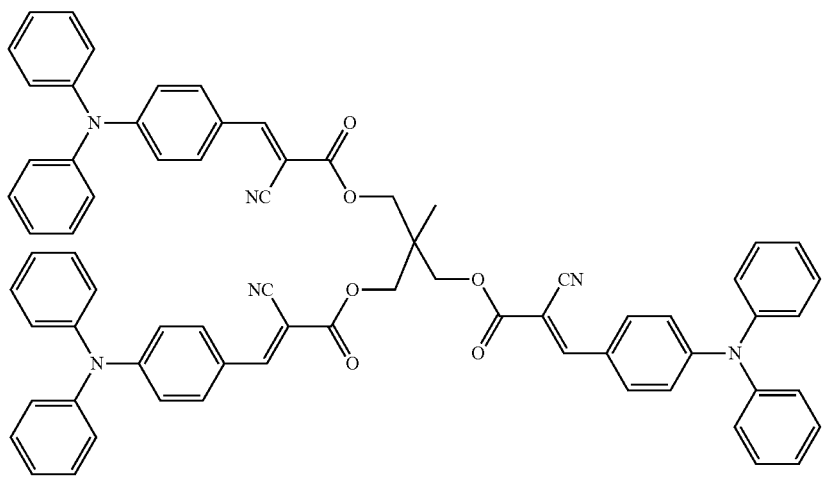
Compound No. 95
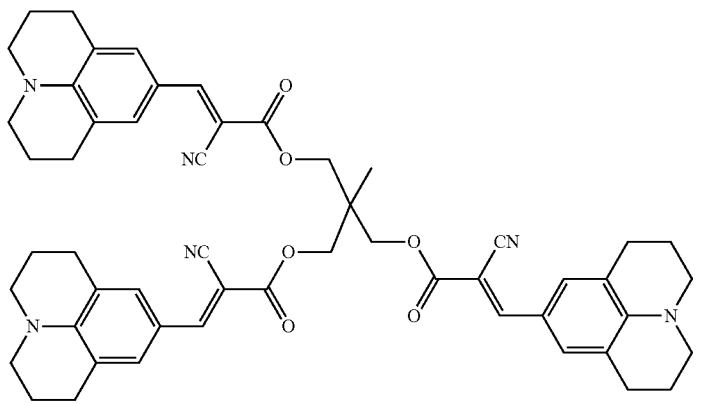
Compound No. 96
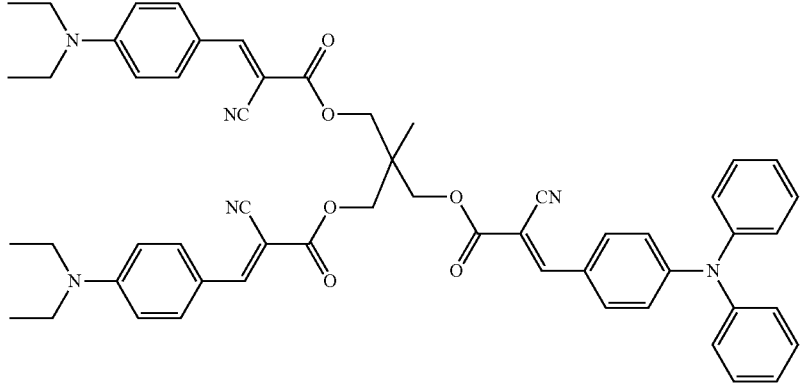

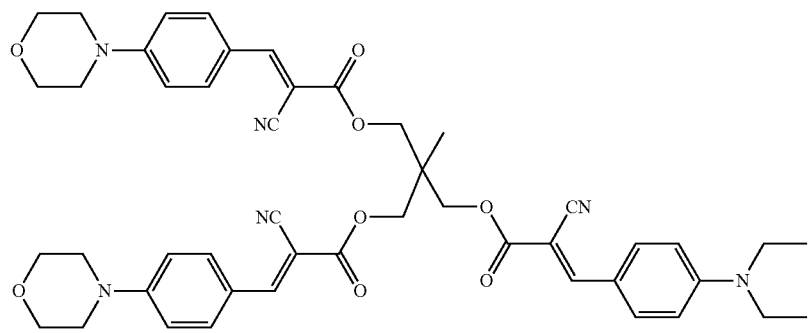
Compound No. 97
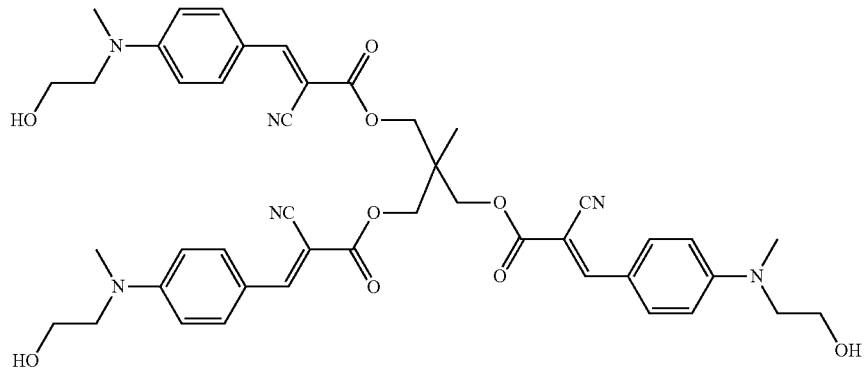
Compound No. 98
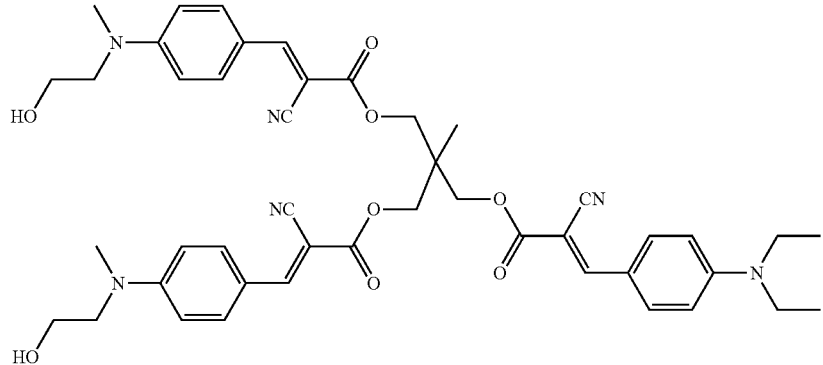
Compound No. 99
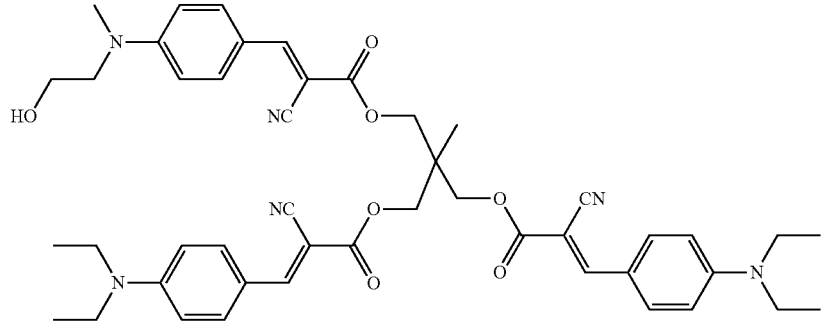
Compound No. 100

Compound No. 101
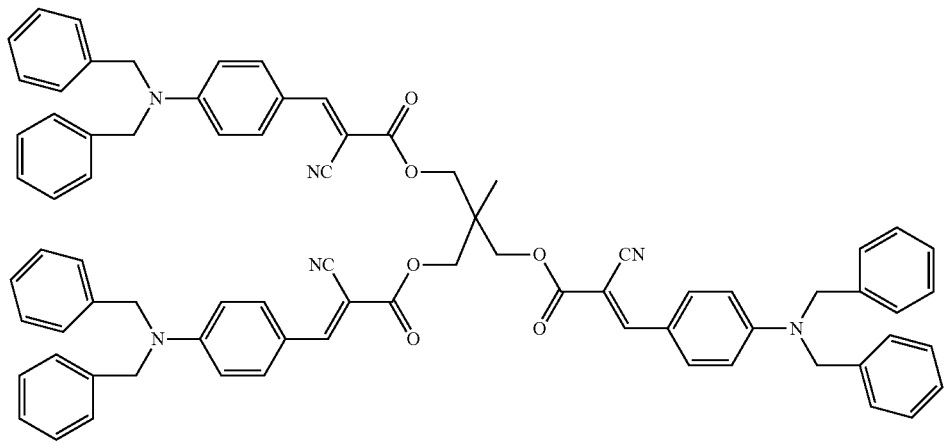
Compound No. 102
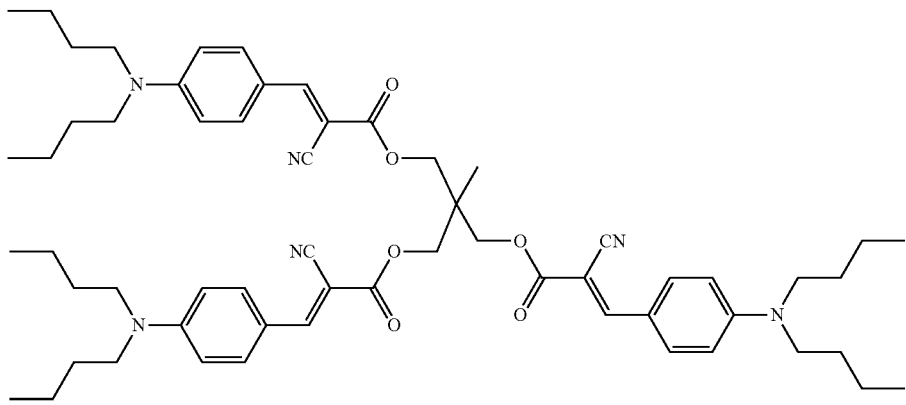
Compound No. 103
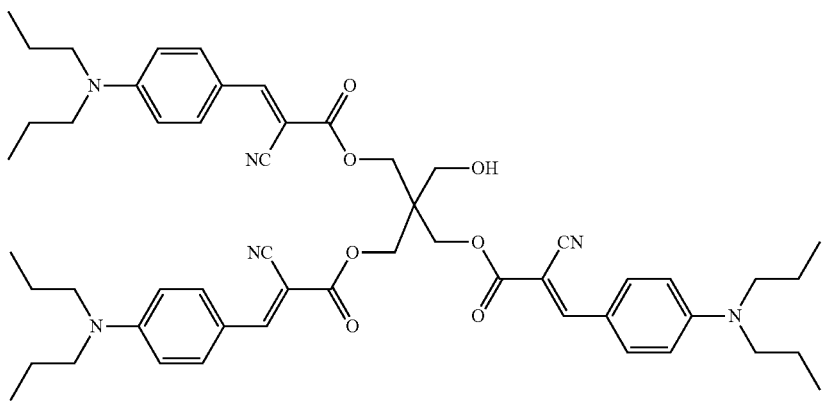
Compound No. 104
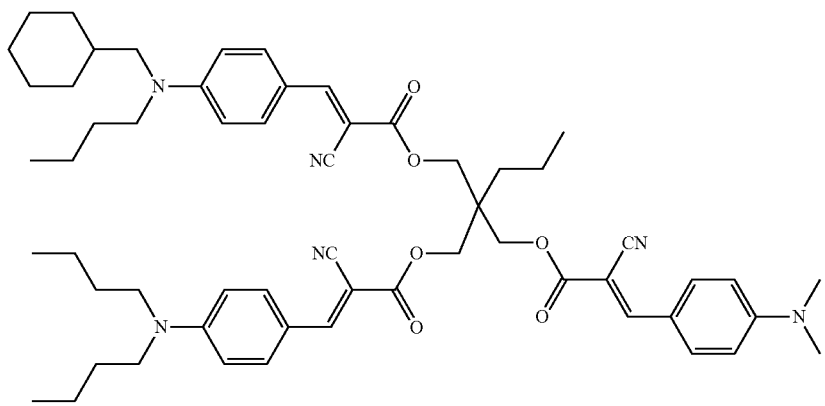

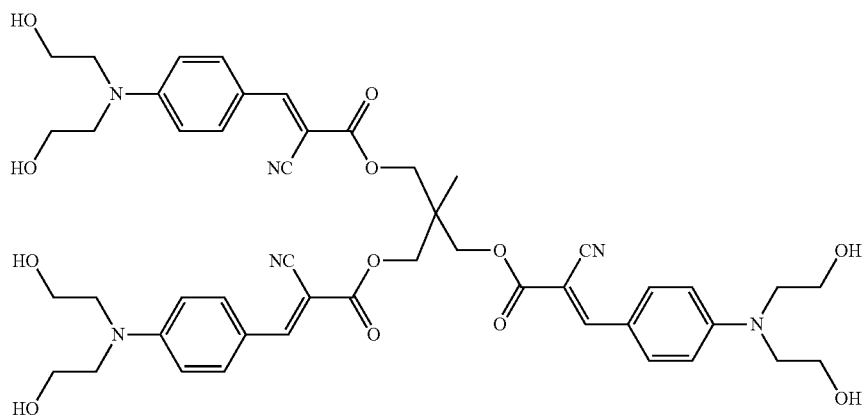
Compound No. 105
[Chemical Formula 21E]
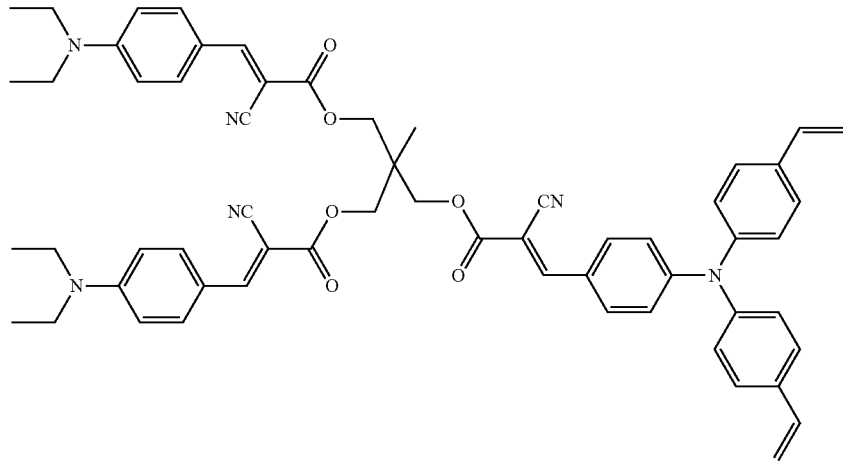
Compound No. 106
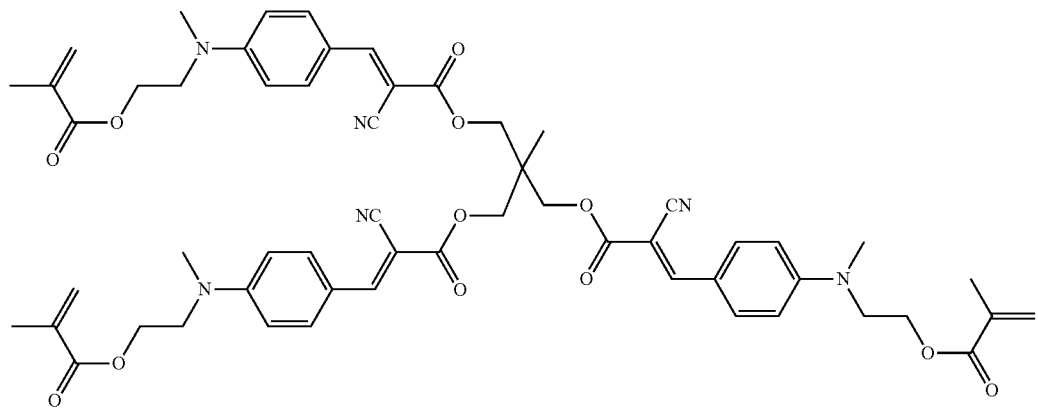
Compound No. 107

Compound No. 108
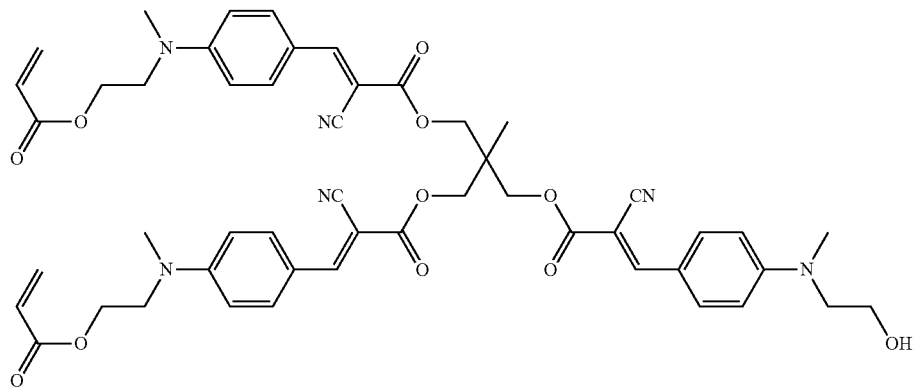
Compound No. 109
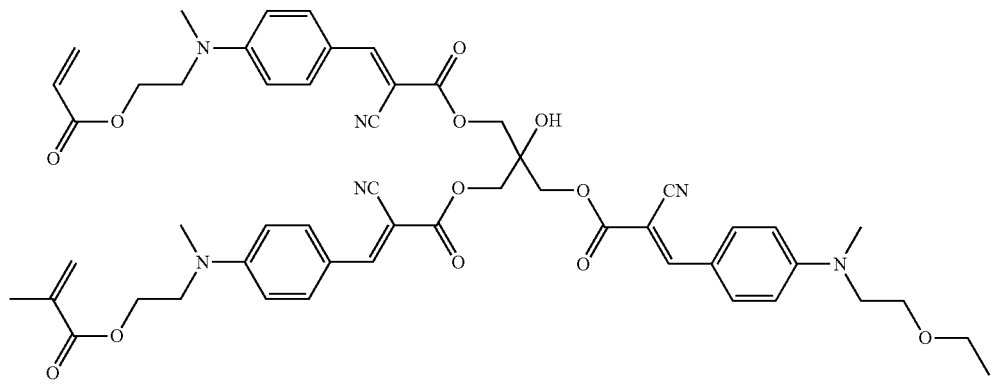
Compound No. 110
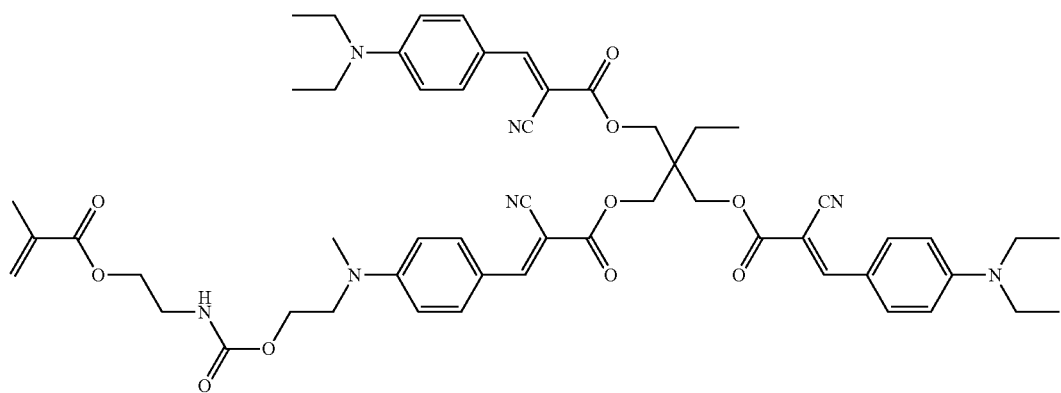
Compound No. 111
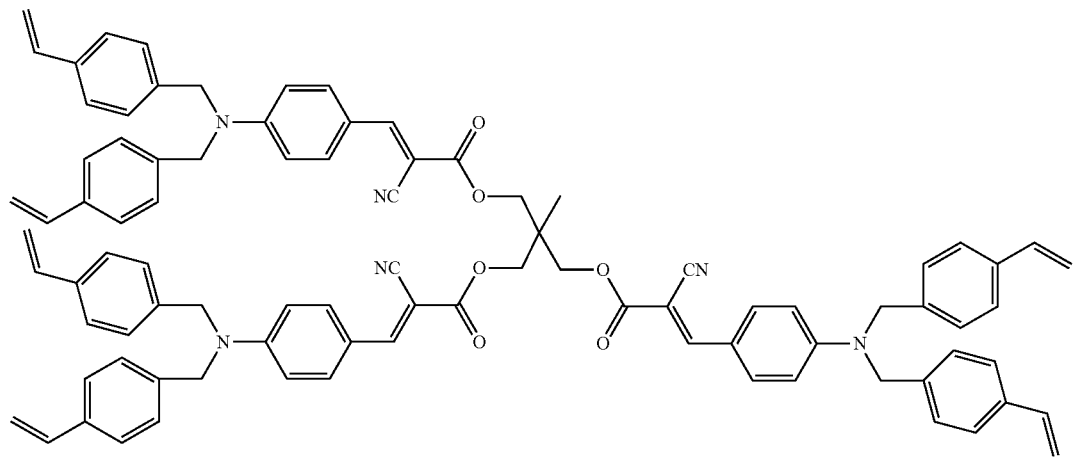

Compound No. 112
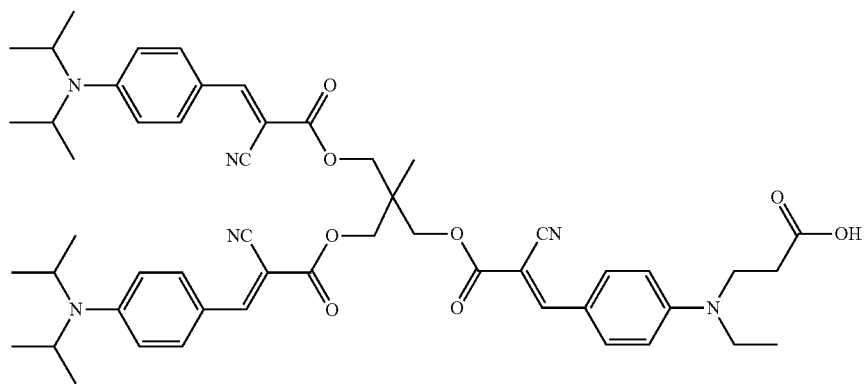
Compound No. 113
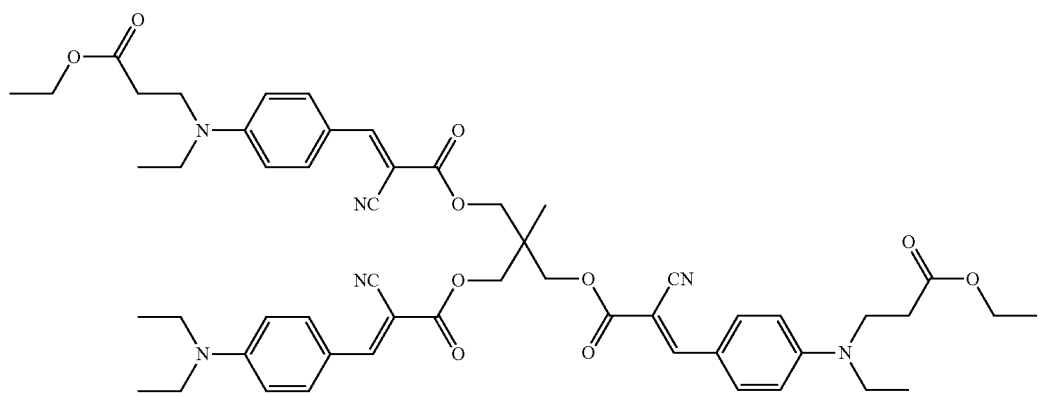
Compound No. 114
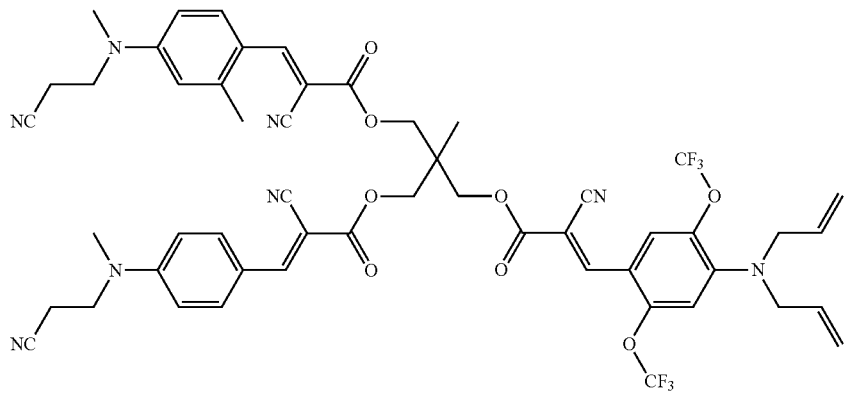

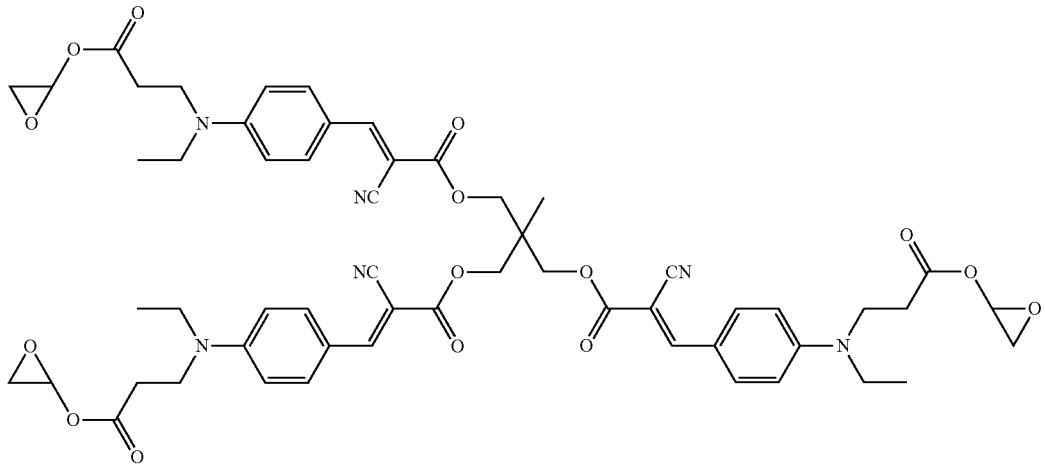

Compound No. 115

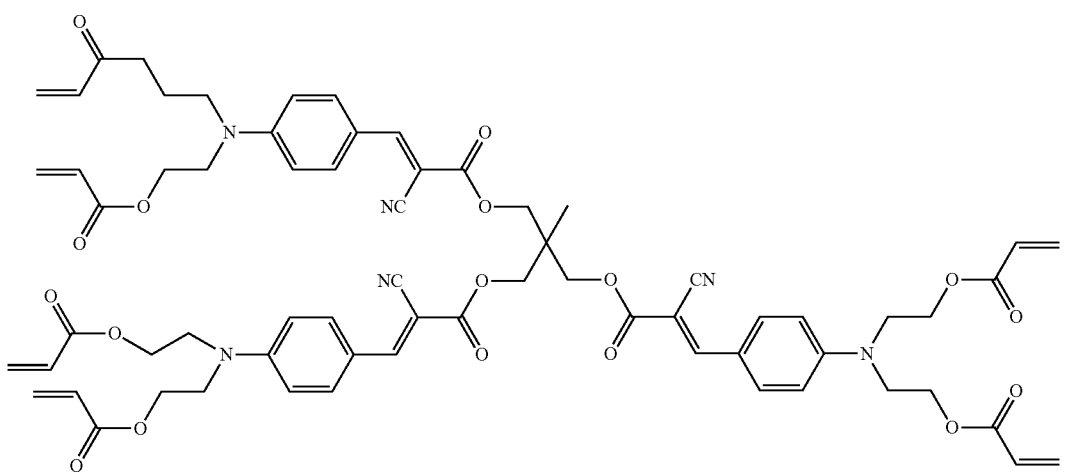

Compound No. 116

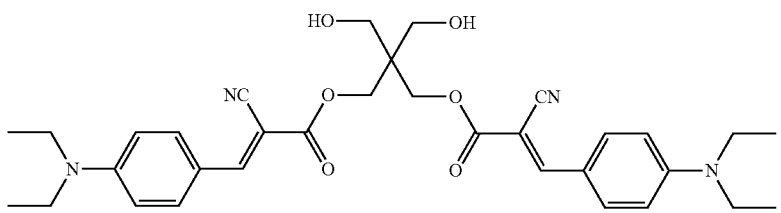

Compound No. 117

Although the method for the production of the compound represented by the above-mentioned general formula (1) is not specifically limited, the compound can be produced, for example, according to the following reaction formula 1 or 2.

Namely, in the case when the compound is produced according to the following reaction formula 1, the compound represented by the above-mentioned general formula (1) which is an ester form or amide form can be obtained by reacting a carboxylic acid (10) and 1-ethyl-3-(3-dimethylaminopropyl)carbodiimide hydrochloride (EDC) in pyridine, and then reacting with a multifunctional alcohol or multifunctional amine (11).

Furthermore, in the case when the compound is produced according to the following reaction formula 2, the compound represented by the above-mentioned general formula (1) which is an ester form or amide form can be obtained by reacting cyanoacetic acid, an alcohol (12) and a multifunctional alcohol or multifunctional amine (11) in the presence of p-toluenesulfonic acid in toluene to form a cyanoacetic acid ester (13), and reacting this with an aldehyde or ketone (14) in the presence of triethylamine in toluene.

Reaction Formula 1

[Chemical Formula 22]

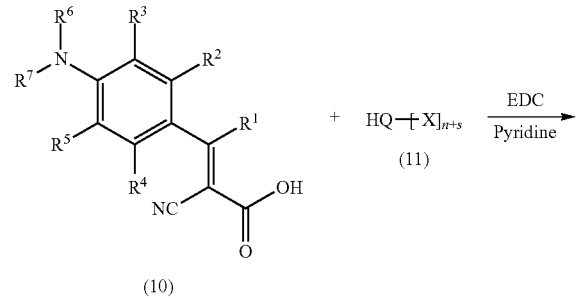

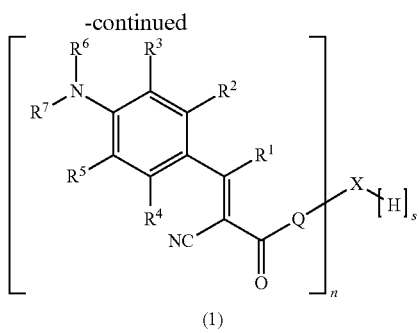

(1)

wherein $R^1$ to $R^7$, Q, X, n and s are the same as the groups represented by $R^1$ to $R^7$, Q, X, n and s in the above-mentioned general formula (1).

Reaction formula 2

[Chemical Formula 22A]

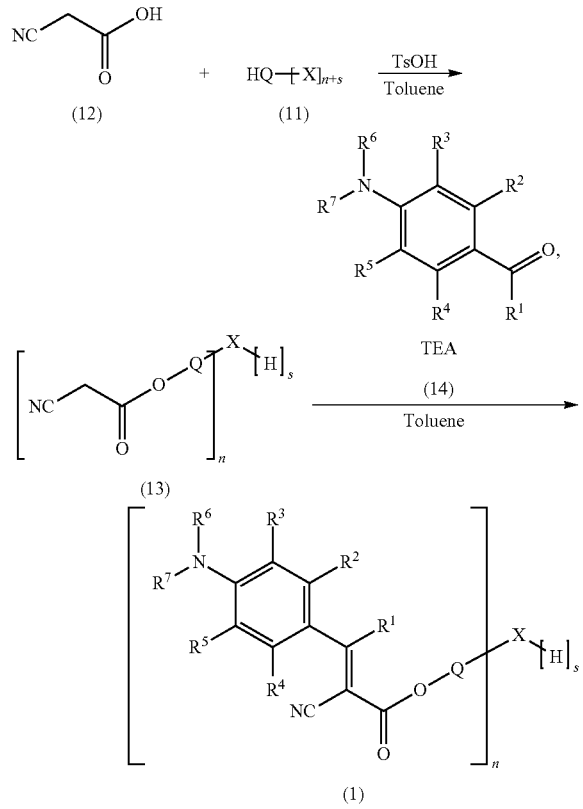

wherein $R^1$ to $R^7$, Q, X, n and s are the same as the groups represented by $R^1$ to $R^7$, Q, X, n and s in the above-mentioned general formula (1).

It is sufficient that the dye (A) of the present invention contains at least one kind of the compound represented by the above-mentioned general formula (1), and a single kind or a combination of plural kinds can be used. Alternatively, it is also possible to use known dyes besides the compound represented by the above-mentioned general formula (1). Examples of the known dyes may include dyes such as azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and the like, and these may also be used by mixing plural dyes.

In the dye (A) of the present invention, the content of the compound represented by the above-mentioned general formula (1) is preferably 50 to 100% by mass, more preferably 70 to 100% by mass. In the cases when the content of the compound represented by the above-mentioned general formula (1) is less than 50% by mass, solubility in a solvent may be decreased, or heat resistance may be decreased.

The dye (A) of the present invention is used as a coloring photosensitive composition and a coloring alkali-developable photosensitive composition explained below, and also used in optical filters used in displays and optical lenses, or photosensitive materials for silver halide pictures, dyed goods, coating materials, optical recording dyes and the like.

Next, the coloring photosensitive composition and coloring alkali-developable photosensitive composition (hereinafter simply referred to as a coloring composition) of the present invention will be explained. With respect to the matters that are not specifically explained, the explanations that have been made for the dye (A) of the present invention shall be suitably applied.

The coloring composition of the present invention contains the dye (A) of the present invention, (B) a polymerizable compound having an ethylenically unsaturated bond (including (B') an alkali-developable polymerizable compound having an ethylenically unsaturated bond) and (C) a photopolymerization initiator, and further contains (D) an inorganic pigment and/or an organic pigment as necessary.

<Dye (A)>

The dye (A) of the present invention is as mentioned above. In the coloring composition of the present invention, the content of the dye (A) of the present invention is preferably 0.01 to 50% by mass, more preferably 0.1 to 30% by mass in the coloring composition of the present invention. In the cases when the content of the dye (A) is less than 0.01% by mass, a color having a desired concentration cannot be obtained in the cured product of the present invention, and in the cases when the content is more than 50% by mass, precipitation of the dye (A) may occur in the coloring composition.

<Polymerizable Compound Having Ethylenically Unsaturated Bond (B)>

The above-mentioned polymerizable compound having an ethylenically unsaturated bond (B) is not specifically limited and compounds that have been conventionally used in photosensitive compositions can be used, and examples may include unsaturated aliphatic hydrocarbons such as ethylene, propylene, butylene, isobutylene, vinyl chloride, vinylidene chloride, vinylidene fluoride and tetrafluoroethylene; (meth) acrylic acid, α-chloroacrylic acid, itaconic acid, maleic acid, citraconic acid, fumaric acid, Himic acid, crotonic acid, isocrotonic acid, vinylacetic acid, allylacetic acid, cinnamic acid, sorbic acid, mesaconic acid, mono(meth)acrylates of polymers having a carboxy group and a hydroxyl group at both terminals such as mono[2-(meth)acryloyloxyethyl]succinate, mono[2-(meth)acryloyloxyethyl]phthalate, and ω-carboxypolycaprolactone mono(meth)acrylate, hydroxyethyl(meth)acrylate-maleates, hydroxypropyl(meth)acrylate-maleates and dicyclopentadiene-maleates and unsaturated polybasic acids such as multifunctional (meth)acrylates having one carboxyl group and two or more (meth)acryloyl groups; esters of an unsaturated monobasic acid and a polyvalent alcohol or a polyvalent phenol such as 2-hydroxyethyl (meth)acrylate, 2-hydroxypropyl(meth)acrylate, glycidyl (meth)acrylate, the following compounds No. 121 to No. 124, methyl(meth)acrylate, butyl(meth)acrylate, isobutyl(meth)

acrylate, t-butyl(meth)acrylate, cyclohexyl(meth)acrylate, n-octyl(meth)acrylate, isooctyl(meth)acrylate, isononyl (meth)acrylate, stearyl(meth)acrylate, lauryl(meth)acrylate, methoxyethyl(meth)acrylate, dimethylaminomethyl(meth) acrylate, dimethylaminoethyl(meth)acrylate, aminopropyl (meth)acrylate, dimethylaminopropyl(meth)acrylate, ethoxyethyl(meth)acrylate, poly(ethoxy)ethyl(meth)acrylate, butoxyethoxyethyl(meth)acrylate, ethylhexyl(meth) acrylate, phenoxyethyl(meth)acrylate, tetrahydrofuryl(meth) acrylate, vinyl(meth)acrylate, allyl(meth)acrylate, benzyl (meth)acrylate, ethylene glycol di(meth)acrylate, diethylene glycol di(meth)acrylate, triethylene glycol di(meth)acrylate, polyethylene glycol di(meth)acrylate, propylene glycol di(meth)acrylate, 1,4-butanediol di(meth)acrylate, 1,6-hexanediol di(meth)acrylate, trimethylolethane tri(meth)acrylate, trimethylolpropane tri(meth)acrylate, dipentaerythritol penta(meth)acrylate, dipentaerythritol hexa(meth)acrylate, pentaerythritol tetra(meth)acrylate, pentaerythritol tri(meth) acrylate, tricyclodecanedimethylol di(meth)acrylate, tri [(meth)acryloylethyl]isocyanurate and polyester (meth)acrylate oligomers; metal salts of unsaturated polybasic acids such as zinc (meth)acrylate and magnesium (meth)acrylate; acid anhydrides of unsaturated polybasic acids such as maleic anhydride, itaconic anhydride, citraconic anhydride, methyltetrahydrophthalic anhydride, tetrahydrophthalic anhydride, trialkyltetrahydrophthalic anhydride, 5-(2,5-dioxotetrahydrofuryl)-3-methyl-3-cyclohexene-1,2-dicarboxylic anhydride, an adduct of trialkyltetrahydrophthalic anhydride-maleic anhydride, dodecenylsuccinic anhydride and methyl-Himic anhydride; amides of an unsaturated monobasic acid and a polyvalent amine such as (meth)acrylamide, methylenebis-(meth)acrylamide, diethylenetriamine tris(meth) acrylamide, xylylene bis(meth)acrylamide, α-chloroacrylamide and N-2-hydroxyethyl(meth)acrylamide; unsaturated aldehydes such as acrolein; unsaturated nitriles such as (meth)acrylonitrile, α-chloroacrylonitrile, vinylidene cyanate and allyl cyanate; unsaturated aromatic compounds such as styrene, 4-methylstyrene, 4-ethylstyrene, 4-methoxystyrene, 4-hydroxystyrene, 4-chlorostyrene, divinylbenzene, vinyltoluene, vinylbenzoic acid, vinylphenol, vinylsulfonic acid, 4-vinylbenzenesulfonic acid, vinylbenzyl methyl ether and vinylbenzyl glycidyl ether; unsaturated ketones such as methyl vinyl ketone; unsaturated amine compounds such as vinylamine, allylamine, N-vinylpyrrolidone and vinylpiperidine; vinyl alcohols such as allyl alcohol and crotyl alcohol; vinyl ethers such as vinyl methyl ether, vinyl ethyl ether, n-butyl vinyl ether, isobutyl vinyl ether and allyl glycidyl ether; unsaturated imides such as maleimide, N-phenylmaleimide and N-cyclohexylmalemide; indenes such as indene and 1-methylindene; aliphatic conjugated dienes such as 1,3-butadiene, isoprene and chloroprene; macromonomers having mono(meth)acryloyl groups at the terminals of a polymer molecular chain such as polystyrene, polymethyl(meth)acrylate, poly-n-butyl(meth)acrylate and polysiloxanes; vinyl chloride, vinylidene chloride, divinyl succinate, diallyl phthalate, triallyl phosphate, triallyl isocyanurate, vinylthioether, vinylimidazole, vinyloxazoline, vinylcarbazole, vinylpyrrolidone, vinylpyridine, vinylurethane compounds of a hydroxyl group-containing vinyl monomer and a polyisocyanate compound, vinylepoxy compounds of a hydroxyl group-containing vinyl monomer and a polyepoxy compound, reaction products of a hydroxyl group-containing multifunctional acrylate such as pentaerythritol triacrylate and dipentaerythritol pentaacrylate and multifunctional isocyanates such as tolylene diisocyanate and hexamethylene diisocyanate, and multifunctional acrylates having an acid value which are reaction products of a hydroxyl group-containing multifunctional acrylate such as pentaerythritol triacrylate and dipentaerythritol pentaacrylate and a dibasic acid anhydride such as succinic anhydride, phthalic anhydride and tetrahydrophthalic anhydride.

These polymerizable compounds can be used alone or by mixing two or more kinds, and in the case when two or more kinds are mixed and used, those may be copolymerized in advance and used as a copolymer.

[Chemical Formula 23]

Compound No. 121

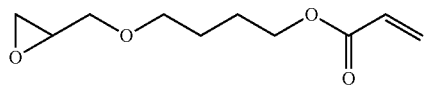

[Chemical Formula 24]

Compound No. 122

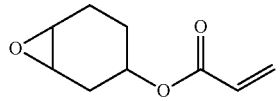

[Chemical Formula 25]

Compound No. 123

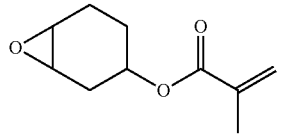

[Chemical Formula 26]

Compound No. 124

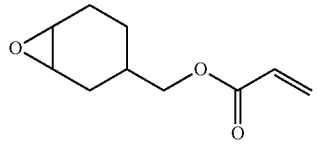

Furthermore, in the coloring composition of the present invention, when an alkali-developable polymerizable compound having an ethylenically unsaturated bond (B') (hereinafter also referred to as an alkali-developable compound having an ethylenically unsaturated bond (B')) is used as the above-mentioned polymerizable compound having an ethylenically unsaturated bond (B), the coloring photosensitive composition of the present invention becomes a coloring alkali-developable photosensitive composition. As the alkali-developable compound having an ethylenically unsaturated bond (B'), (meth)acrylic acid esters such as (meth)acrylic acid, methyl(meth)acrylate, ethyl(meth)acrylate, propyl (meth)acrylate, isopropyl(meth)acrylate, butyl(meth)acrylate, isobutyl(meth)acrylate, t-butyl(meth)acrylate, benzyl (meth)acrylate, phenyl(meth)acrylate, cyclohexyl(meth) acrylate, phenoxyethyl(meth)acrylate, 2-ethylhexyl(meth) acrylate, isobornyl(meth)acrylate, 2-hydroxyethyl(meth) acrylate and tetrahydrofurfuryl(meth)acrylate; N-vinylpyrrolidone; styrenes such as styrenes and derivatives thereof, and α-methylstyrene; acrylamides such as (meth) acrylamide, methylol(meth)acrylamide, alkoxymethylol (meth)acrylamide and diacetone(meth)acrylamide; other vinyl compounds such as (meth)acrylonitrile, ethylene, propylene, butylene, vinyl chloride and vinyl acetate; macromonomers such as polymethyl methacrylate macromonomers and polystyrene macromonomers; monomethacrylates of a tricyclodecane backbone; copolymers of N-phenylmaleimide, methacryloyloxymethyl-3-ethyloxetane and the like, and (meth)acrylic acid; copolymers of (meth)acrylic acid obtained by reacting these with an isocyanate compound having an unsaturated bond such as KARENZ MOI and AOI manufactured by Showa Denko K. K.; novolak-type epoxy compounds such as phenol and/or cresol novolak epoxy resins, novolak epoxy resins having a biphenyl backbone or naphthalene backbone, bisphenol A novolak-type epoxy compounds and dicyclopentadiene novolak-type epoxy compounds, polyphenylmethane-type epoxy resins having a multifunctional epoxy group, and resins obtained by reacting the epoxy groups of the epoxy compound represented by the following general formula (1) or the like with an unsaturated monobasic acid, and further reacting with a polybasic acid anhydride, can be used. These monomers can be used alone or by mixing two or more kinds. Furthermore, it is preferable that the above-mentioned alkali-developable compound having an ethylenically unsaturated bond contains an unsaturated group by 0.2 to 1.0 equivalent amounts.

It is preferable that the reaction molar ratio of the above-mentioned epoxy compound, the above-mentioned unsaturated monobasic acid and the above-mentioned polybasic acid anhydride is adjusted as follows. Namely, it is preferable that an epoxy adduct having a structure in which 0.1 to 1.0 carboxyl group of the above-mentioned unsaturated monobasic acid is added to one epoxy group of the above-mentioned epoxy compound has such a ratio that the acid anhydride structure of the above-mentioned polybasic acid anhydride is 0.1 to 1.0 with respect to one hydroxyl group of the epoxy adduct.

The reaction of the above-mentioned epoxy compound, the above-mentioned unsaturated monobasic acid and the above-mentioned polybasic acid anhydride can be conducted according to a conventional method.

In order to adjust an acid value to improve the developability of the coloring alkali-developable photosensitive composition of the present invention, a monofunctional or multi-

[Chemical Formula 27]

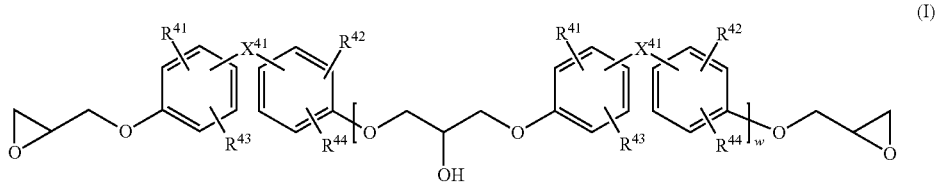

wherein $X^{41}$ represents a direct bond, a methylene group, an alkylidene group having 1 to 4 carbon atoms, an alicyclic hydrocarbon group having 3 to 20 carbon atoms, —O—, —S—, —SO$_2$—, —SS—, —SO—, —CO—, —COO— or a substituent represented by any of the above-mentioned [Chemical Formula 3A] to [Chemical Formula 3C], wherein the alkylidene group may be substituted with halogen atoms, $R^{41}$, $R^{42}$, $R^{43}$ and $R^{44}$ each independently represent a hydrogen atom, an alkyl group having 1 to 5 carbon atoms, an alkoxy group having 1 to 8 carbon atoms, an alkenyl group having 2 to 5 carbon atoms or a halogen atom, wherein the above-mentioned alkyl group, alkoxy group and alkenyl group may be substituted with halogen atoms, and w is an integer of 0 to 10.

Examples of the above-mentioned unsaturated monobasic acid that is reacted with the epoxy group of the above-mentioned epoxy compound may include acrylic acid, methacrylic acid, crotonic acid, cinnamic acid, sorbic acid, hydroxyethyl methacrylate-maleate, hydroxyethyl acrylate-maleate, hydroxypropyl methacrylate-maleate, hydroxypropyl acrylate-maleate, dicyclopentadiene-maleate and the like are exemplified.

Furthermore, examples of the above-mentioned polybasic anhydride that is reacted after the reaction of the above-mentioned unsaturated monobasic acid may include biphenyltetracarboxylic dianhydride, tetrahydrophthalic acid anhydride, succinic anhydride, maleic anhydride, trimellitic anhydride, pyromellitic anhydride, 2,2'-3,3'-benzophenonetetracarboxylic anhydride, ethylene glycol bisanhydrotrimellitate, glycerol trisanhydrotrimellitate, hexahydrophthalic anhydride, methyltetrahydrophthalic anhydride, nadic anhydride, methylnadic anhydride, trialkyltetrahydrophthalic anhydride, hexahydrophthalic anhydride, 5-(2,5-dioxotetrahydrofuryl)-3-methyl-3-cyclohexene-1,2-dicarboxylic anhydride, an adduct of trialkyltetrahydrophthalic anhydride-maleic anhydride, dodecenylsuccinic anhydride, methylhimic anhydride and the like.

functional epoxy compound can further be used together with the above-mentioned alkali-developable compound having an ethylenically unsaturated bond. The above-mentioned alkali-developable compound having an ethylenically unsaturated bond preferably has an acid value of a solid content in the range of 5 to 120 mgKOH/g, and it is preferable that the use amount of the monofunctional or multifunctional epoxy compound is selected so as to satisfy the above-mentioned acid value.

Examples of the above-mentioned monofunctional epoxy compound may include glycidyl methacrylate, methyl glycidyl ether, ethyl glycidyl ether, propyl glycidyl ether, isopropyl glycidyl ether, butyl glycidyl ether, isobutyl glycidyl ether, t-butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, 2-ethylhexyl glycidyl ether, allyl glycidyl ether, propargyl glycidyl ether, p-methoxyethyl glycidyl ether, phenyl glycidyl ether, p-methoxy glycidyl ether, p-butylphenol glycidyl ether, cresyl glycidyl ether, 2-methylcresyl glycidyl ether, 4-nonylphenyl glycidyl ether, benzyl glycidyl ether, p-cumylphenyl glycidyl ether, trityl glycidyl ether, 2,3-epoxypropyl methacrylate, epoxidized soybean oil, epoxidized linseed oil, glycidyl butyrate, vinylcyclohexane monoxide, 1,2-epoxy-4-vinylcyclohexane, styrene oxide, pinene oxide, methylstyrene oxide, cyclohexene oxide, propylene oxide, the following compounds No. 122 and No. 123, and the like.

As the above-mentioned multifunctional epoxy compound, it is preferable to use one or more kind selected from the group consisting of bisphenol-type epoxy compounds and glycidyl ethers since a coloring alkali-developable photosensitive composition having finer properties can be obtained. As the bisphenol-type epoxy compound, the epoxy compound represented by the above-mentioned general formula (I) can be used, and for example, bisphenol-type epoxy compounds such as hydrogenated bisphenol-type epoxy compounds can also be used. Examples of the glycidyl ethers may include ethylene glycol diglycidyl ether, propylene glycol diglycidyl ether, 1,4-butanediol diglycidyl ether, 1,6-hexanediol diglycidyl ether, 1,8-octanediol diglycidyl ether, 1,10-decanediol diglycidyl ether, 2,2-dimethyl-1,3-propanediol diglycidyl ether, diethylene glycol diglycidyl ether, triethylene glycol diglycidyl ether, tetraethylene glycol diglycidyl ether, hexaethylene glycol diglycidyl ether, 1,4-cyclohexanedimethanol diglycidyl ether, 1,1,1-tri(glycidyloxymethyl)propane, 1,1,1-tri(glycidyloxymethyl)ethane, 1,1,1-tri(glycidyloxymethyl)methane and 1,1,1,1-tetra(glycidyloxymethyl)methane.

In addition, novolak-type epoxy compounds such as phenol novolak-type epoxy compounds, biphenyl novolak-type epoxy compounds, cresol novolak-type epoxy compounds, bisphenol A novolak-type epoxy compounds and dicyclopentadiene novolak-type epoxy compounds; alicyclic epoxy compounds such as 3,4-epoxy-6-methylcyclohexylmethyl-3,4-epoxy-6-methylcyclohexanecarboxylate, 3,4-epoxycyclohexylmethyl-3,4-epoxycyclohexanecarboxylate and 1-epoxyethyl-3,4-epoxycyclohexane; glycidyl esters such as phthalic acid diglycidyl esters, tetrahydrophthalic acid diglycidyl esters and dimeric acid glycidyl esters; glycidylamines such as tetraglycidyl diaminodiphenylmethane, triglycidyl-p-aminophenol and N,N-diglycidylaniline; heterocyclic epoxy compounds such as 1,3-diglycidyl-5,5-dimethylhydantoin and triglycidyl isocyanurate; dioxide compounds such as dicyclopentadiene dioxide; naphthalene-type epoxy compounds, triphenylmethane-type epoxy compounds, dicyclopentadiene-type epoxy compounds, and the like can also be used.

In the coloring composition of the present invention, it is preferable that the content of the above-mentioned polymerizable compound having an ethylenically unsaturated bond (B) (including the above-mentioned alkali-developable compound having an ethylenically unsaturated bond (B')) is 30 to 99% by mass, specifically 60 to 95% by mass in the coloring composition of the present invention. In the cases when the content of the above-mentioned polymerizable compound having an ethylenically unsaturated bond (B) is less than 30% by mass, the dynamic strength of the cured product may be insufficient and cracks may be generated, or in the cases when the compound has alkali-developability, developing defect may occur, whereas in the cases when the content is more than 99% by mass, curing by exposing may become insufficient and tack may be generated, or in the cases when the compound has alkali-developability, the developing time may extended and the cured part may cause damage on film by an alkali.

<Photopolymerization Initiator (C)>

As the above-mentioned photopolymerization initiator (C), conventionally known compounds can be used, and examples may include benzophenone, phenyl biphenyl ketone, 1-hydroxy-1-benzoylcyclohexane, benzoin, benzyl dimethyl ketal, 1-benzyl-1-dimethylamino-1-(4'-morpholinobenzoyl)propane, 2-morphoryl-2-(4'-methylmercapto)benzoylpropane, thioxanthone, 1-chloro-4-propoxythioxanthone, isopropylthioxanthone, diethylthioxanthone, ethylanthraquinone, 4-benzoyl-4'-methyldiphenylsulfide, benzoin butyl ether, 2-hydroxy-2-benzoylpropane, 2-hydroxy-2-(4'-isopropyl)benzoylpropane, 4-butylbenzoyltrichloromethane, 4-phenoxybenzoyldichloromethane, methyl benzoylformate, 1,7-bis(9'-acridinyl)heptane, 9-n-butyl-3,6-bis(2'-morpholinoisobutyloyl)carbazole, 2-methyl-4,6-bis(trichloromethyl)-s-triazine, 2-phenyl-4,6-bis(trichloromethyl)-s-triazine, 2-naphthyl-4,6-bis(trichloromethyl)-s-triazine, 2,2-bis(2-chlorophenyl)-4,5,4',5'-tetraphenyl-1-2'-biimidazole, 4,4-azobisisobutyronitrile, triphenylphosphine, camphorquinone, benzoyl peroxide and the like, and examples of commercial products may include N-1414, N-1717, N-1919, PZ-408, NCI-831 and NCI-930 (manufactured by ADEKA Corporation), IRGACURE369, IRGACURE907, IRGACURE OXE01 and IRGACURE OXE02 (manufactured by BASF), and the like.

In the coloring composition of the present invention, it is preferable that the content of the above-mentioned photopolymerization initiator (C) is 0.1 to 30% by mass, specifically 0.5 to 10% by mass in the coloring composition of the present invention. In the cases when the content of the above-mentioned photopolymerization initiator (C) is less than 0.1% by mass, curing by exposing may become insufficient, whereas in the cases when the content is more than 30% by mass, the initiator (C) may be precipitated in the resin composition.

<Inorganic Pigment and/or Organic Pigment (D)>

An inorganic pigment and/or an organic pigment (D) may be incorporated in the coloring composition of the present invention. These dyes can be used alone or by mixing two or more kinds.

As the above-mentioned inorganic pigment and/or organic pigment (D), for example, inorganic pigments or organic pigments such as nitroso compounds, nitro compounds, azo compounds, diazo compounds, xanthene compounds, quinoline compounds, anthraquinone compounds, coumarin compounds, phthalocyanine compounds, isoindolinone compounds, isoindoline compounds, quinacridone compounds, anthanthrone compounds, perinone compounds, perylene compounds, diketopyrrolopyrrole compounds, thioindigo compounds, dioxazine compounds, triphenylmethane compounds, quinophthalone compounds and naphthalene tetracarboxylic acids; metal complex compounds of azo dyes and cyanine dyes; lake pigments; carbon black obtained by a furnace process, a channel process or a thermal process, or carbon black such as acetylene black, ketchen black or lamp black; one obtained by adjusting and coating the above-mentioned carbon black with an epoxy resin, one obtained by a disperse treatment of the above-mentioned carbon black with a resin in a solvent in advance and adsorbing 20 to 200 mg/g of a resin, one obtained by an acidic or alkaline surface treatment of the above-mentioned carbon black, one having an average particle size of 8 nm or more and a DBP oil absorption amount of 90 ml/100 g or less, and one having a total oxygen amount calculated from CO and $CO_2$ in volatile components at 950° C. is 9 mg or more per the surface area of the carbon black of 100 m2; graphite, graphite carbon black, active carbons, carbon fibers, carbon nanotubes, carbon microcoils, carbon nanohorns, carbon aerogels, fullerene; aniline black, Dye Black 7, titanium black; hydrophobic resins, chromium oxide green, Milori blue, cobalt green, cobalt blue, manganese, ferrocyanides, phosphate ultramarine, Prussian blue, ultramarine, cerulean blue, viridian, emerald green, lead sulfate, yellow lead, zinc yellow, bengara (red iron oxide (III)), cadmium red, synthetic iron black and amber can be used. These pigments can be used alone or by mixing plural pigments.

As the above-mentioned inorganic pigment and/or organic pigment (D), commercially available pigments can also be used, and examples may include Pigment Red 1, 2, 3, 9, 10, 14, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240 and 254; Pigment Orange 13, 31, 34, 36, 38, 43, 46, 48, 49, 51, 52, 55, 59, 60, 61, 62, 64, 65 and 71; Pigment Yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180 and 185; Pigment Green 7, 10 and 36; Pigment Blue 15, 15:1, 15:2, 15:3, 15:4, 15:5, 15:6, 22, 24, 56, 60, 61, 62 and 64; and Pigment Violet 1, 19, 23, 27, 29, 30, 32, 37, 40 and 50, and the like.

In the coloring composition of the present invention, the content of the above-mentioned inorganic pigment and/or organic pigment (D) is preferably 0 to 350 parts by mass, more preferably 0 to 250 parts by mass with respect to 100 parts by mass of the above-mentioned polymerizable compound having an ethylenically unsaturated bond (B). In the case when the content exceeds 350 parts by mass, it is not preferable since the light transmittances of the cured product and color filter for display devices using the coloring composition, specifically the coloring alkali-developable photosensitive composition of the present invention are decreased, and thus the luminances of the display devices are decreased.

<Solvent (E)>

A solvent (E) can further be added to the coloring composition of the present invention. Examples of the solvent are generally solvents that can dissolve or disperse the above-mentioned respective components (the dye (A) of the present invention and the like) as necessary, and may include ketones such as methyl ethyl ketone, methyl amyl ketone, diethyl ketone, acetone, methyl isopropyl ketone, methyl isobutyl ketone, cyclohexanone and 2-heptanone; ether-based solvents such as ethyl ether, dioxane, tetrahydrofuran, 1,2-dimethoxyethane, 1,2-diethoxyethane and dipropylene glycol dimethyl ether; ester-based solvents such as methyl acetate, ethyl acetate, n-propyl acetate, isopropyl acetate, n-butyl acetate, cyclohexyl acetate, ethyl lactate, dimethyl succinate and texanol; cellosolve-based solvents such as ethylene glycol monomethyl ether and ethylene glycol monoethyl ether; alcohol-based solvents such as methanol, ethanol, iso- or n-propanol, iso- or n-butanol and amyl alcohol; ether ester-based solvents such as ethylene glycol monomethyl acetate, ethylene glycol monoethyl acetate, propylene glycol-1-monomethylether-2-acetate (PGMEA), dipropylene glycol monomethyl ether acetate, 3-methoxybutyl acetate and ethoxyethyl propionate; BTX-based solvents such as benzene, toluene and xylene; aliphatic hydrocarbon-based solvents such as hexane, heptane, octane and cyclohexane; terpene-based hydrocarbon oils such as terpine oil, D-limonene and pinene; paraffin-based solvents such as mineral spirit, Swasol #310 (Cosmo Matsuyama Oil Co., Ltd.) and SOLVESSO #100 (Exxon Chemical); halogenated aliphatic hydrocarbon-based solvents such as carbon tetrachloride, chloroform, trichloroethylene, methylene chloride and 1,2-dichloroethane; halogenated aromatic hydrocarbon-based solvents such as chlorobenzene; carbitol-based solvents, aniline, triethylamine, pyridine, acetic acid, acetonitrile, carbon disulfide, N,N-dimethylformamide, N,N-dimethylacetamide, N-methylpyrrolidone, dimethylsulfoxide, water, and the like, and these solvents can be used alone or as a mixed solvent of two or more kinds. Among these, ketones, ether ester-based solvents and the like, specifically propylene glycol-1-monomethyl ether-2-acetate, cyclohexanone and the like are preferable since they provide fine compatibility of a resist and a photopolymerization initiator in a photosensitive composition.

In the coloring composition of the present invention, the use amount of the above-mentioned solvent (E) is preferably such an amount that the concentration of the composition except for the solvent (E) becomes 5 to 30% by mass, and the case when the use amount is less than 5% by mass is not preferable since it is difficult to thicken a film thickness, and light at a desired wavelength cannot be absorbed sufficiently, and the case when the use amount is more than 30% by mass is not preferable since the storage property of the composition is decreased by the precipitation of the composition, and the viscosity is increased and thus the handling is decreased.

The coloring composition of the present invention can further contain an inorganic compound. Examples of the inorganic compound may include metal oxides such as nickel oxide, iron oxide, iridium oxide, titanium oxide, zinc oxide, magnesium oxide, calcium oxide, potassium oxide, silica and alumina; laminar clay minerals, Milori blue, calcium carbonate, magnesium carbonate, cobalt-based compounds, manganese-based compounds, glass powder, mica, talc, kaolin, ferrocyanides, various metal sulfates, sulfides, selenides, aluminum silicate, calcium silicate, aluminum hydroxide, platinum, gold, silver, copper and the like, and among these, titanium oxide, silica, laminar clay minerals, silver and the like are preferable. In the coloring composition of the present invention, the content of the inorganic compound is preferably 0.1 to 50 parts by mass, more preferably 0.5 to 20 parts by mass with respect to 100 parts by mass of the above-mentioned polymerizable compound having an ethylenically unsaturated bond, and these inorganic compounds can be used alone or by two or more kinds.

These inorganic compounds are used as, for example, a filler, an antireflective agent, a conductant agent, a stabilizer, a flame retarder, an agent for improving mechanical strength, an agent that absorbs a special wavelength, an ink repellant or the like.

In the coloring composition of the present invention, in the case when pigments and/or inorganic compounds are used, a dispersing agent can be added. The dispersing agent may be any one as long as it can disperse and stabilize color materials and inorganic compounds, and commercially available dispersing agents such as BYK series manufactured by BYC Chemie and the like can be used, and polymer dispersing agents formed of a polyester, polyether or polyurethane having a basic functional group, and those having a nitrogen atom as a basic functional group, wherein the functional group having a nitrogen atom is an amine and/or a quaternary salt thereof, and having an amine value of 1 to 100 mgKOH/g are preferably used.

Furthermore, where necessary, conventionally used additives such as thermal polymerization-suppressing agents such as p-anisole, hydroquinone, pyrocatechol, t-butylcatechol and phenothiazine; plasticizers; adhesion promoters; fillers; defoaming agents; leveling agents; surface adjusting agents; antioxidants; ultraviolet absorbers; dispersion aids; flocculate inhibitors; catalysts; effect promoters; crosslinking agents; and thickening agents can be added to the coloring composition of the present invention.

In the coloring composition of the present invention, although the content of the arbitrary components other than the dye (A), polymerizable compound having an ethylenically unsaturated bond (B) and photopolymerization initiator (C) of the present invention (provided that the inorganic pigment and/or organic pigment (D) and solvent (E) are excluded) is suitably selected according to the purpose of use thereof and is not specifically limited, it is preferably 50 parts by mass or less in total with respect to 100 parts by mass of the above-mentioned polymerizable compound having an ethylenically unsaturated bond (B).

Alternatively, the property of the cured product containing the coloring composition of the present invention can be improved by using other organic polymer together with the above-mentioned polymerizable compound having an ethylenically unsaturated bond (B). Examples of the above-mentioned organic polymer may include polystyrene, polymethyl methacrylate, methyl methacrylate-ethyl acrylate copolymers, poly(meth)acrylic acid, styrene-(meth)acrylic acid copolymers, (meth)acrylic acid-methyl methacrylate copolymers, ethylene-vinyl chloride copolymers, ethylene-vinyl copolymers, polyvinyl chloride resins, ABS resins, nylon 6, nylon 66, nylon 12, urethane resins, polycarbonate polyvinyl butyral, cellulose esters, polyacrylamide, saturated polyesters, phenolic resins, phenoxy resins, polyamideimide resins, polyamic acid resins, epoxy resins and the like, of which polystyrene, (meth)acrylic acid-methyl methacrylate copolymers and epoxy resins are preferable.

In the case when other organic polymer is used, the use amount thereof is preferably 10 to 500 parts by mass with respect to 100 parts by mass of the above-mentioned polymerizable compound having an ethylenically unsaturated bond (B).

In the coloring composition of the present invention, a monomer having an unsaturated bond, a chain transfer agent, a sensitizer, a surfactant, a silane coupling agent, a melamine and the like can further be used in combination.

Examples of the above-mentioned monomer having an unsaturated bond may include 2-hydroxyethyl acrylate, 2-hydroxypropyl acrylate, isobutyl acrylate, n-octyl acrylate, isooctyl acrylate, isononyl acrylate, stearyl acrylate, methoxyethyl acrylate, dimethylaminoethyl acrylate, zinc acrylate, 1,6-hexanediol diacrylate, trimethylolpropane triacrylate, 2-hydroxyethyl methacrylate, 2-hydroxypropyl methacrylate, butyl methacrylate, tertiary-butyl methacrylate, cyclohexyl methacrylate, trimethylolpropane trimethacrylate, dipentaerythritol pentaacrylate, dipentaerythritol hexaacrylate, pentaerythritol tetraacrylate, pentaerythritol triacrylate, bisphenol A diglycidyl ether (meth)acrylate, bisphenol F diglycidyl ether(meth)acrylate, bisphenol Z diglycidyl ether(meth)acrylate, tripropylene glycol di(meth)acrylate and the like.

As the above-mentioned chain transfer agent and sensitizer, sulfur atom-containing compounds are generally used. Examples may include mercapto compounds such as thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, dodecyl (4-methylthio)phenyl ether, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, 2-mercaptobenzimidazole, 2-mercapto-3-pyridinol, 2-mercaptobenzothiazole, mercaptoacetic acid, trimethylolpropane tris(3-mercaptopropionate) and pentaerythritol tetrakis(3-mercaptopropionate), disulfide compounds obtained by oxidizing the mercapto compounds, alkyl iodide compounds such as iodoacetic acid, iodopropionic acid, 2-iodoethanol, 2-iodoethanesulfonic acid and 3-iodopropanesulfonic acid, aliphatic multifunctional thiol compounds such as trimethylolpropane tris(3-mercaptoisobutyrate), butanediol bis(3-mercaptoisobutyrate), hexanedithiol, decanedithiol, 1,4-dimethylmercaptobenzene, butanediol bisthiopropionate, butanediol bisthioglycolate, ethylene glycol bisthioglycolate, trimethylolpropane tristhioglycolate, butanediol bisthiopropionate, trimethylolpropane tristhiopropionate, trimethylolpropane tristhioglycolate, pentaerythritol tetrakisthiopropionate, pentaerythritol tetrakisthioglycolate, trihydroxyethyl tristhiopropionate, the following compound No. 125 and tri-mercaptopropionic acid tris(2-hydroxyethyl)isocyanurate, KARENZ MTBD1, PE1 and NR$^1$ manufactured by Showa Denko, and the like.

[Chemical Formula 28]

Compound No. 125

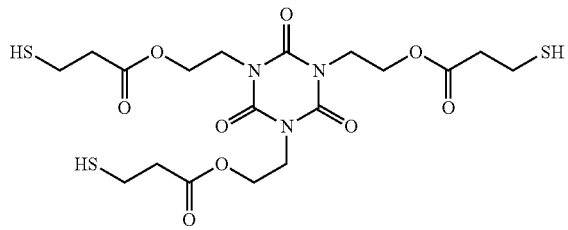

As the above-mentioned surfactant, surfactants such as fluorine surfactants such as perfluoroalkyl phosphate esters and perfluoroalkyl carboxylates, anion surfactants such as alkali salts of higher aliphatic acids, alkyl sulfonates and alkyl sulfates, cationic surfactants such as higher amine halogenoate and quaternary ammonium salts, nonionic surfactants such as polyethylene glycol alkyl ethers, polyethylene glycol aliphatic acid esters, sorbitan aliphatic acid esters and aliphatic acid monoglycerides, amphoteric surfactants and silicone surfactants can be used, and these may be used in combination.

As the above-mentioned silane coupling agent, for example, silane coupling agents manufactured by Shin-Etsu Chemical Co., Ltd. can be used, and among those, silane coupling agents having an isocyanate group, a methacryloyl group or an epoxy group such as KBE-9007, KBM-502 and KBE-403 are preferably used.

Examples of the above-mentioned melamine compound may include compounds in which all or a part of (at least two) active methylol groups ($CH_2OH$ groups) in a nitrogen compound are alkyl-etherified such as (poly)methylolmelamine, (poly)methylolglycoluril, (poly)methylolbenzoguanamine and (poly)methylolurea. Examples of the alkyl groups that constitute the alkyl ether may include a methyl group, an ethyl group or a butyl group, and the alkyl groups may be the same with each other or different. Furthermore, the methylol groups that are not alkyl-etherified may be self-condensed in one molecule, or may be condensed between two molecules to consequently form an oligomer component. Specifically, hexamethoxymethylmelamine, hexabutoxymethylmelamine, tetramethoxymethylglycoluril, tetrabutoxymethylglycoluril and the like can be used. Among these, alkyl-etherified melamines such as hexamethoxymethylmelamine and hexabutoxymethylmelamine are preferable.

The coloring composition of the present invention can be applied to support bases such as soda glass, quartz glass, semiconductor substrates, metals, paper and plastics by a spin coater, a roll coater, a bar coater, a die coater, a curtain coater, or various known means such as printing and immersing. Furthermore, the coloring composition can be applied once to a support base such as a film and then transferred on another support base, and the method for the application is not limited.

Furthermore, as a light source for active ray that is used in curing of the coloring composition of the present invention, a light source that emits light at a wavelength of 300 to 450 nm can be used, and for example, ultrahigh pressure mercury, mercury vapor arc, carbon arc, xenon arc and the like can be used.

Furthermore, a laser direct drawing method in which an image is formed directly from digital information from a computer or the like by using laser light as an exposing source, without using a mask is useful since not only producibility but also resolution property and position accuracy can be improved, and light at a wavelength of 340 to 430 nm is preferably used as the laser light therefor, and those emitting light at from the visible to infrared region such as argon ion laser, helium neon laser, YAG laser and semiconductor laser are also used. In the case when these lasers are used, a sensitizing dye that absorbs the region from visible to infrared is added.

The coloring composition of the present invention (or a cured product thereof) can be used in various uses such as photocurable coating materials or varnishes, photocurable adhesives, printed substrates, or color filters in liquid crystal display panels for color displays of color televisions, PC monitors, handheld terminals, digital cameras and the like, color filters for CCD image sensors, electrode materials for plasma display panels, powder coatings, printing inks, printing plates, adhesives, dental compositions, light formative resins, gel coatings, photoresists for electronics, electric plating resists, etching resist, both liquid and dried films, solder resists, resists for producing color filters for various uses in displays, or for forming structures in the steps of the production of plasma display panels, electroluminescence display devices, and LCDs, compositions for sealing electric and electronic parts, solder resists, magnetic recording materials, micromechanical parts, optical waveguides, optical switches, masks for plating, etching masks, color test systems, glass fiber cable coatings, stencils for screen printing, materials for producing three-dimensional objects by stereolithography, materials for holography recording, image recording materials, microfine electron circuits, decolorant materials, decolorant materials for image recording materials, decolorant materials for image recording materials using microcapsules, photoresist materials for printed wiring plates, photoresist materials for UV and visible laser direct imaging, photoresist materials for use in forming of dielectic layers in successive lamination of printed circuit substrates, or protective films and the like, and the uses are not specifically limited.

The coloring composition of the present invention (specifically a coloring alkali-developable photosensitive composition) is used for the purpose of forming pixels for color filters, and is specifically useful as a photosensitive composition for forming color filters for display devices for image display devices such as liquid crystal display panels.

The above-mentioned color filter for display devices is preferably formed by (1) a step of forming a coating of the coloring composition (specifically the coloring alkali-developable photosensitive composition) of the present invention on a substrate, (2) a step of irradiating the coating with active ray through a mask having a shape of a predetermined pattern, (3) a step of developing the exposed coating with a developing liquid (specifically an alkali developing liquid), and (4) a step of heating the developed coating. Furthermore, the coloring composition of the present invention is also useful as a coloring composition for an inkjet system that does not include a developing step.

Next, the novel compound of the present invention will be explained. For the matters that are not specifically explained, the explanations made on the dye (A) of the present invention are suitably adopted.

Among the compounds used for the dye (A) of the present invention described above, the compound represented by the above-mentioned general formula (1') falls within the novel compound of the present invention. Namely, the novel compound of the present invention is a compound that satisfies the conditions defined in the above-mentioned general formula (1), as well as any of the following conditions (i) to (v), provided that when n is 2 to 6, $R^1$s to $R^7$s and Qs each may be the same or different.

(i) n is 2, X represents an alkylene group having 3 to 35 carbon atoms having side chains, wherein the alkylene group is not further substituted nor interrupted.

(ii) n is 2, X is a straight chain alkylene group having 4 to 6 carbon atoms, and $R^2$ to $R^5$ are hydrogen atoms.

(iii) n is 2, and X is a straight chain alkylene group having 7 to 10 carbon atoms.

(iv) n is 2, and X is a bivalent group having a ring structure having 4 to 35 carbon atoms.

(v) n is 3 to 6.

Examples of the alkylene group having 3 to 35 carbon atoms having side chains represented by X in the above-mentioned condition (i) may include 1-methylethane-1,2-diyl, 1-ethylethane-1,2-diyl, 1-propylethane-1,2-diyl, 1-methylpropane-1,3-diyl, 1-ethylpropane-1,3-diyl, 1-propylpropane-1,3-diyl, 2-methylpropane-1,3-diyl, 2-ethylpropane-1,3-diyl, 2-propylpropane-1,3-diyl, 1-methylbutane-1,4-diyl, 1-ethylbutane-1,4-diyl, 1-propylbutane-1,4-diyl, 2-methylbutane-1,4-diyl, 2-ethylbutane-1,4-diyl, 2-propylbutane-1,4-diyl, 1-methylpentane-1,5-diyl, 1-ethylpentane-1,5-diyl, 1-propylpentane-1,5-diyl, 2-methylpentane-1,5-diyl, 2-ethylpentane-1,5-diyl, 2-propylpentane-1,5-diyl, 3-methylpentane-1,5-diyl, 3-ethylpentane-1,5-diyl, 3-propylpentane-1,5-diyl, 1-methylhexane-1,6-diyl, 1-ethylhexane-1,6-diyl, 2-methylhexane-1,6-diyl, 2-ethylhexane-1,6-diyl, 3-methylhexane-1,6-diyl, 3-ethylhexane-1,6-diyl, 1-methylheptane-1,7-diyl, 2-methylheptane-1,7-diyl, 3-methylheptane-1,7-diyl, 4-methylheptane-1,7-diyl and the like, examples of the straight chain alkylene group having 4 to 6 carbon atoms represented by X in the above-mentioned condition (ii) may include butane-1,4-diyl, pentane-1,5-diyl, hexane-1,6-diyl and the like, examples of the straight chain alkylene group having 7 to 10 carbon atoms represented by X in the above-mentioned condition (iii) may include heptane-1,7-diyl, octane-1,8-diyl, nonane-1,9-diyl, decane-1,10-diyl and the like, examples of the ring structure having 4 to 35 carbon atoms represented by X in the above-mentioned condition (iv) may include (di-substituted) groups formed by substituting groups such as cyclobutane, cyclopentane, cyclohexane, cycloheptane, 2,4-dimethylcyclobutane, 4-methylcyclohexane, adamantane, benzene, naphthalene, anthracene, fluorene, biphenylene, terphenylene, pyridine, pyrazine, piperidine, piperazine, pyrimidine, pyridazine, triazine, hexahydrotriazine, furan, tetrahydrofuran, chromane, xanthene, thiophene and thiorane with $Z^1$ and $Z^2$ in the above-mentioned general formula (2) or groups selected from the following [Chemical Formula 29], and the like.

[Chemical Formula 29]

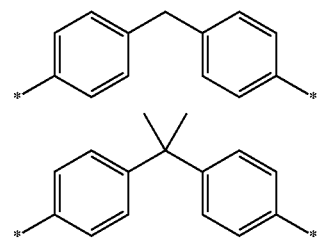

-continued

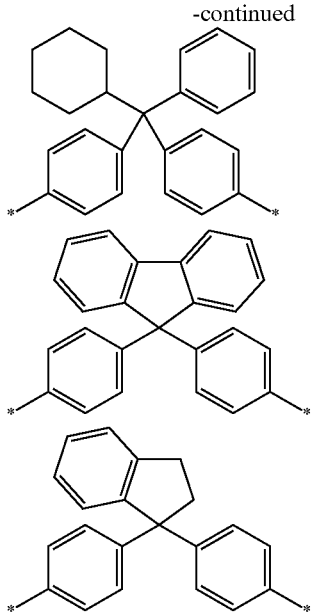

EXAMPLES

Hereinafter the present invention will be explained in more detail with reference to Examples and the like, but the present invention is not limited by these Examples and the like.

Examples 1-1 to 1-7, 1-9, 1-11 to 1-13, 1-24 to 1-34

Synthesis of Compounds Nos. 1 to 7, 26, 52 to 54, 69, 70 and 94 to 102 (Synthetic Example I)

A carboxylic acid and pyridine were put into a 300 ml four-necked flask and dissolved and substituted under an argon atmosphere, 1-ethyl-3-(3-dimethylaminopropyl) carbodiimide hydrochloride (hereinafter referred to as EDC) was added, and a reaction was conducted for 1.5 hours. After the reaction, a pyridine solution of a multifunctional alcohol or a multifunctional amine was added dropwise, and after the dropwise addition was completed, a reaction was conducted at 75° C. for 3 hours. Cooling was conducted to 60° C., and methanol was added dropwise. Thereafter cooling was conducted to room temperature, and the precipitate crystal was separated by filtration, washed and dried to give each compound represented by the general formula (1) that is an ester form or amide body.

That the obtained solid was an intended product was confirmed by $^1$H-NMR and IR. Furthermore, the solubility of the obtained compound was measured. The solubility was a concentration when PGMEA was added dropwise to 0.1 g of the compound under stirring and was dissolved completely. The results thereof are shown in [Table 1] to [Table 4].

Examples 1-8, 1-10 and 1-14 to 1-23

Synthesis of Compounds Nos. 16, 43, 55 to 62, 65 and 66 (Synthetic Example II)

Cyanoacetic acid, a multifunctional alcohol or multifunctional amine, p-toluenesulfonate and toluene were put into a 300 ml four-necked flask and mixed, and a reaction was conducted at 110° C. for 2 hours under reflux dehydration. Cooling was conducted to room temperature, the reaction liquid was added dropwise to water, and the precipitated solid was separated by filtration, washed and dried to give a cyanoacetic acid ester.

The obtained cyanoacetic acid ester and an aldehyde or ketone, triethylamine and toluene were put and mixed, and a reaction was conducted at 110° C. for 2 hours under reflux dehydration. Cooling was conducted to 80° C., and isopropanol was added dropwise. Thereafter cooling was conducted to room temperature, and the precipitated solid was separated by filtration, washed and dried to give a compound represented by the general formula (1) that is an ester form or amide body.

That the obtained solid was an intended product was confirmed by $^1$H-NMR and IR. Furthermore, the solubility of the obtained compound was measured. The solubility was a concentration when PGMEA was added to 0.1 g of the compound while stirring and was dissolved completely. The results thereof are shown in [Table 1] to [Table 4]

TABLE 1

| Example | Compound No. | Synthetic Example | Yield amount | Yield rate |
|---|---|---|---|---|
| Example 1-1 | Compound No. 1 | I | 3.27 g | 63.5% |
| Example 1-2 | Compound No. 2 | I | 1.11 g | 21.0% |
| Example 1-3 | Compound No. 3 | I | 0.49 g | 9.2% |
| Example 1-4 | Compound No. 4 | I | 0.95 g | 16.7% |
| Example 1-5 | Compound No. 5 | I | 3.78 g | 64.6% |
| Example 1-6 | Compound No. 6 | I | 2.13 g | 31.3% |
| Example 1-7 | Compound No. 7 | I | 0.36 g | 6.3% |
| Example 1-8 | Compound No. 16 | II | 8.50 g | 81.6% |
| Example 1-9 | Compound No. 26 | I | 0.21 g | 16.9% |
| Example 1-10 | Compound No. 43 | II | 8.24 g | 53.5% |
| Example 1-11 | Compound No. 52 | I | 0.91 g | 25.3% |
| Example 1-12 | Compound No. 53 | I | 0.70 g | 21.1% |
| Example 1-13 | Compound No. 54 | I | 3.18 g | 60.4% |
| Example 1-14 | Compound No. 55 | II | 3.52 g | 24.8% |
| Example 1-15 | Compound No. 56 | II | 9.40 g | 78.5% |
| Example 1-16 | Compound No. 57 | II | 4.86 g | 74.7% |
| Example 1-17 | Compound No. 58 | II | 1.60 g | 67.5% |
| Example 1-18 | Compound No. 59 | II | 1.43 g | 50.0% |
| Example 1-19 | Compound No. 60 | II | 2.47 g | 78.4% |
| Example 1-20 | Compound No. 61 | II | 0.51 g | 8.8% |
| Example 1-21 | Compound No. 62 | II | 1.83 g | 74.7% |
| Example 1-22 | Compound No. 65 | II | 3.65 g | 46.9% |
| Example 1-23 | Compound No. 66 | II | 0.64 g | 45.1% |
| Example 1-24 | Compound No. 69 | I | 2.01 g | 18.5% |
| Example 1-25 | Compound No. 70 | I | 1.35 g | 13.8% |
| Example 1-26 | Compound No. 94 | I | 2.95 g | 54.6% |
| Example 1-27 | Compound No. 95 | I | 0.89 g | 37.8% |
| Example 1-28 | Compound No. 96 | I | 2.57 g | 56.1% |
| Example 1-29 | Compound No. 97 | I | 1.00 g | 24.2% |
| Example 1-30 | Compound No. 98 | I | 4.44 g | 51.3% |
| Example 1-31 | Compound No. 99 | I | 2.58 g | 32.1% |
| Example 1-32 | Compound No. 100 | I | 4.05 g | 41.6% |
| Example 1-33 | Compound No. 101 | I | 2.90 g | 58.0% |
| Example 1-34 | Compound No. 102 | I | 2.02 g | 49.8% |

TABLE 2

Chemical shift ppm (proton number, multiplicity), CDCl$_3$

| Compound No. 1 | 1.22(12H, t), 3.45(8H, q), 4.56(4H, t), 6.66(4H, d), 7.93(4H, d), 8.07(2H, s) |
|---|---|

TABLE 2-continued

| | Chemical shift ppm (proton number, multiplicity), CDCl$_3$ |
|---|---|
| Compound No. 2 | 1.25(12H, t), 1.45(3H, d), 3.46(8H, q), 4.37(2H, m), 5.38(1H, m), 6.68(4H, d), 7.93(4H, d), 8.07(2H, s) |
| Compound No. 3 | 1.23(12H, t), 2.20(2H, tt), 3.45(8H, q), 4.43(4H, t), 6.65(4H, d), 7.91(4H, d), 8.04(2H, s) |
| Compound No. 4 | 1.26(12H, t), 1.59(2H, tt), 1.86(4H, tt), 3.46(8H, q), 4.31(4H, t), 6.68(4H, d), 7.93(4H, d), 8.05(2H, s) |
| Compound No. 5 | 1.23(12H, t), 1.45(4H, tt), 1.60(2H, tt), 1.78(4H, tt), 3.48(8H, q), 4.26(4H, t), 6.69(4H, d), 7.93(4H, d), 8.05(2H, s) |
| Compound No. 6 | 1.26(12H, t), 1.71(6H, s), 3.48(8H, q), 6.71(4H, d), 7.13(4H, d), 7.27(4H, d), 7.99(4H, d), 8.12(2H, s) |
| Compound No. 7 | 1.23(12H, t), 1.42(4H, tt), 1.63(4H, tt), 3.44(4H, t), 3.44(8H, q), 6.28(2H, s), 6.67(4H, d), 7.87(4H, d), 8.14(2H, s) |
| Compound No. 16 | 1.33(24H, t), 3.45(16H, q), 4.56(8H, s), 6.61(8H, d), 7.90(8H, d), 8.02(4H, s) |
| Compound No. 26 | 1.57(18H, t), 3.41(12H, q), 6.64(6H, d), 7.34(6H, d), 7.93(6H, d), 8.12(3H, s), 8.76(6H, d) |
| Compound No. 43 | 1.44(3H, d), 3.37(8H, d), 3.85(8H, d), 4.42(2H, m), 5.41(1H, m), 6.88(4H, d), 7.95(4H, d), 8.10(2H, s) |
| Compound No. 52 | 1.26(12H, t), 1.58(6H, m), 2.28(4H, m), 3.50(8H, q), 6.73(4H, d), 7.11(4H, d), 7.30(4H, d), 7.98(4H, d), 8.14(2H, s) |
| Compound No. 53 | 1.25(12H, t), 2.92(1H, m), 3.22(1H, m), 3.50(8H, q), 4.25(1H, m), 6.72(4H, d), 6.77(1H, m), 6.96(1H, m), 7.08(6H, m), 7.25(7H, m), 7.36(2H, m), 7.99(4H, d), 8.16(2H, s) |
| Compound No. 54 | 1.22(12H, t), 1.37(3H, d), 3.45(8H, q), 3.58(2H, m), 4.31(1H, m), 6.65(4H, d), 6.66(1H, m), 6.88(1H, m), 7.86(4H, d), 8.15(2H, s) |
| Compound No. 55 | 1.44(3H, d), 3.09(12H, m), 4.40(2H, m), 5.38(1H, m), 6.68(4H, d), 7.93(4H, d), 8.07(2H,s) |
| Compound No. 56 | 1.22(18H, t), 1.28(3H, s), 3.45(12H, q), 4.32(6H, s), 6.64(6H, d), 7.90(6H, d), 8.02(3H, s) |
| Compound No. 57 | 1.22(18H, t), 1.28(3H, s), 3.45(12H, q), 4.32(6H, s), 6.64(6H, d), 7.90(6H, d), 8.02(3H, s) |
| Compound No. 58 | 1.26(6H, t), 1.52(4H, m), 1.79(4H, m), 2.45(6H, s), 2.65(4H, t), 3.54(4H, q), 3.74(4H, t), 4.29(4H, t), 6.48(2H, s), 6.57(2H, d), 8.41(2H, d), 8.42(2H, s) |
| Compound No. 59 | 1.43(4H, m), 1.70(4H, m), 3.06(6H, s), 3.56(4H, t), 3.81(4H, t), 4.21(4H, t), 6.67(4H, d), 7.84(4H, d), 7.97(2H, s) |
| Compound No. 60 | 1.44(6H, m), 1.76(4H, m), 3.36(8H, t), 3.84(8H, t), 4.28(4H, t), 6.87(4H, d), 7.93(4H, d), 8.04(2H, s) |
| Compound No. 61 | 1.31(4H, m), 1.41(8H, m), 1.74(4H, m), 3.08(12H, s), 4.24(4H, t), 6.68(4H, d), 7.92(4H, d), 8.05(2H, s) |
| Compound No. 62 | 1.44(6H, m), 1.76(4H, m), 2.05(12H, s), 3.72(8H, t), 4.27(8H, t), 4.29(4H, t), 6.80(4H, d), 7.93(4H, d), 8.06(2H, s) |
| Compound No. 65 | 1.21(6H, m), 1.75(4H, m), 4.27(4H, t), 6.95(4H, d), 7.17(12H, m), 7.35(8H, m), 7.84(4H, d), 8.07(2H, s) |
| Compound No. 66 | 1.47(4H, m), 1.77(4H, tt), 1.89(6H, s), 3.07(6H, s), 3.75(4H, t), 4.28(4H, t), 4.35(4H, t), 5.56(2H, s), 6.04(2H, s), 6.74(4H, d), 7.93(4H, d), 8.06(2H, s) |
| Compound No. 69 | 0.99(12H, t), 1.38(8H, m), 1.59(8H, m), 3.43(8H, t), 6.67(4H, d), 7.39(4H, d), 7.96(4H, d), 8.00(4H, d), 8.12(2H, s) |
| Compound No. 70 | 0.99(12H, t), 1.38(8H, m), 1.62(8H, m), 3.39(8H, t), 6.67(4H, d), 7.25(4H, d), 7.45(4H, d), 7.97(4H, d), 8.14(2H, s) |
| Compound No. 94 | 1.27(3H, s), 4.34(6H, s), 6.94(6H, d), 7.16(18H, m), 7.34(12H, m), 7.84(6H, d), 8.08(3H, s) |
| Compound No. 95 | 1.25(3H, s), 1.95(12H, tt), 2.72(12H, t), 3.31(12H, t), 4.32(6H, s), 7.48(6H, s), 7.98(3H, s) |
| Compound No. 96 | 1.22(12H, t), 1.27(3H, s), 3.44(8H, q), 4.32(6H, m), 6.65(4H, d), 6.95(2H, d), 7.18(6H, m), 7.33(4H, m), 7.83(2H, d), 7.90(4H, d), 8.03(2H, s), 8.07(1H, s) |
| Compound No. 97 | 1.22(6H, t), 1.27(3H, s), 3.36(8H, t), 3.44(4H, q), 3.86(8H, t), 4.36(6H, s), 6.65(2H, d), 6.86(4H, d), 7.91(6H, m), 8.03(1H, s), 8.09(2H, s) |
| Compound No. 98 (acetone-d6) | 1.29(3H, s), 3.18(9H, s), 3.67(6H, t), 3.80(6H, t), 4.41(6H, s), 6.85(6H, d), 7.89(6H, d), 8.07(3H, s) |
| Compound No. 99 (acetone-d6) | 1.11(6H, t), 1.29(3H, s), 3.18(6H, s), 3.55(4H, q), 3.68(4H, m), 3.80(4H, m), 4.42(6H, s), 6.84(6H, m), 7.94(6H, m), 8.08(3H, s) |
| Compound No. 100 | 1.20(12H, t), 1.28(3H, s), 3.14(3H, s), 3.44(8H, q), 3.62(2H, m), 3.86(2H, m), 4.35(6H, s), 6.66(4H, d), 6.75(2H, d), 7.94(6H, m), 8.03(3H, s) |
| Compound No. 101 | 1.24(3H, s), 4.32(6H, s), 4.74(12H, s), 6.77(6H, d), 7.19(12H, d), 7.33(18H, m), 7.87(6H, d), 8.02(3H, s) |
| Compound No. 102 | 0.98(18H, t), 1.24(3H, s), 1.37(12H, m), 1.62(12H, m), 3.37(12H, t), 4.35(6H, s), 6.63(6H, d), 7.90(6H, d), 8.03(3H, s) |

TABLE 3

| | IR absorption spectrum/cm$^{-1}$ |
|---|---|
| Compound No. 1 | 2975, 2215, 2155, 1713, 1611, 1569, 1520, 1443, 1414, 1356, 1330, 1276, 1225, 1180, 1158, 1138, 1079 |
| Compound No. 2 | 2976, 2931, 2873, 2213, 1714, 1612, 1571, 1523, 1443, 1415, 1356, 1329, 1277, 1229, 1187, 1159, 1139, 1080 |
| Compound No. 3 | 2974, 2213, 1712, 1611, 1569, 1520, 1443, 1414, 1356, 1329, 1275, 1227, 1182, 1158, 1139, 1079 |
| Compound No. 4 | 2975, 2211, 2157, 1972, 1712, 1611, 1569, 1520, 1414, 1356, 1329, 1275, 1228, 1183, 1157, 1139, 1091 |
| Compound No. 5 | 2973, 2936, 2210, 2156, 1712, 1611, 1569, 1520, 1443, 1414, 1356, 1329, 1275, 1228, 1183, 1158, 1139, 1093 |
| Compound No. 6 | 2972, 2211, 1725, 1611, 1565, 1519, 1471, 1444, 1414, 1378, 1355, 1330, 1275, 1222, 1208, 1179, 1157, 1137, 1065, 1015 |
| Compound No. 7 | 3430, 3368, 2976, 2933, 2860, 2199, 1659, 1611, 1567, 1527, 1412, 1357, 1197, 1159 |
| Compound No. 16 | 2969, 2210, 1708, 1610, 1562, 1512, 1470, 1441, 1411, 1377, 1352, 1327, 1270, 1223, 1175, 1153, 1134, 1071 |
| Compound No. 26 | 2970, 2211, 1722, 1608, 1559, 1499, 1441, 1411, 1354, 1327, 1270, 1218, 1205, 1174, 1130, 1057, 1012 |
| Compound No. 43 | 2896, 2207, 1711, 1609, 1557, 1517, 1437, 1376, 1327, 1317, 1268, 1224, 1165, 1137, 1100, 998 |
| Compound No. 52 | 2947, 2208, 1713, 1610, 1571, 1517, 1440, 1388, 1320, 1302, 1266, 1242, 1224, 1181, 1091, 1045, 1022 |
| Compound No. 53 | 2915, 2208, 1712, 1610, 1566, 1514, 1571, 1452, 1411, 1378, 1351, 1329, 1272, 1234, 1213, 1185, 1171, 1154, 1134, 1069, 1045, 1012 |
| Compound No. 54 | 2969, 2212, 1719, 1609, 1560, 1514, 1500, 1442, 1411, 1377, 1352, 1327, 1272, 1221, 1168, 1151, 1132, 1062, 1011 |
| Compound No. 55 | 3332, 2970, 2910, 2204, 1653, 1606, 1564, 1513, 1467, 1438, 1405, 1374, 1352, 1315, 1267, 1245, 1191, 1156, 1090, 1067 |
| Compound No. 56 | 2969, 2209, 1707, 1609, 1561, 1511, 1470, 1440, 1410, 1377, 1352, 1327, 1270, 1223, 1174, 1153, 1133, 1070 |
| Compound No. 57 | 2975, 2207, 1698, 1610, 1559, 1513, 1469, 1443, 1411, 1378, 1354, 1330, 1274, 1225, 1155, 1136, 1076, |
| Compound No. 58 | 2939, 2206, 1706, 1618, 1560, 1510, 1478, 1404, 1380, 1357, 1330, 1315, 1288, 1274, 1251, 1234, 1179, 1135, 1107, 1023, 1004 |
| Compound No. 59 | 3412, 2881, 2207, 1701, 1609, 1563, 1515, 1464, 1440, 1390, 1366, 1330, 1306, 1275, 1231, 1175, 1142, 1099, 1068, 1045, 1001 |
| Compound No. 60 | 2924, 2213, 1717, 1610, 1568, 1520, 1475, 1443, 1400, 1328, 1284, 1273, 1248, 1227, 1176, 1113, 1091, 1046, 1023, 999 |
| Compound No. 61 | 2923, 2205, 1700, 1612, 1566, 1520, 1465, 1442, 1380, 1332, 1280, 1228, 1171, 1140, 1093, 1078, 1027, 1000 |
| Compound No. 62 | 2934, 2216, 1734, 1714, 1609, 1507, 1517, 1482, 1457, 1436, 1406, 1385, 1368, 1353, 1330, 1298, 1278, 1226, 1179, 1137, 1095, 1032, 1000 |
| Compound No. 65 | 2928, 2214, 1712, 1567, 1503, 1484, 1451, 1431, 1315, 1298, 1263, 1212, 1187, 1171, 1087, 1025, 1001 |
| Compound No. 66 | 2926, 2217, 1713, 1610, 1568, 1521, 1477, 1451, 1384, 1357, 1340, 1321, 1280, 1229, 1172, 1134, 1103, 1027, 1000 |
| Compound No. 69 | 2931, 2208, 1721, 1609, 1552, 1503, 1470, 1453, 1472, 1365, 1334, 1279, 1259, 1219, 1154, 1135, 1062 |
| Compound No. 70 | 2956, 2209, 1726, 1610, 1555, 1509, 1485, 1450, 1415, 1364, 1328, 1294, 1276, 1208, 1148, 1132, 1105, 1053, 1013 |
| Compound No. 94 | 2955, 2218, 1717, 1566, 1503, 1485, 1432, 1381, 1315, 1299, 1261, 1211, 1186, 1165, 1083, 959 |
| Compound No. 95 | 2935, 2203, 1709, 1613, 1557, 1514, 1440, 1418, 1369, 1313, 1219, 1158, 1094, 1015 |
| Compound No. 96 | 2969, 2211, 1711, 1610, 1563, 1505, 1487, 1440, 1411, 1377, 1326, 1267, 1222, 1172, 1154, 1133, 1072, 999 |
| Compound No. 97 | 2849, 2212, 1711, 1609, 1569, 1514, 1440, 1379, 1328, 1269, 1224, 1172, 1111, 1087, 1050 |
| Compound No. 98 | 3365, 2882, 2209, 1704, 1609, 1562, 1512, 1439, 1382, 1328, 1270, 1225, 1166, 1137, 1084, 1043 |
| Compound No. 99 | 3468, 2891, 2210, 1706, 1609, 1562, 1514, 1440, 1382, 1352, 1328, 1271, 1225, 1170, 1136, 1076, 998 |
| Compound No. 100 | 3508, 2969, 2209, 2017, 1706, 1610, 1561, 1512, 1440, 1412, 1378, 1352, 1327, 1270, 1224, 1171, 1154, 1134, 1071 |
| Compound No. 101 | 2892, 2212, 2025, 1711, 1609, 1564, 1513, 1450, 1434, 1401, 1355, 1326, 1267, 1223, 1169, 1078, 1027 |
| Compound No. 102 | 2957, 2210, 1718, 1610, 1563, 1513, 1439, 1410, 1364, 1327, 1279, 1223, 1170, 1134, 1091 |

TABLE 4

Solubility (PGMEA)

| | Solubility/wt % |
|---|---|
| Compound No. 1 | 0.5 |
| Compound No. 2 | 4.0 |
| Compound No. 3 | 0.4 |
| Compound No. 4 | 0.6 |
| Compound No. 5 | 2.0 |
| Compound No. 6 | 0.9 |
| Compound No. 7 | 0.2 |
| Compound No. 16 | 1.8 |
| Compound No. 26 | 1.0 or less |
| Compound No. 43 | 1.0 or less |
| Compound No. 52 | 0.6 |
| Compound No. 53 | 3.5 |
| Compound No. 54 | 1.0 or less |
| Compound No. 55 | 1.0 or less |
| Compound No. 56 | 5.6 |
| Compound No. 57 | 1.0 or less |
| Compound No. 58 | 1.0 or less |
| Compound No. 59 | 1.0 or less |
| Compound No. 60 | 1.0 or less |
| Compound No. 61 | 1.0 or less |
| Compound No. 62 | 1.0 or less |
| Compound No. 65 | 5.3 |
| Compound No. 66 | 1.0 or less |
| Compound No. 69 | 1.0 or less |
| Compound No. 70 | 1.0 or less |
| Compound No. 94 | 20.0 |
| Compound No. 95 | 1.0 or less |
| Compound No. 96 | 10.0 |
| Compound No. 97 | 10.0 |
| Compound No. 98 | 1.0 or less |
| Compound No. 99 | 1.0 or less |
| Compound No. 100 | 6.0 |
| Compound No. 101 | 10.0 |
| Compound No. 102 | 7.5 |

Comparative Synthetic Example 1

Synthesis of Comparative Compound No. 1

The following comparative compound No. 1 was obtained by the method described in paragraph [0046] of the above-mentioned Patent Literature 4 (JP 2007-286189 A).

Comparative Synthetic Example 2

Synthesis of Comparative Compound No. 2

4'-(N,N-diethylamino)acetophenone (3.55 g, 20 mmol) and 2-ethoxyethyl cyanoacetate (3.77 g, 24 mmol) were dispersed in ethanol (6.33 g) and warmed up to 50° C. under stirring. Triethylamine (0.2 g, 2 mmol) was added dropwise thereto, and a reaction was conducted at 70° C. for 3 hours. After cooling was conducted, oil-water separation was conducted by ethyl acetate/ion-exchanged water, and the obtained organic phase was distilled off under a reduced pressure to give 4.3 g of a crude product. The crude product was recrystallized with a mixed solution of ethyl acetate/hexane and dried to give the following Comparative Compound No. 2 (orange crystal, yield amount: 2.2 g and yield rate: 34.8%).

[Chemical Formula 30]

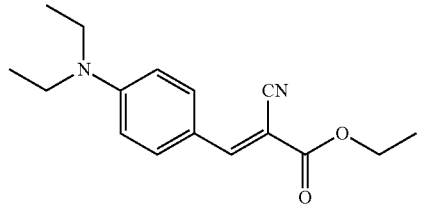

Comparative Compound No. 1

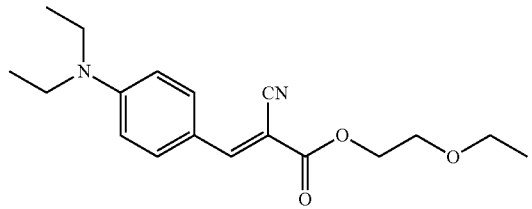

Comparative Compound No. 2

Evaluation Example 1

Evaluation of Absorption Wavelength Property

The absorption wavelength properties of Compounds Nos. 1 to 7, 16, 26, 43, 52 to 62, 65, 66, 69, 70 and 94 to 102 and Comparative Compounds Nos. 1 and 2 obtained above were each evaluated in a $CHCl_3$ solution. The results are shown in [Table 5].

TABLE 5

| | λmax/na | ε |
|---|---|---|
| Compound No. 1 | 436 | 107000 |
| Compound No. 2 | 434 | 100000 |
| Compound No. 3 | 435 | 104000 |
| Compound No. 4 | 431 | 110000 |
| Compound No. 5 | 430 | 110000 |
| Compound No. 6 | 440 | 132000 |
| Compound No. 7 | 432 | 99600 |
| Compound No. 16 | 439 | 210000 |
| Compound No. 26 | 447 | 210000 |
| Compound No. 43 | 408 | 62800 |
| Compound No. 52 | 441 | 121000 |
| Compound No. 53 | 442 | 122000 |
| Compound No. 54 | 428 | 90500 |
| Compound No. 55 | 427 | 84600 |
| Compound No. 56 | 436 | 160000 |
| Compound No. 57 | 437 | 152000 |
| Compound No. 58 | 420 | 80500 |
| Compound No. 59 | 420 | 89900 |
| Compound No. 60 | 405 | 71700 |
| Compound No. 61 | 423 | 90800 |
| Compound No. 62 | 409 | 89900 |
| Compound No. 65 | 435 | 65300 |
| Compound No. 66 | 419 | 94100 |
| Compound No. 69 | 448 | 107000 |
| Compound No. 70 | 453 | 135000 |
| Compound No. 94 | 442 | 116000 |
| Compound No. 95 | 455 | 154000 |
| Compound No. 96 | 437 | 138000 |
| Compound No. 97 | 417 | 103000 |
| Compound No. 98 | 428 | 119000 |
| Compound No. 99 | 431 | 130000 |
| Compound No. 100 | 434 | 147000 |

TABLE 5-continued

| | λmax/na | ε |
|---|---|---|
| Compound No. 101 | 425 | 153000 |
| Compound No. 102 | 440 | 125000 |
| Comparative Example No. 1 | 430 | 54900 |
| Comparative Example No. 2 | 432 | 57200 |

It is apparent from the results in the above-mentioned [Table 5] that the dyes (A) of the present invention containing the compounds represented by the above-mentioned general formulas (1) and (1') have a suitable absorption wavelength and a high molar absorption coefficient.

Evaluation Example 2

Evaluation of Heat Resistance

Compounds Nos. 1 to 7, 16, 26, 43, 52 to 62, 65, 66, 69, 70 and 94 to 102 and Comparative Compounds Nos. 1 and 2 obtained above were analyzed by TG-DTA, and the melting points and temperatures at 10% weight loss were measured. The results are shown in [Table 6].

TABLE 6

| | Melting point/° C. | 10% weight loss/° C. |
|---|---|---|
| Compound No. 1 | 164 | 318 |
| Compound No. 2 | 145 | 312 |
| Compound No. 3 | 140 | 329 |
| Compound No. 4 | 149 | 335 |
| Compound No. 5 | 131 | 348 |
| Compound No. 6 | 201 | 322 |
| Compound No. 7 | 207 | 352 |
| Compound No. 16 | 312 | 328 |
| Compound No. 26 | 161 | 321 |
| Compound No. 43 | 245 | 318 |
| Compound No. 52 | 131 | 322 |
| Compound No. 53 | 126 | 325 |
| Compound No. 54 | 224 | 354 |
| Compound No. 55 | 195 | 323 |
| Compound No. 56 | — | 334 |
| Compound No. 57 | 219 | 339 |
| Compound No. 58 | 190 | 351 |
| Compound No. 59 | 166 | 295 |
| Compound No. 60 | 181 | 350 |
| Compound No. 61 | 169 | 350 |
| Compound No. 62 | 147 | 366 |
| Compound No. 65 | — | 354 |
| Compound No. 66 | 104 | 354 |
| Compound No. 69 | 202 | 336 |
| Compound No. 70 | 210 | 324 |
| Compound No. 94 | — | 378 |
| Compound No. 95 | — | 284 |
| Compound No. 96 | — | 347 |
| Compound No. 97 | — | 334 |
| Compound No. 98 | — | 288 |
| Compound No. 99 | — | 320 |
| Compound No. 100 | — | 330 |
| Compound No. 101 | — | 336 |
| Compound No. 102 | 128 | 354 |
| Comparative Example No. 1 | 97 | 259 |
| Comparative Example No. 2 | 80 | 252 |

It is apparent from the results in the above-mentioned [Table 6] that the dyes (A) of the present invention containing the compounds represented by the above-mentioned general formulas (1) and (1') have high heat resistance.

Example 2-1

Preparation of Coloring Alkali-Developable Photosensitive Composition No. 1

<Step 1> Preparation of Alkali-Developable Photosensitive Composition No. 1

30.33 g of ACA Z250 (manufactured by Daicel Cytec Company Ltd.) and 11.04 g of ARONIX M-450 (manufactured by Toagosei Co., Ltd.) as the component (B), 1.93 g of IRGACURE 907 (manufactured by BASF) as the component (C), 36.60 g of PGMEA and 20.08 g of cyclohexanone as the component (E), as well as 0.01 g of FZ2122 (manufactured by Dow Corning Toray Co., Ltd.) as other component were mixed and stirred until insoluble components were diminished to give Alkali-developable photosensitive composition No. 1.

<Step 2> Dye Liquid No. 1

1.90 g of dimethylacetamide was added to 0.10 g of Compound No. 1 obtained above as the component (A) and dissolved under stirring.

<Step 3> Preparation of Coloring Alkali-Developable Photosensitive Composition No. 1

5.0 g of Alkali-developable photosensitive composition No. 1 obtained in Step 1 and 1.0 g of Dye liquid No. 1 obtained in Step 2 were mixed and stirred to homogeneous to give Coloring alkali-developable photosensitive composition No. 1 of the present invention.

Examples 2-2 to 2-20

Preparation of Coloring Alkali-Developable Photosensitive Compositions Nos. 2 to 20

Coloring alkali-developable photosensitive compositions Nos. 2 to 20 were obtained in a similar manner to that in Example 2-1, except that Compound No. 1 as the component (A) in Step 2 of Example 2-1 was changed to Compound No. 2, 3, 5, 6, 16, 53, 56, 57, 59, 60, 65, 66, 94 or 96 to 101 obtained above.

Comparative Examples 2-1 and 2-2

Preparation of Comparative Coloring Alkali-Developable Photosensitive Compositions Nos. 1 and 2

Comparative coloring alkali-developable photosensitive compositions Nos. 1 and 2 were obtained in a similar manner to that in Example 2-1, except that Compound No. 1 as the component (A) in Step 2 of Example 2-1 was changed to Comparative Compound No. 1 or 2.

Evaluation Example 3

The coloring alkali-developable photosensitive compositions obtained in Example 2 were each applied to a glass basal plate under a condition of 410 rpm×7 sec and dried (90° C., 90 sec) on a hot plate. The obtained coating film was exposed (150 mJ/cm$^2$) by using an ultrahigh pressure mercury lamp. The heat resistance of the exposed coating film was investigated under conditions of 180° C.×60 min and 230° C.×30 min. The results are shown in [Table 7].

Evaluation Examples 4 to 22 and Comparative Evaluation Examples 1 and 2

Using the coloring alkali-developable photosensitive compositions obtained in Examples 2-2 to 2-20 and Comparative Examples 2-1 and 2-2, heat resistance was investigated in a similar manner to that in Evaluation Example 3. The results are shown in [Table 7].

TABLE 7

| | | λ max/nm | Relative intensity After exposure | 230° C., 30 min |
|---|---|---|---|---|
| Evaluation Example 3 | Compound No. 1 | 418 | 100 | 99.4 |
| Evaluation Example 4 | Compound No. 2 | 430 | 100 | 99.3 |
| Evaluation Example 5 | Compound No. 3 | 433 | 100 | 99.4 |
| Evaluation Example 6 | Compound No. 5 | 431 | 100 | 99.5 |
| Evaluation Example 7 | Compound No. 6 | 442 | 100 | 99.9 |
| Evaluation Example 8 | Compound No. 16 | 438 | 100 | 99.7 |
| Evaluation Example 9 | Compound No. 53 | 442 | 100 | 99.2 |
| Evaluation Example 10 | Compound No. 56 | 430 | 100 | 99.9 |
| Evaluation Example 11 | Compound No. 57 | 430 | 100 | 99.9 |
| Evaluation Example 12 | Compound No. 59 | 431 | 100 | 99.7 |
| Evaluation Example 13 | Compound No. 60 | 408 | 100 | 73.8 |
| Evaluation Example 14 | Compound No. 65 | 430 | 100 | 99.3 |
| Evaluation Example 15 | Compound No. 66 | 419 | 100 | 99.2 |
| Evaluation Example 16 | Compound No. 94 | 434 | 100 | 99.5 |
| Evaluation Example 17 | Compound No. 96 | 433 | 100 | 99.5 |
| Evaluation Example 18 | Compound No. 97 | 417 | 100 | 98.2 |
| Evaluation Example 19 | Compound No. 98 | 431 | 100 | 99.5 |
| Evaluation Example 20 | Compound No. 99 | 433 | 100 | 99.6 |
| Evaluation Example 21 | Compound No. 100 | 436 | 100 | 99.7 |
| Evaluation Example 22 | Compound No. 101 | 426 | 100 | 99.4 |
| Comparative Evaluation Example 1 | Comparative Compound No. 1 | 430 | 100 | 12.5 |
| Comparative Evaluation Example 2 | Comparative Compound No. 2 | 433 | 100 | 24.0 |

From the above-mentioned results, it is apparent that the coloring alkali-developable photosensitive compositions of the present invention have high heat resistance.

It is evident from the above-mentioned results that the dyes of the present invention are excellent in molar absorption coefficient and heat resistance, and that the coloring compositions and the cured products thereof using these also have high heat resistance, and thus the dyes and coloring compositions of the present invention are useful in color filters for display devices and liquid crystal display panels using the color filters.

The invention claimed is:

1. A coloring photosensitive composition comprising (A) a dye comprising at least one kind of compound represented by the following general formula (1), (B) a polymerizable compound having an ethylenically unsaturated bond, and (C) a photopolymerization initiator:

[Chemical Formula 2]

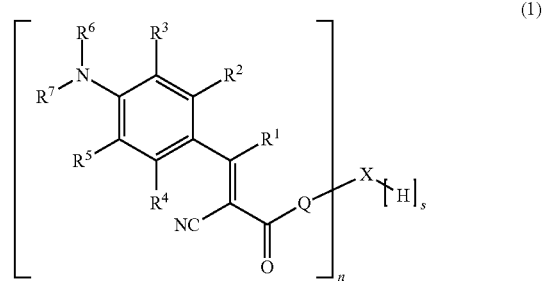

(1)

wherein $R^1$ represents a hydrogen atom, a methyl group, a halogen atom, a phenyl group or a cyano group, $R^2$ to $R^5$ each independently represent a hydrogen atom, a halogen atom, a cyano group, a hydroxyl group, a nitro group, an unsubstituted or halogenated alkyl group having 1 to 8 carbon atoms or an unsubstituted or halogenated alkoxy group having 1 to 8 carbon atoms, wherein $R^2$ and $R^3$, and $R^4$ and $R^5$ each may connect to form a ring structure, $R^6$ and $R^7$ each independently represent a hydrogen atom, an aliphatic hydrocarbon group having 1 to 35 carbon atoms, an aromatic hydrocarbon group having 6 to 35 carbon atoms or a heterocyclic group having 2 to 35 carbon atoms, wherein $R^3$ and $R^6$ and/or $R^5$ and $R^7$ and/or $R^6$ and $R^7$ may connect to form a ring structure, Q represents —O—, —$NR^{12}$— or —S—, $R^{12}$ represents a hydrogen atom, a phenyl group or an alkyl group having 1 to 8 carbon atoms, n represents an integer of 2 to 6, s represents an integer of 0 to 4, and X represents an organic group having 1 to 35 carbon atoms represented by any of the following general formulas (2) to (7) having a valence equal to n+s, provided that the formula: Valence of X=n=s shall hold, and X represents a group represented by the following general formula (2) or (3) when X is bivalent (n=2), represents a group represented by the following general formula (4) when X is trivalent (n=2 or 3), represents a group represented by the following general formula (5) when X is tetravalent (n=2 to 4), represents a group represented by the following general formula (6) when X is pentavalent (n=2 to 5), or represents a group represented by the following general formula (7) when X is hexavalent (n=2 to 6):

[Chemical Formula 2-1]

(2)

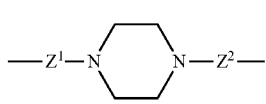

(3)

wherein in the general formula (2) or (3), $X^1$ represents a direct bond, a methylene group, an alkylidene group having 1 to 4 carbon atoms, a di-substituted alicyclic hydrocarbon group having 3 to 20 carbon atoms, —O—, —S—, —$SO_2$—, —SS—, —SO—, —CO—, —OCO—, —$NR^{20}$— or a substituent represented by any of the following [Chemical Formula 2A] to [Chemical Formula 2C], wherein the alkylidene group may be substituted with halogen atoms, $R^{20}$ represents a hydrogen atom, an alkyl group having 1 to 8 carbon atoms, an aryl group having 6 to 20 carbon atoms or an arylalkyl group having 7 to 20 carbon atoms, and $Z^1$ and $Z^2$ each represents any of a direct bond, an alkanediyl having 1 to 8 carbon atoms, a di-substituted aromatic hydrocarbon having 6 to 20 carbon atoms, —O— or —S—, or a combination of these groups, provided that the group represented by the general formula (2) or (3) is within the range of 1 to 25 carbon atoms, and at least one of $X^1$, $Z^1$ and $Z^2$ is not a direct bond:

[Chemical Formula 2A]

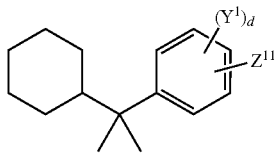

wherein $Z^{11}$ represents a hydrogen atom, a phenyl group optionally substituted by an alkyl group or alkoxy group having 1 to 10 carbon atoms or a cycloalkyl group having 3 to 10 carbon atoms, $Y^1$ represents an alkyl group having 1 to 10 carbon atoms, an alkoxy group having 1 to 10 carbon atoms, an alkenyl group having 2 to 10 carbon atoms or a halogen atom, wherein the alkyl group, alkoxy group and alkenyl group may be substituted with halogen atoms, and d is an integer of 0 to 5:

[Chemical Formula 2B]

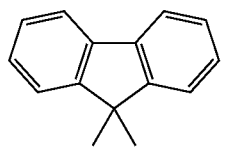

[Chemical Formula 2C]

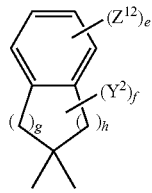

wherein $Y^2$ and $Z^{12}$ each independently represent an alkyl group having 1 to 10 carbon atoms optionally substituted with halogen atoms, an aryl group having 6 to 20 carbon atoms optionally substituted with halogen atoms, an aryloxy group having 6 to 20 carbon atoms optionally substituted with halogen atoms, an arylthio group having 6 to 20 carbon atoms optionally substituted with halogen atoms, an arylalkenyl group having 6 to 20 carbon atoms optionally substituted with halogen atoms, an arylalkyl group having 7 to 20 carbon atoms optionally substituted with halogen atoms, a heterocyclic group having 2 to 20 carbon atoms optionally substituted with halogen atoms, or a halogen atom, wherein the methylene groups in the alkyl group and arylalkyl group may be interrupted with an unsaturated bond, —O— or —S—, $Z^{12}$ may form a ring with the adjacent $Z^{12}$, e represents a number of 0 to 4, f represents a number of 0 to 8, g represents a number of 0 to 4, h represents a number of 0 to 4, and the total of the numbers g and h is 2 to 4:

[Chemical Formula 2-2]

(4)

wherein in the general formula (4), $X^2$ represents a carbon atom substituted with $R^{30}$, a nitrogen atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tri-substituted, $R^{30}$ represents a hydrogen atom, an alkyl group having 1 to 8 carbon atoms, an aryl group having 6 to 20 carbon atoms or an arylalkyl group having 7 to 20 carbon atoms, and $Z^1$ to $Z^3$ are the same as the groups represented by $Z^1$ and $Z^2$ in the general formula (2), provided that the group represented by the general formula (4) is within the range of 1 to 25 carbon atoms:

[Chemical Formula 2-3]

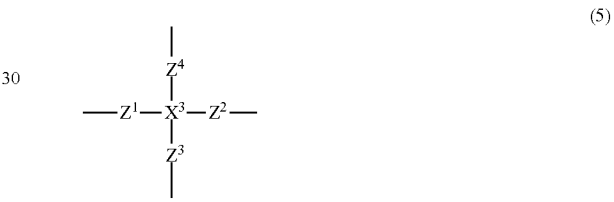

(5)

wherein in the general formula (5), $X^3$ represents a carbon atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tetra-substituted, and $Z^1$ to $Z^4$ are the same as the groups represented by $Z^1$ and $Z^2$ in the general formula (2), provided that the group represented by the general formula (5) is within the range of 1 to 25 carbon atoms:

[Chemical Formula 2-4]

(6)

wherein in the general formula (6), $X^4$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is penta-substituted, and $Z^1$ to $Z^5$ are the same as the groups represented by $Z^1$ and $Z^2$ in the general formula (2), provided that the group represented by the general formula (6) is within the range of 1 to 35 carbon atoms:

[Chemical Formula 2-5]

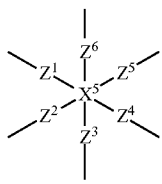
(7)

wherein in the general formula (7), $X^5$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is hexa-substituted, and $Z^1$ to $Z^6$ are the same as the groups represented by $Z^1$ and $Z^2$ in the general formula (2), provided that the group represented by the general formula (7) is within the range of 1 to 35 carbon atoms.

2. The coloring photosensitive composition according to claim 1, further comprising (D) an inorganic pigment and/or an organic pigment.

3. A coloring alkali-developable photosensitive composition comprising (A) a dye comprising at least one kind of compound represented by the following general formula (1), (B') an alkali-developable polymerizable compound having an ethylenically unsaturated bond, and (C) a photopolymerization initiator:

[Chemical Formula 3]

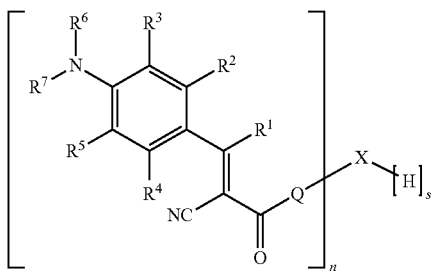
(1)

wherein
  $R^1$ represents a hydrogen atom, a methyl group, a halogen atom, a phenyl group or a cyano group,
  $R^2$ to $R^5$ each independently represent a hydrogen atom, a halogen atom, a cyano group, a hydroxyl group, a nitro group, an unsubstituted or halogenated alkyl group having 1 to 8 carbon atoms or an unsubstituted or halogenated alkoxy group having 1 to 8 carbon atoms, wherein $R^2$ and $R^3$, and $R^4$ and $R^5$ each may connect to form a ring structure,
  $R^6$ and $R^7$ each independently represent a hydrogen atom, an aliphatic hydrocarbon group having 1 to 35 carbon atoms, an aromatic hydrocarbon group having 6 to 35 carbon atoms or a heterocyclic group having 2 to 35 carbon atoms, wherein $R^3$ and $R^6$ and/or $R^5$ and $R^7$ and/or $R^6$ and $R^7$ may connect to form a ring structure,
  Q represents —O—, —$NR^{12}$— or —S—,
  $R^{12}$ represents a hydrogen atom, a phenyl group or an alkyl group having 1 to 8 carbon atoms,
  n represents an integer of 2 to 6,
  s represents an integer of 0 to 4, and
  X represents an organic group having 1 to 35 carbon atoms represented by any of the following general formulas (2) to (7) having a valence equal to n+s,
  provided that the formula: Valence of X−n=s shall hold, and X represents a group represented by the following general formula (2) or (3) when X is bivalent (n=2), represents a group represented by the following general formula (4) when X is trivalent (n=2 or 3), represents a group represented by the following general formula (5) when X is tetravalent (n=2 to 4), represents a group represented by the following general formula (6) when X is pentavalent (n=2 to 5), or represents a group represented by the following general formula (7) when X is hexavalent (n=2 to 6):

[Chemical Formula 3-1]

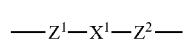
(2)

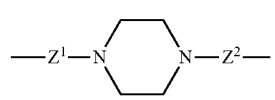
(3)

wherein in the general formula (2) or (3), $X^1$ represents a direct bond, a methylene group, an alkylidene group having 1 to 4 carbon atoms, a di-substituted alicyclic hydrocarbon group having 3 to 20 carbon atoms, —O—, —S—, —$SO_2$—, —SS—, —SO—, —CO—, —OCO—, —$NR^{20}$— or a substituent represented by any of the following [Chemical Formula 3A] to [Chemical Formula 3C], wherein the alkylidene group may be substituted with halogen atoms, $R^{20}$ represents a hydrogen atom, an alkyl group having 1 to 8 carbon atoms, an aryl group having 6 to 20 carbon atoms or an arylalkyl group having 7 to 20 carbon atoms, and $Z^1$ and $Z^2$ each represents any of a direct bond, an alkanediyl having 1 to 8 carbon atoms, a di-substituted aromatic hydrocarbon having 6 to 20 carbon atoms, —O— or —S—, or a combination of these groups, provided that the group represented by the general formula (2) or (3) is within the range of 1 to 25 carbon atoms, and at least one of $X^1$, $Z^1$ and $Z^2$ is not a direct bond:

[Chemical Formula 3A]

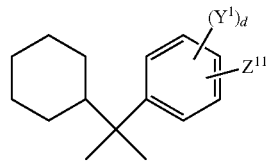

wherein $Z^{11}$ represents a hydrogen atom, a phenyl group optionally substituted by an alkyl group or alkoxy group having 1 to 10 carbon atoms or a cycloalkyl group having 3 to 10 carbon atoms, $Y^1$ represents an alkyl group having 1 to 10 carbon atoms, an alkoxy group having 1 to 10 carbon atoms, an alkenyl group having 2 to 10 carbon atoms or a halogen atom, wherein the alkyl group, alkoxy group and alkenyl group may be substituted with halogen atoms, and d is an integer of 0 to 5:

[Chemical Formula 3B]

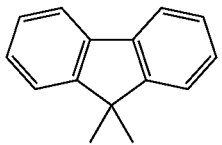

[Chemical Formula 3C]

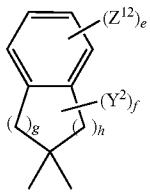

wherein $Y^2$ and $Z^{12}$ each independently represent an alkyl group having 1 to 10 carbon atoms optionally substituted with halogen atoms, an aryl group having 6 to 20 carbon atoms optionally substituted with halogen atoms, an aryloxy group having 6 to 20 carbon atoms optionally substituted with halogen atoms, an arylthio group having 6 to 20 carbon atoms optionally substituted with halogen atoms, an arylalkenyl group having 6 to 20 carbon atoms optionally substituted with halogen atoms, an arylalkyl group having 7 to 20 carbon atoms optionally substituted with halogen atoms, a heterocyclic group having 2 to 20 carbon atoms optionally substituted with halogen atoms, or a halogen atom, wherein the methylene groups in the alkyl group and arylalkyl group may be interrupted with an unsaturated bond, —O— or —S—, $Z^{12}$ may form a ring with the adjacent $Z^{12}$, e represents a number of 0 to 4, f represents a number of 0 to 8, g represents a number of 0 to 4, h represents a number of 0 to 4, and the total of the numbers g and h is 2 to 4:

[Chemical Formula 3-2]

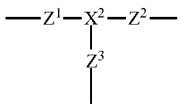

(4)

wherein in the general formula (4), $X^2$ represents a carbon atom substituted with $R^{30}$, a nitrogen atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tri-substituted, $R^{30}$ represents a hydrogen atom, an alkyl group having 1 to 8 carbon atoms, an aryl group having 6 to 20 carbon atoms or an arylalkyl group having 7 to 20 carbon atoms, and $Z^1$ to $Z^3$ are the same as the groups represented by $Z^1$ and $Z^2$ in the general formula (2), provided that the group represented by the general formula (4) is within the range of 1 to 25 carbon atoms:

[Chemical Formula 3-3]

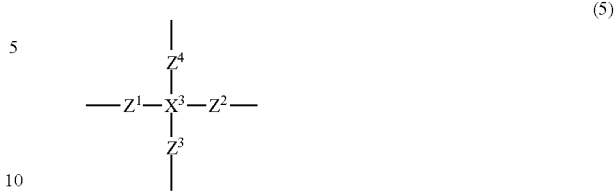

(5)

wherein in the general formula (5), $X^3$ represents a carbon atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tetra-substituted, and $Z^1$ to $Z^4$ are the same as the groups represented by $Z^1$ and $Z^2$ in the general formula (2), provided that the group represented by the general formula (5) is within the range of 1 to 25 carbon atoms:

[Chemical Formula 3-4]

(6)

wherein in the general formula (6), $X^4$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is penta-substituted, and $Z^1$ to $Z^5$ are the same as the groups represented by $Z^1$ and $Z^2$ in the general formula (2), provided that the group represented by the general formula (6) is within the range of 1 to 35 carbon atoms:

[Chemical Formula 3-5]

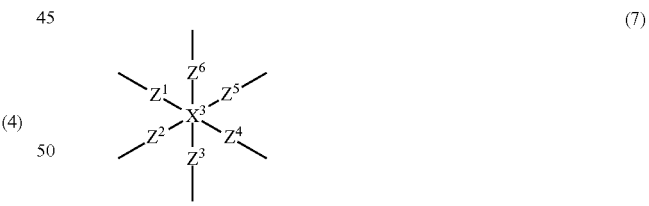

(7)

wherein in the general formula (7), $X^5$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is hexa-substituted, and $Z^1$ to $Z^6$ are the same as the groups represented by $Z^1$ and $Z^2$ in the general formula (2), provided that the group represented by the general formula (7) is within the range of 1 to 35 carbon atoms.

4. A cured product of the coloring photosensitive composition according to claim 1.

5. A color filter for display devices which is formed by using the cured product according to claim 4.

6. A liquid crystal display panel which is formed by using the color filter for display devices according to claim 5.

7. A compound represented by the following general formula (1'):

[Chemical Formula 4]

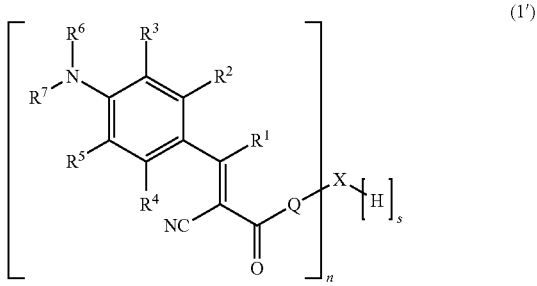

wherein
R$^1$ represents a hydrogen atom, a methyl group, a halogen atom, a phenyl group or a cyano group,
R$^2$ to R$^5$ each independently represent a hydrogen atom, a halogen atom, a cyano group, a hydroxyl group, a nitro group, an unsubstituted or halogenated alkyl group having 1 to 8 carbon atoms or an unsubstituted or halogenated alkoxy group having 1 to 8 carbon atoms, wherein R$^2$ and R$^3$, and R$^4$ and R$^5$ each may connect to form a ring structure,
R$^6$ and R$^7$ each independently represent a hydrogen atom, an aliphatic hydrocarbon group having 1 to 35 carbon atoms, an aromatic hydrocarbon group having 6 to 35 carbon atoms or a heterocyclic group having 2 to 35 carbon atoms, wherein R$^3$ and R$^6$ and/or R$^5$ and R$^7$ and/or R$^6$ and R$^7$ may connect to form a ring structure,
Q represents —O—, —NR$^{12}$— or —S—,
R$^{12}$ represents a hydrogen atom, a phenyl group or an alkyl group having 1 to 8 carbon atoms,
n represents an integer of 3 to 6,
s represents an integer of 0 to 4, and
X represents an organic group having 1 to 35 carbon atoms represented by any of the following general formulas (2) to (7) having a valence equal to n+s,
provided that the formula: Valence of X−n=s shall hold, X represents a group represented by the following general formula (4) when X is trivalent (n=3), represents a group represented by the following general formula (5) when X is tetravalent (n=3 to 4), represents a group represented by the following general formula (6) when X is pentavalent (n=3 to 5), or represents a group represented by the following general formula (7) when X is hexavalent (n=3 to 6), and
wherein R$^1$s to R$^7$s and Qs each may be the same or different:

[Chemical Formula 4-1]

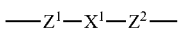 (2)

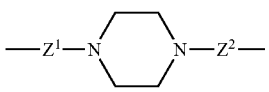 (3)

wherein in the general formula (2) or (3), X$^1$ represents a direct bond, a methylene group, an alkylidene group having 1 to 4 carbon atoms, a di-substituted alicyclic hydrocarbon group having 3 to 20 carbon atoms, —O—, —S—, —SO$_2$—, —SS—, —SO—, —CO—, —OCO—, —NR$^{20}$— or a substituent represented by any of the following [Chemical Formula 4A] to [Chemical Formula 4C], wherein the alkylidene group may be substituted with halogen atoms, R$^{20}$ represents a hydrogen atom, an alkyl group having 1 to 8 carbon atoms, an aryl group having 6 to 20 carbon atoms or an arylalkyl group having 7 to 20 carbon atoms, and Z$^1$ and Z$^2$ each represents any of a direct bond, an alkanediyl having 1 to 8 carbon atoms, a di-substituted aromatic hydrocarbon having 6 to 20 carbon atoms, —O— or —S—, or a combination of these groups, provided that the group represented by the general formula (2) or (3) is within the range of 1 to 25 carbon atoms, and at least one of X$^1$, Z$^1$ and Z$^2$ is not a direct bond:

[Chemical Formula 4A]

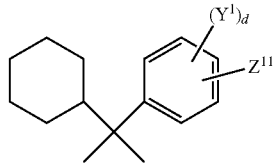

wherein Z$^{11}$ represents a hydrogen atom, a phenyl group optionally substituted by an alkyl group or alkoxy group having 1 to 10 carbon atoms or a cycloalkyl group having 3 to 10 carbon atoms, Y$^1$ represents an alkyl group having 1 to 10 carbon atoms, an alkoxy group having 1 to 10 carbon atoms, an alkenyl group having 2 to 10 carbon atoms or a halogen atom, wherein the alkyl group, alkoxy group and alkenyl group may be substituted with halogen atoms, and d is an integer of 0 to 5:

[Chemical Formula 4B]

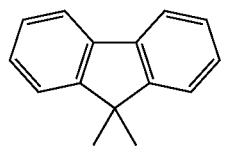

[Chemical Formula 4C]

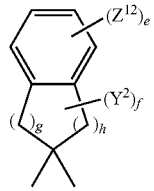

wherein Y$^2$ and Z$^{12}$ each independently represent an alkyl group having 1 to 10 carbon atoms optionally substituted with halogen atoms, an aryl group having 6 to 20 carbon atoms optionally substituted with halogen atoms, an aryloxy group having 6 to 20 carbon atoms optionally substituted with halogen atoms, an arylthio group having 6 to 20 carbon atoms optionally substituted with halogen atoms, an arylalkenyl group having 6 to 20 carbon atoms optionally substituted with halogen atoms, an arylalkyl group having 7 to 20 carbon atoms optionally substituted with halogen atoms, a heterocyclic group having 2 to 20 carbon atoms optionally substituted with halogen atoms, or a halogen atom, wherein the methylene groups in the alkyl group and arylalkyl group may be interrupted with an unsaturated bond, —O— or —S—, Z$^{12}$ may form a ring with the adjacent $Z^{12}$, e represents a number of 0 to 4, f represents a number of 0 to 8, g represents a number of 0 to 4, h represents a number of 0 to 4, and the total of the numbers g and h is 2 to 4:

[Chemical Formula 4-2]

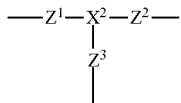

(4)

wherein in the general formula (4), $X^2$ represents a carbon atom substituted with $R^{30}$, a nitrogen atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tri-substituted, $R^{30}$ represents a hydrogen atom, an alkyl group having 1 to 8 carbon atoms, an aryl group having 6 to 20 carbon atoms or an arylalkyl group having 7 to 20 carbon atoms, and $Z^1$ to $Z^3$ are the same as the groups represented by $Z^1$ and $Z^2$ in the general formula (2), provided that the group represented by the general formula (4) is within the range of 1 to 25 carbon atoms:

[Chemical Formula 4-3]

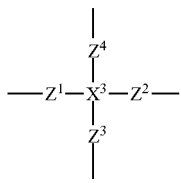

(5)

wherein in the general formula (5), $X^3$ represents a carbon atom, a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is tetra-substituted, and $Z^1$ to $Z^4$ are the same as the groups represented by $Z^1$ and $Z^2$ in the general formula (2), provided that the group represented by the general formula (5) is within the range of 1 to 25 carbon atoms:

[Chemical Formula 4-4]

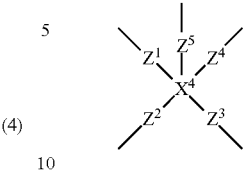

(6)

wherein in the general formula (6), $X^4$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is penta-substituted, and $Z^1$ to $Z^5$ are the same as the groups represented by $Z^1$ and $Z^2$ in the general formula (2), provided that the group represented by the general formula (6) is within the range of 1 to 35 carbon atoms:

[Chemical Formula 4-5]

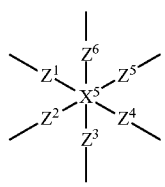

(7)

wherein in the general formula (7), $X^5$ represents a chain hydrocarbon having 1 to 20 carbon atoms, an alicyclic hydrocarbon having 3 to 20 carbon atoms, an aromatic hydrocarbon having 6 to 20 carbon atoms or a heterocycle having 6 to 20 carbon atoms which is hexa-substituted, and $Z^1$ to $Z^6$ are the same as the groups represented by $Z^1$ and $Z^2$ in the general formula (2), provided that the group represented by the general formula (7) is within the range of 1 to 35 carbon atoms.

8. A cured product of the coloring photosensitive composition according to claim 2.

9. A cured product of the coloring alkali-developable photosensitive composition according to claim 3.

10. The compound according to claim 7, wherein s represents an integer of 0 to 3.

11. The compound according to claim 7, wherein the valence of X is an integer from 3 to 6.

* * * * *